United States Patent
Hosek et al.

(10) Patent No.: US 10,022,789 B2
(45) Date of Patent: Jul. 17, 2018

(54) SYSTEM AND METHOD FOR MAKING A STRUCTURED MAGNETIC MATERIAL WITH INTEGRATED PARTICLE INSULATION

(71) Applicant: Persimmon Technologies Corporation, Wakefield, MA (US)

(72) Inventors: Martin Hosek, Lowell, MA (US); Sripati Sah, Wakefield, MA (US)

(73) Assignee: Persimmon Technologies Corporation, Wakefield, MA (US)

( * ) Notice: Subject to any disclaimer, the term of this patent is extended or adjusted under 35 U.S.C. 154(b) by 1053 days.

(21) Appl. No.: 13/836,615

(22) Filed: Mar. 15, 2013

(65) Prior Publication Data

US 2013/0292081 A1    Nov. 7, 2013

Related U.S. Application Data

(63) Continuation-in-part of application No. 13/507,448, filed on Jun. 29, 2012.

(Continued)

(51) Int. Cl.
  *B22D 23/00* (2006.01)
  *B22C 9/08* (2006.01)
  (Continued)

(52) U.S. Cl.
  CPC ............... *B22D 23/00* (2013.01); *B22C 9/08* (2013.01); *B22D 23/003* (2013.01); *B22F 3/008* (2013.01);
  (Continued)

(58) Field of Classification Search
  CPC ...... C23C 24/10; B22F 2998/00; B22F 3/008; B22D 23/00
  (Continued)

(56) References Cited

U.S. PATENT DOCUMENTS 4,441,043 A    4/1984  DeCesare
4,748,361 A    5/1988  Ohnishi et al.
(Continued)

FOREIGN PATENT DOCUMENTS

DE    3128220 A1    2/1983
EP    1868213 A1    12/2007
IE     020538 A2    2/2004

OTHER PUBLICATIONS

U.S. Appl. No. 13/799,449, filed Mar. 13, 2013, Hosek et al.
(Continued)

*Primary Examiner* — Weiping Zhu
(74) *Attorney, Agent, or Firm* — Iandiorio Teska & Coleman, LLP

(57) ABSTRACT

A system for forming a soft magnetic bulk material of a predetermined shape from a magnetic material and a source of insulating material. The systems has a heating device; a deposition device; a support configured to support the soft magnetic bulk material of the predetermined shape; and a mask configured as a negative of at least a portion of the predetermined shape. The heating device heats the magnetic material to form particles having a softened state and wherein the deposition device deposits successive layers of particles of the magnetic material in the softened state on the support with the mask located between the deposition device and the support. The mask is indexed to a position relative to the support upon deposition of the successive layers. The mask selectively blocks the successive layers of particles of the magnetic material in the softened state from being deposited on the support forming the soft magnetic bulk material of a predetermined shape on the support.

14 Claims, 36 Drawing Sheets

Related U.S. Application Data

(60) Provisional application No. 61/571,551, filed on Jun. 30, 2011.

(51) Int. Cl.
  *B22F 3/00* (2006.01)
  *B22F 3/10* (2006.01)
  *B22F 3/105* (2006.01)
  *B22F 9/20* (2006.01)
  *H01F 1/24* (2006.01)

(52) U.S. Cl.
  CPC .......... *B22F 3/1039* (2013.01); *B22F 3/1055* (2013.01); *B22F 9/20* (2013.01); *H01F 1/24* (2013.01); *B22F 2003/1056* (2013.01); *Y02P 10/295* (2015.11)

(58) Field of Classification Search
  USPC ...................................................... 164/271
  See application file for complete search history.

(56) References Cited

U.S. PATENT DOCUMENTS

| | | |
|---|---|---|
| 5,102,620 A | 4/1992 | Watson et al. |
| 5,225,004 A | 7/1993 | O'Handley et al. |
| 5,266,098 A | 11/1993 | Chun et al. |
| 5,350,628 A * | 9/1994 | Kugimiya et al. ......... 428/307.3 |
| 5,834,865 A | 11/1998 | Sugiura |
| 5,898,253 A | 4/1999 | El-Antably et al. |
| 5,936,325 A | 8/1999 | Permuy |
| 5,942,828 A | 8/1999 | Hill |
| 5,952,756 A | 9/1999 | Hsu et al. |
| 6,511,718 B1 | 1/2003 | Paz de Araujo et al. |
| 6,661,151 B2 | 12/2003 | Tan et al. |
| 6,700,271 B2 | 3/2004 | Detela |
| 6,707,224 B1 | 3/2004 | Petersen |
| 6,750,588 B1 | 6/2004 | Gabrys |
| 6,762,525 B1 | 7/2004 | Maslov et al. |
| 6,830,057 B2 | 12/2004 | Dolechek et al. |
| 6,882,066 B2 | 4/2005 | Kastinger |
| 6,891,306 B1 | 5/2005 | Soghormonian et al. |
| 6,919,543 B2 | 7/2005 | Abbott et al. |
| 6,946,771 B2 | 9/2005 | Cros et al. |
| 7,034,422 B2 | 4/2006 | Ramu |
| 7,061,152 B2 | 6/2006 | Petro et al. |
| 7,155,804 B2 | 1/2007 | Calico |
| 7,205,697 B2 | 4/2007 | Rhyu et al. |
| 7,208,787 B2 | 4/2007 | Manabe |
| 7,557,480 B2 | 7/2009 | Filatov |
| 7,579,744 B2 | 8/2009 | Kato |
| 7,635,932 B2 | 12/2009 | Matin et al. |
| 7,830,057 B2 | 11/2010 | Gieras |
| 7,952,252 B2 | 5/2011 | Kang et al. |
| 8,053,944 B2 | 11/2011 | Calley et al. |
| 2003/0203205 A1* | 10/2003 | Bi et al. ......... 428/402 |
| 2004/0007790 A1 | 1/2004 | Kato et al. |
| 2004/0150289 A1 | 8/2004 | James |
| 2005/0056347 A1 | 3/2005 | Takaya et al. |
| 2006/0013962 A1 | 1/2006 | Fuller et al. |
| 2006/0038450 A1 | 2/2006 | Matin et al. |
| 2006/0087186 A1 | 4/2006 | Wasson et al. |
| 2006/0124464 A1 | 6/2006 | Lemieux |
| 2006/0138890 A1 | 6/2006 | Kato |
| 2008/0029300 A1 | 2/2008 | Harada et al. |
| 2008/0231409 A1 | 9/2008 | Kugai et al. |
| 2008/0278022 A1 | 11/2008 | Burch et al. |
| 2009/0001831 A1 | 1/2009 | Cho et al. |
| 2009/0081066 A1* | 3/2009 | Illston ............... 419/8 |
| 2011/0163618 A1 | 7/2011 | Kanazawa et al. |
| 2013/0000447 A1 | 1/2013 | Hosek et al. |
| 2013/0000860 A1 | 1/2013 | Hosek et al. |
| 2013/0000861 A1 | 1/2013 | Hosek et al. |
| 2013/0002085 A1 | 1/2013 | Hosek et al. |
| 2013/0004359 A1 | 1/2013 | Hosek |
| 2014/0009025 A1 | 1/2014 | Hosek et al. |

OTHER PUBLICATIONS

Cvetkovski, G., et al., "Performance Improvement of PM Synchronous Motor by Using Soft Magnetic Composite Material", IEEE Transactions on Magnetics, vol. 44, No. 11, pp. 3812-3815, Nov. 2008.

Hur, J. et al., "Development of High-efficiency 42V Cooling Fan Motor for Hybrid Electric Vehicle Applications", IEEE Vehicle Power and Propulsion Conference, Windsor, UK, 2006, 6 pgs. (unnumbered).

Jack, A.G. et al., "Combined Radial and Axial Permanent Magnet Motors Using Soft Magnetic Composites", Ninth International Conference on Electrical Machines and Drives, Conference Publication No. 468, pp. 25-29, IEE, 1999.

Jack et al., "Permanent-Magnet Machines with Powdered Iron Cores and Prepressed Windings", IEEE Transactions on Industry Applications, vol. 36, No. 4, Jul./Aug. 2000, pp. 1077-1084.

Roy, S., et al., "Nucleation Kinetics and Microstructure Evolution of Traveling ASTM F75 Droplets", Advanced Engineering Materials, vol. 12, No. 9, pp. 912-919, 2010.

Uozumi et al., "Properties of Soft Magnetic Composite with Evaporated MgO Insulation Coating for Low Iron Loss", Materials Science Forum, vols. 534-536, 2007, pp. 1361-1364.

Written Opinion of the International Searching Authority for International Application No. PCT/US2012/000306, dated Sep. 28, 2012, 13 pgs. (unnumbered).

Written Opinion of the International Searching Authority for International Application No. PCT/US2012/000307, dated Sep. 7, 2012, 7 pgs. (unnumbered).

J.R. Davis, Ed., "Cold Spray Process", Handbook of Thermal Spray Technology, ASM International and the Thermal Spray Society, 2004, pp. 77-84.

Brunckova et al., "The Effect of Iron Phosphate, Alumina and Silica Coatings on the Morphology of Carbonyl Iron Particles", Surface and Interface Analysis, Dec. 2009, pp. 13-20.

Borisov et al., "Electric and Magnetic Properties of Thermal Spray Coatings With an Amorphous Structure", Proceedings of the 15$^{th}$ International Thermal Spray Conference, May 25-29, 1998, Nice, France, pp. 687-691.

Liu et al., "Highly Stable Alumina-Coated Iron Nanocomposites Synthesized by Wet Chemistry Method", Surface & Coatings Technology 200 (2006), pp. 5170-5174.

Hanson et al., "Independent Control of HVOF Particle Velocity and Temperature", Journal of Thermal Spray Technology, ASM International, vol. 11(1), Mar. 2002, pp. 75-85.

Cherigui et al., "Microstructure and Magnetic Properties of Fe—Si-Based Coatings Produced by HVOF Thermal Spraying Process", Journal of Alloys and Compounds, 427 (2007), pp. 281-290.

Kolman et al., "Modeling of Oxidation During Plasma Spraying of Iron Particles", Plasma Chemistry and Plasma Processing, vol. 22, No. 3, Sep. 2002, pp. 437-450.

Wank et al., "Nanocoating Individual Cohesive Boron Nitride Particles in a Fluidized Bed by ALD", Powder Technology, 142 (2004), pp. 59-69.

Hoile et al., "Oxide Formation in the Sprayform Tool Process", Materials Science & Engineering, A 383 (2004), pp. 50-57.

Newbery et al., "Oxidation During Electric Arc Spray Forming of Steel", Journal of Materials Processing Technology, 178 (2006), pp. 259-269.

Neiser et al., "Oxidation in Wire HVOF-Sprayed Steel", Journal of Thermal Spray Technology, ASM International, vol. 7(4), Dec. 1998, pp. 537-545.

Ageorges et al., "Plasma Spraying of Stainless-Steel Particles Coating with an Alumina Shell", Thin Solid Films, 370 (2000), pp. 213-222.

Sugaya et al., "Soft Magnetic Properties of Nano-Structure-Controlled Magnetic Materials", IEEE Transactions on Magnetics, vol. 31, No. 3, May 1995, pp. 2197-2199.

Cherigui et al., "Studies of Magnetic Properties of Iron-Based Coatings Produced by a High-Velocity Oxy-Fuel Process", Materials Chemistry and Physics, 92 (2005), pp. 419-423.

(56) References Cited

OTHER PUBLICATIONS

Shafrir et al., "Zirconia-Coated-Carbonyl-Iron-Particle-Based Magnetorheological Fluid for Polishing Optical Glasses and Ceramics", LLE Review, vol. 120, 2009, pp. 190-205.
Written Opinion of the International Searching Authority for International Application No. PCT/US14/58291, dated Feb. 24, 2015, 6 pgs.

* cited by examiner

SYSTEM AND METHOD FOR MAKING A STRUCTURED MAGNETIC MATERIAL WITH INTEGRATED PARTICLE INSULATION

RELATED APPLICATIONS

This application is a continuation-in-part of application of U.S. patent application Ser. No. 13/507,448 filed on Jun. 29, 2012 and which claims the benefit of and priority to U.S. Provisional Application Ser. No. 61/571,551 filed on Jun. 30, 2011, and under 35 U.S.C. § § 119, 120, 363, 365, and 37 C.F.R. § 1.55 and § 1.78, both of which applications are incorporated herein by this reference.

GOVERNMENT RIGHTS

This invention was made with Government support under SBIR Phase I Grant Number 1113202 awarded by the National Science Foundation. The Government has certain rights in this invention.

FIELD

The disclosed embodiment relates to system and method for making a structured material and more particularly making a material having domains with insulated boundaries.

BACKGROUND

Electric machines, such as DC brushless motors, and the like, may be used in an increasing variety of industries and applications where a high motor output, superior efficiency of operation, and low manufacturing cost often play a critical role in the success and environmental impact of the product, e.g., robotics, industrial automation, electric vehicles, HVAC systems, appliances, power tools, medical devices, and military and space exploration applications. These electric machines typically operate at frequencies of several hundred Hz with relatively high iron losses in their stator winding cores and often suffer from design limitations associated with the construction of stator winding cores from laminated electrical steel.

A typical brushless DC motor includes a rotor, with a set of permanent magnets with alternating polarity, and a stator. The stator typically comprises a set of windings and a stator core. The stator core is a key component of the magnetic circuit of the motor as it provides a magnetic path through the windings of the motor stator.

In order to achieve high efficiency of operation, the stator core needs to provide a good magnetic path, i.e., high permeability, low coercivity and high saturation induction, while minimizing losses associated with eddy currents induced in the stator core due to rapid changes of the magnetic field as the motor rotates. This may be achieved by constructing the stator core by stacking a number of individually laminated thin sheet-metal elements to build the stator core of the desired thickness. Each of the elements may be stamped or cut from sheet metal and coated with insulating layer that prevents electric conduction between neighboring elements. The elements are typically oriented in such a manner that magnetic flux is channeled along the elements without crossing the insulation layers which may act as air gaps and reduce the efficiency of the motor. At the same time, the insulation layers prevent electric currents perpendicular to the direction of the magnetic flux to effectively reduce losses associated with eddy currents induced in the stator core.

The fabrication of a conventional laminated stator core is complicated, wasteful, and labor intensive because the individual elements need to be cut, coated with an insulating layer and then assembled together. Furthermore, because the magnetic flux needs to remain aligned with the laminations of the iron core, the geometry of the motor may be considerably constrained. This typically results in motor designs with sub-optimal stator core properties, restricted magnetic circuit configurations, and limited cogging reduction measures critical for numerous vibration-sensitive applications, such as in substrate-handling and medical robotics, and the like. It may also be difficult to incorporate cooling into the laminated stator core to allow for increased current density in the windings and improve the torque output of the motor. This may result in motor designs with sub-optimal properties.

Soft magnetic composites (SMC) include powder particles with an insulation layer on the surface. See, e.g., Jansson, P., Advances in Soft Magnetic Composites Based on Iron Powder, Soft Magnetic Materials, '98, Paper No. 7, Barcelona, Spain, April 1998, and Uozumi, G. et al., Properties of Soft Magnetic Composite With Evaporated MgO Insulation Coating for Low Iron Loss, Materials Science Forum, Vols. 534-536, pp. 1361-1364, 2007, both incorporated by reference herein. In theory, SMC materials may offer advantages for construction of motor stator cores when compared with steel laminations due to their isotropic nature and suitability for fabrication of complex components by a net-shape powder metallurgy production route.

Electric motors built with powder metal stators designed to take full advantage of the properties of the SMC material have recently been described by several authors. See, e.g., Jack, A. G., Mecrow, B. C., and Maddison, C. P., Combined Radial and Axial Permanent Magnet Motors Using Soft Magnetic Composites, Ninth International Conference on Electrical Machines and Drives, Conference Publication No. 468, 1999, Jack. A. G. et al., Permanent-Magnet Machines with Powdered Iron Cores and Prepressed Windings, IEEE Transactions on Industry Applications, Vol. 36, No. 4, pp. 1077-1084, July/August 2000, Hur, J. et al., Development of High-Efficiency 42V Cooling Fan Motor for Hybrid Electric Vehicle Applications, IEEE Vehicle Power an Propulsion Conference, Windsor, U.K., September 2006, and Cvetkovski, G., and Petkovska. L., Performance Improvement of PM Synchronous Motor by Using Soft Magnetic Composite Material, IEEE Transactions on Magnetics, Vol. 44, No. 11, pp. 3812-3815, November 2008, all incorporated by reference herein, reporting significant performance advantages. While these motor prototyping efforts demonstrated the potential of isotropic materials, the complexity and cost of the production of a high performance SMC material remains a major limiting factor for a broader deployment of the SMC technology.

For example, in order to produce a high-density SMC material based on iron powder with MgO insulation coating, the following steps may be required: 1) iron powder is produced, typically using a water atomization process, 2) an oxide layer is formed on the surface of the iron particles, 3) Mg powder is added, 4) the mixture is heated to 650° C. in vacuum, 5) the resulting Mg evaporated powder with silicon resin and glass binder is compacted at 600 to 1,200 MPa to form a component; vibration may be applied as part of the compaction process, and 6) the component is annealed to relieve stress at 600° C. See, e.g., Uozumi. G. et al., Properties of Soft Magnetic Composite with Evaporated MgO Insulation Coating for Low Iron Loss, Materials Science Forum, Vols. 534-536, pp. 1361-1364, 2007, incorporated by reference herein.

SUMMARY OF THE EMBODIMENTS AND METHODS

A system for making a material having domains with insulated boundaries is provided. The system includes a droplet spray subsystem configured to create molten alloy droplets and direct the molten alloy droplets to a surface and a gas subsystem configured to introduce one or more reactive gases to an area proximate in-flight droplets. The one or more reactive gases create an insulation layer on the droplets in flight such that the droplets form a material having domains with insulated boundaries.

The droplet spray subsystem may include a crucible configured to create the molten metal alloy direct the molten alloy droplets towards the surface. The droplet spray subsystem may include a wire arc droplet deposition subsystem configured to create the molten metal alloy droplets and direct the molten alloy droplets towards the surface. The droplet subsystem includes one or more of: a plasma spray droplet deposition subsystem, a detonation spray droplet deposition subsystem, a flame spray droplet deposition subsystem, a high velocity oxygen fuel spray (HVOF) droplet deposition subsystem, a warm spray droplet deposition subsystem, a cold spray droplet deposition subsystem, and a wire arc droplet deposition subsystem each configured to form the metal alloy droplets and direct the alloy droplets towards the surface. The gas subsystem may include a spray chamber having one or more ports configured to introduce the one or more reactive gases to the proximate the in-flight droplets. The gas subsystem may include a nozzle configured to introduce the one or more reactive gases to the in-flight droplets. The surface may be movable. The system may include a mold on the surface configured to receive the droplets and form the material having domains with insulated boundaries in the shape of the mold. The droplet spray subsystem may include a uniform droplet spray subsystem configured to generate the droplets having a uniform diameter. The system may include a spray subsystem configured to introduce an agent proximate in-flight droplets to further improve the properties of the material. The one or more gases may include reactive atmosphere. The system may include a stage configured to move the surface location in one or more predetermined directions.

In accordance with another aspect of the disclosed embodiment, a system for making a material having domains with insulated boundaries is provided. The system includes a spray chamber, a droplet spray subsystem coupled to the spray chamber configured to create molten alloy droplets and direct the molten alloy droplets to a predetermined location in the spray chamber and a gas subsystem configured to introduce one or more reactive gases into the spray chamber. The one or more reactive gases create an insulation layer on the droplets in flight such that the droplets form a material having domains with insulated boundaries.

In accordance with another aspect of the disclosed embodiment, a system for making a material having domains with insulated boundaries is provided. The system includes a droplet spray subsystem configured to create molten alloy droplets and direct the molten alloy droplets to a surface and a spray subsystem configured to introduce an agent proximate in-flight droplets. Wherein the agent creates an insulation layer on the droplets in flight such that said droplets form a material having domains with insulated boundaries on the surface.

In accordance with another aspect of the disclosed embodiment, a system for making a material having domains with insulated boundaries is provided. The system includes a spray chamber, a droplet spray subsystem coupled to the spray chamber configured to create molten alloy droplets and direct the molten alloy droplets to a predetermined location in the spray chamber and a spray subsystem coupled to the spray chamber configured to introduce an agent. The agent creates an insulation layer on said droplets in flight such that said droplets form a material having domains with insulated boundaries on the surface.

In accordance with another aspect of the disclosed embodiment, a method for making a material having domains with insulated boundaries is provided. The method includes creating molten alloy droplets, directing the molten alloy droplets to a surface, and introducing one or more reactive gases proximate in-flight droplets such that the one or more reactive gases creates an insulation layer on the droplets in flight such that the droplets form a material having domains with insulated boundaries.

The method may include the step of moving the surface in one or more predetermined directions. The step of introducing molten alloy droplets may include introducing molten alloy droplets having a uniform diameter. The method may include the step of introducing an agent proximate in-flight droplets to improve the properties of the material.

In accordance with another aspect of the disclosed embodiment, a method for making a material having domains with insulated boundaries is provided. The method includes creating molten alloy droplets, directing the molten alloy droplets to a surface, and introducing an agent proximate the in-flight droplets to create an insulation layer on the droplets in flight such that the droplets form a material having domains with insulated boundaries.

In accordance with another aspect of the disclosed embodiment, a method for making a material having domains with insulated boundaries is provided. The method includes creating molten alloy droplets, introducing molten alloy droplets into a spray chamber, directing the molten alloy droplets to a predetermined location in the spray chamber, and introducing one or more reactive gases into the chamber such that the one or more reactive gases creates an insulation layer on the droplets in flight so that the droplets form a material having domains with insulated boundaries.

In accordance with another aspect of the disclosed embodiment, a material having domains with insulated boundaries is provided. The material includes a plurality of domains formed from molten alloy droplets having an insulation layer thereon and insulation boundaries between the domains.

In accordance with one aspect of the disclosed embodiment, a system for making a material having domains with insulated boundaries is provided. The system includes a droplet spray subsystem configured to create molten alloy droplets and direct the molten alloy droplets to a surface and a spray subsystem configured to direct a spray of an agent at deposited droplets on the surface. The agent creates insulation layers on the deposited droplets such that the droplets form a material having domains with insulated boundaries on the surface.

The agent may directly form the insulation layers on the deposited droplets to form the material having domains with insulated boundaries on the surface. The spray of agent may facilitate and/or participate and/or accelerate a chemical reaction that forms insulation layers on the deposited droplets to form the material having domains with insulated boundaries. The droplet spray subsystem may include a crucible configured to create the molten metal alloy direct the molten alloy droplets towards the surface. The droplet spray subsystem may include a wire arc droplet deposition subsystem configured to create the molten metal alloy droplets and direct the molten alloy droplets towards the surface. The droplet subsystem may include one or more of: a plasma spray droplet deposition subsystem, a detonation spray droplet depositions subsystem, a flame spray droplet deposition subsystem, a high velocity oxygen fuel spray (HVOF) droplet deposition subsystem, a warm spray droplet deposition subsystem, a cold spray droplet deposition subsystem, and a wire arc droplet deposition subsystem, each configured to form the metal alloy droplets and direct the alloy droplets towards the surface. The spray subsystem may include one or more nozzles configured to direct the agent at the deposited droplets. The spray subsystem may include a spray chamber having one or more ports coupled to the one or more nozzles. The droplet spray subsystem may include a uniform droplet spray subsystem configured to generate the droplets having a uniform diameter. The surface may be movable. The system may include a mold on the surface to receive the deposited droplets and form the material having domains with insulated boundaries in the shape of the mold. The system may include a stage configured to move the surface in one or more predetermined directions. The system may include a stage configured to move the mold in one or more predetermined directions.

In accordance with another aspect of the disclosed embodiment, a system for making a material having domains with insulated boundaries is provided. The system includes a droplet spray subsystem configured to create and eject molten alloy droplets into a spray chamber and direct the molten alloy droplets to a predetermined location in the spray chamber. The spray chamber is configured to maintain a predetermined gas mixture which facilitates and/or participates and/or accelerates in a chemical reaction that forms an insulation layer with deposited droplets to form a material having domains with insulated boundaries.

In accordance with another aspect of the disclosed embodiment, a system for making a material having domains with insulated boundaries is provided. The system includes a droplet spray subsystem including at least one nozzle. The droplet spray subsystem is configured to create and eject molten alloy droplets into one or more spray sub-chambers and direct the molten alloy droplets to a predetermined location in the one or more spray sub-chambers. One of the one or more spray sub-chambers is configured to maintain a first predetermined pressure and gas mixture therein which prevents a reaction of the gas mixture with the molten alloy droplets and the nozzle and the other of the one or more sub-chambers is configured to maintain a second predetermined pressure and gas mixture which facilitates and/or precipitates and/or accelerates in a chemical reaction that forms an insulation layer on deposited droplets to form a material having domains with insulated boundaries.

In accordance with another aspect of the disclosed embodiment, a method for making a material having domains with insulated boundaries is provided. The method includes creating molten alloy droplets, directing the molten alloy droplets to a surface and directing an agent at deposited droplets such that the agent creates a material having domains with insulated boundaries.

The spray of agent may directly create insulation layers on the deposited droplets to form the material having domains with insulated boundaries. The spray of agent may facilitate and/or participate and/or accelerate a chemical reaction that form insulation layers on the deposited droplets to form the material having domains with insulated boundaries.

In accordance with another aspect of the disclosed embodiment, a method of making a material having domains with insulated boundaries is provided. The method includes creating molten alloy droplets, directing the molten alloy droplets to a surface inside a spray chamber, and maintaining a predetermined gas mixture in the spray chamber which facilitates and/or precipitates and/or accelerates in a chemical reaction to form an insulation layer on the deposited droplets to form a material having domains with insulated boundaries.

In accordance with another aspect of the disclosed embodiment, a method for making a material having domains with insulated boundaries is provided. The method includes creating molten alloy droplets, directing the molten alloy droplets with a nozzle to a surface in one or more spray sub-chambers, maintaining a first predetermined pressure and gas mixture in one of the spray chambers which prevents a reaction of the gas mixture with molten alloy droplets and the spray nozzle, and maintaining a second predetermined pressure and gas mixture in the other of the spray sub-chamber which facilitates and/or precipitates and/or accelerates a chemical reaction that forms an insulation layer on deposited droplets to form a material having domains with insulated boundaries.

In accordance with another aspect of the disclosed embodiment, a material having domains with insulated boundaries is provided. The material includes a plurality of domains formed from molten alloy droplets having an insulation layer thereon and insulation boundaries between said domains.

In accordance with another aspect of the disclosed embodiment, a system for making a material having domains with insulated boundaries is provided. The system includes a combustion chamber, a gas inlet configured to inject a gas into the combustion chamber, a fuel inlet configured to inject a fuel into the combustion chamber, an igniter subsystem configured to ignite a mixture of the gas and the fuel to create a predetermined temperature and pressure in the combustion chamber, a metal powder inlet configured to inject a metal powder comprised of particles coated with an electrically insulating material into the combustion, wherein the predetermined temperature creates conditioned droplets comprised of the metal powder in the chamber, and an outlet configured to eject and accelerate combustion gases and the conditioned droplets from the combustion chamber and towards a stage such that conditioned droplets adhere to the stage to form a material having domains with insulated boundaries thereon.

The particles of the metal powder may include an inner core made of a soft magnetic material and an outer layer made of the electrically insulating material. The conditioned droplets may include a solid outer core and a softened and/or partially melted inner core. The outlet may be configured to eject and accelerate the combustion gases and the conditioned droplets from the combustion chamber at a predetermined speed. The particles may have a predetermined size. The stage may be configured to move in one or more predetermined directions. The system may include a mold on the stage to receive the conditioned droplets and form the material having domains with insulated boundaries in the shape of the mold. The stage may be configured to move in one or more predetermined directions.

In accordance with another aspect of the disclosed embodiment, a method for making a material having domains with insulated boundaries is provided. The method includes creating conditioned droplets from a metal powder made of metal particles coated with an electrically insulating material at a predetermined temperature and pressure and directing the conditioned droplets at a stage such that the conditioned droplets create material having domains with insulated boundaries thereon.

The particles of the metal powder may include an inner core made of a soft magnetic material and outer layer made of the electrically insulating material and the step of creating conditioned droplets includes the step of softening and partially melting the inner core while providing a solid outer core. The conditioned droplets may be directed at the stage at a predetermined speed. The method may include the step of moving the stage in one or more predetermined directions. The method may include the step of providing a mold on the stage.

In accordance with another aspect of the disclosed embodiment, a system for forming a bulk material having insulated boundaries from a metal material and a source of an insulating material is provided. The system includes a heating device, a deposition device, a coating device, and a support configured to support the bulk material. The heating device heats the metal material to form particles having a softened or molten state and the coating device coats the metal material with the insulating material from the source and the deposition device deposits particles of the metal material in the softened or molten state on to the support to form the bulk material having insulated boundaries.

The source of insulating material may comprise a reactive chemical source and the deposition device may deposit the particles of the metal material in the softened or molten state on the support in a deposition path such that insulating boundaries are formed on the metal material by the coating device from a chemical reaction of the reactive chemical source in the deposition path. The source of insulating material may comprise a reactive chemical source and insulating boundaries may be formed on the metal material by the coating device from a chemical reaction of the reactive chemical source after the deposition device deposits the particles of the metal material in the softened or molten state on to the support. The source of insulating material may comprise a reactive chemical source and the coating device may coat the metal material with the insulating material to form insulating boundaries from a chemical reaction of the reactive chemical source at the surface of the particles. The deposition device may comprise a uniform droplet spray deposition device. The source of insulating material may comprise a reactive chemical source and the coating device may coat the metal material with the insulating material to form insulating boundaries formed from a chemical reaction of the reactive chemical source in a reactive atmosphere. The source of insulating material may comprise a reactive chemical source and an agent and the coating device may coat the metal material with the insulating material to form insulating boundaries formed from a chemical reaction of the reactive chemical source in a reactive atmosphere stimulated by a co-spraying of the agent. The coating device may coat the metal material with the insulating material to form insulating boundaries formed from co-spraying of the insulating material. The coating device may coat the metal material with the insulating material to form insulating boundaries formed from a chemical reaction and a coating from the source of insulating material. The bulk material may include domains formed from the metal material with insulating boundaries. The softened or molten state may be at a temperature below the melting point of the metal material. The deposition device may deposit the particles simultaneously while the coating device coats the metal material from the source of the insulating material. The coating device may coat the metal material with the insulating material after the deposition device deposits the particles.

In accordance with another aspect of the disclosed embodiment, a system for forming a soft magnetic bulk material from a magnetic material and a source of an insulating material is provided. The system includes a heating device coupled to the support and a deposition device coupled to the support, a support configured to support the soft magnetic bulk material. The heating device heats the magnetic material to form particles having a softened state and the deposition device deposits particles of the magnetic material in the softened state on the support to form the soft magnetic bulk material and the soft magnetic bulk material has domains formed from the magnetic material with insulating boundaries formed from the source of insulating material.

The source of insulating material may comprise a reactive chemical source and the deposition device deposits the particles of the magnetic material in the softened or molten state on the support in a deposition path such that insulating boundaries may be formed on the magnetic material by the coating device from a chemical reaction of the reactive chemical source in the deposition path. The source of insulating material may comprise a reactive chemical source and insulating boundaries may be formed on the magnetic material by the coating device from a chemical reaction of the reactive chemical source after the deposition device deposits the particles of the magnetic material in the softened or molten state on to the support. The softened state may be at a temperature above the melting point of the magnetic material. The source of insulating material may comprise a reactive chemical source and the insulating boundaries may be foil red from a chemical reaction of the reactive chemical source at the surface of the particles. The deposition device may comprise a uniform droplet spray deposition device. The source of insulating material may comprise a reactive chemical source and the insulating boundaries may be formed from a chemical reaction of the reactive chemical source in a reactive atmosphere. The source of insulating material may comprise a reactive chemical source and an agent and the insulating boundaries may be formed from a chemical reaction of the reactive chemical source in a reactive atmosphere stimulated by a co-spraying of the agent. The insulating boundaries may be formed from co-spraying of the insulating material. The insulating boundaries may be formed from a chemical reaction and a coating from the source of insulating material. The softened state may be at a temperature below the melting point of the magnetic material. The system may include a coating device which coats the magnetic material with the insulating material. The particles may comprise the magnetic material coated with the insulating material. The particles may comprise coated particles of magnetic material coated with the insulating material and the coated particles are heated by the heating device. The system may include a coating device which coats the magnetic material with the insulating material from the source and the deposition device deposits the particles simultaneously while the coating device coats the magnetic material with the insulating material. The system may include a coating device which may coat the magnetic material with the insulating material after the deposition device deposits the particles.

In accordance with another aspect of the disclosed embodiment, a system for forming a soft magnetic bulk material from a magnetic material and a source of insulating material is provided. The system includes a heating device, a deposition device, a coating device and a support configured to support the soft magnetic bulk material. The heating device heats the magnetic material to form particles having a softened or molten state and the coating device coats the magnetic material with the source of insulating material from the source and the deposition device deposits particles of the magnetic material in the softened or molten state on to the support to form the soft magnetic bulk material having insulated boundaries.

The source of insulating material may comprise a reactive chemical source and the coating device may coat the magnetic material with the insulating material to form insulating boundaries from a chemical reaction of the reactive chemical source at the surface of the particles. The source of insulating material may comprise a reactive chemical source and the coating device may coat the magnetic material with the insulating material to form insulating boundaries formed from a chemical reaction of the reactive chemical source in a reactive atmosphere. The source of insulating material may comprise a reactive chemical source and an agent and the coating device may coat the magnetic material with the insulating material from the source to form insulating boundaries formed from a chemical reaction of the reactive chemical source in a reactive atmosphere stimulated by a co-spraying of the agent. The coating device may coat the magnetic material with the insulating material from the source to form insulating boundaries formed from a co-spraying of the insulating material. The coating device may coat the magnetic material with the insulating material from the source to form insulating boundaries formed from a chemical reaction and a coating from the source of insulating material. The soft magnetic bulk material may include domains formed from the magnetic material with insulating boundaries. The softened state may be at a temperature below the melting point of the magnetic material. The deposition device may deposit the particles simultaneously while the coating device coats the magnetic material with the insulating material. The coating device may coat the magnetic material with the insulating material after the deposition device deposits the particles.

In accordance with one aspect of the disclosed embodiment, a method of forming a bulk material with insulated boundaries is provided. The method includes providing a metal material, providing a source of insulating material, providing a support configured to support the bulk material, heating the metal material to a softened state, and depositing particles of the metal material in the softened or molten state on the support to form the bulk material having domains formed from the metal material with insulating boundaries.

Providing the source of insulating material may include providing a reactive chemical source and particles of the metal material in the softened state may be deposited on the support in a deposition path and the insulating boundaries may be formed from a chemical reaction of the reactive chemical source in the deposition path. Providing the source of insulating material may include providing a reactive chemical source and the insulating boundaries may be formed from a chemical reaction of the reactive chemical source after the depositing the particles of the metal material in the softened state on to the support. The method may include setting the molten state at a temperature above the melting point of the metal material. Providing the source of insulating material may include providing a reactive chemical source and the insulating boundaries may be formed from a chemical reaction of the reactive chemical source at the surface of the particles. Depositing particles may include uniformly depositing the particles on the support. Providing the source of insulating material may include providing a reactive chemical source and the insulating boundaries may be formed from a chemical reaction of the reactive chemical source in a reactive atmosphere. Providing the source of insulating material may include providing a reactive chemical source and an agent and the insulating boundaries may be formed from a chemical reaction of the reactive chemical source in a reactive atmosphere stimulated by co-spraying of the agent. The method may include forming the insulating boundaries by co-spraying the insulating material. The method may include forming the insulating boundaries from a chemical reaction and a coating from the source of insulating material. The softened state may be at a temperature below the melting point of the metal material. The method may include coating the metal material with the insulating material. The particles may comprise the metal material coated with the insulating material. The particles may comprise coated particles of metal material coated with the insulating material and heating the material may include heating the coated particles of metal material coating with insulation boundaries. The method may include coating the metal material with the insulating material simultaneously while depositing the particles. The method may include coating the metal material with the insulating material after depositing the particles. The method may include annealing the bulk metal material. The method may include heating the bulk metal material simultaneously while depositing the particles.

In accordance with one aspect of the disclosed embodiment, a method of forming a soft magnetic bulk material is provided. The method includes providing a magnetic material, providing a source of insulating material, providing a support configured to support the soft magnetic bulk material, heating the magnetic material to a softened state, and depositing particles of the magnetic material in the softened state on to support to form the soft magnetic bulk material having domains formed from the magnetic material with insulating boundaries.

In accordance with one aspect of the disclosed embodiment, a bulk material formed on a surface is provided. The bulk material includes a plurality of adhered domains of metal material, substantially all of the domains of the plurality of domains of metal material separated by a predetermined layer of high resistivity insulating material. A first portion of the plurality of domains forms a surface. A second portion of the plurality of domains includes successive domains of metal material progressing from the first portion, substantially all of the domains in the successive domains each include a first surface and second surface, the first surface opposing the second surface, the second surface conforming to a shape of progressed domains, and a majority of the domains in the successive domains in the second portion having the first surface comprising a substantially convex surface and the second surface comprising one or more substantially concave surfaces.

The layer of high resistivity insulating material may include a material having a resistivity greater than about $1 \times 10^3$ Ω-m. The layer of high resistivity insulating material may have a selectable substantially uniform thickness. The metal material may comprise a ferromagnetic material. The layer of high resistivity insulating material may comprise ceramic. The first surface and the second surface may form an entire surface of the domain. The first surface may progress in a substantially uniform direction from the first portion.

In accordance with one aspect of the disclosed embodiment, a soft magnetic bulk material formed on a surface is provided. The soft magnetic bulk material includes a plurality of domains of magnetic material, each of the domains of the plurality of domains of magnetic material substantially separated by a selectable coating of high resistivity insulating material. A first portion of the plurality of domains forms a surface. A second portion of the plurality of domains includes successive domains of magnetic material progressing from the first portion, substantially all of the domains in the successive domains of magnetic material in the second portion each include a first surface and a second surface, the first surface comprising a substantially convex surface, and the second surface comprising one or more substantially concave surfaces.

In accordance with another aspect of the disclosed embodiment, an electrical device coupled to a power source is provided. The electrical device includes a soft magnetic core and a winding coupled to the soft magnetic core and surrounding a portion of the soft magnetic core, the winding coupled to the power source. The soft magnetic core includes a plurality of domains of magnetic material, each of the domains of the plurality of domains substantially separated by a layer of high resistivity insulating material. The plurality of domains includes successive domains of magnetic material progressing through the soft magnetic core. Substantially all of the successive domains in the second portion each including a first surface and a second surface, the first surface comprising a substantially convex surface and the second surface comprising one or ore substantially concave surfaces.

In accordance with another aspect of the disclosed embodiment, an electric motor coupled to a power source is provided. The electric motor includes a frame, a rotor coupled to the frame, a stator coupled to the frame, at least one of the rotor or the stator including a winding coupled to the power source and a soft magnetic core. The winding is wound about a portion of the soft magnetic core. The soft magnetic core includes a plurality of domains of magnetic material, each of the domains of the plurality of domains substantially separated by a layer of high resistivity insulating material. The plurality of domains includes successive domains of magnetic material progressing through the soft magnetic core. Substantially all of the successive domains in the second portion each include a first surface and a second surface, the first surface comprising a substantially convex surface and the second surface comprising one or more substantially concave surfaces.

In accordance with another aspect of the disclosed embodiment, a soft magnetic bulk material formed on a surface is provided. The soft magnetic bulk material includes a plurality of adhered domains of magnetic material, substantially all of the domains of the plurality of domains of magnetic material separated by a layer of high resistivity insulating material. A first portion of the plurality of domains forms a surface. A second portion of the plurality of domains includes successive domains of magnetic material progressing from the first portion, substantially all of the domains in the successive domains each including a first surface and a second surface, the first surface opposing the second surface, the second surface conforming to the shape of progressed domains. A majority of the domains in the successive domains in the second portion having the first surface comprising a substantially convex surface and the second surface comprising one or more substantially concave surfaces.

In accordance with another aspect of the disclosed embodiment, an electrical device coupled to a power source is provided. The electrical device includes a soft magnetic core and a winding coupled to the soft magnetic core and surrounding a portion of the soft magnetic core, the winding coupled to the power source. The soft magnetic core includes a plurality of domains, each of the domains of the plurality of domains substantially separated by a layer of high resistivity insulating material. The plurality of domains include successive domains of magnetic material progressing through the soft magnetic core. Substantially all of the successive domains each include a first surface and a second surface, the first surface opposing the second surface, the second surface conforming to the shape of progressed domains of metal material, and a majority of the domains in the successive domains in the second portion having the first surface comprising a substantially convex surface and the second surface comprising one or more substantially concave surfaces.

In accordance with another aspect of the disclosed embodiment, an electrical device coupled to a power source is provided. The electrical device includes a soft magnetic core and a winding coupled to the soft magnetic core and surrounding a portion of the soft magnetic core, the winding coupled to the power source. The soft magnetic core includes a plurality of domains, each of the domains of the plurality of domains substantially separated by a layer of high resistivity insulating material. The plurality of domains include successive domains of magnetic material progressing through the soft magnetic core. Substantially all of the successive domains each include a first surface and a second surface, the first surface opposing the second surface, the second surface conforming to the shape of progressed domains of metal material, and a majority of the domains in the successive domains in the second portion having the first surface comprising a substantially convex surface and the second surface comprising one or more substantially concave surfaces.

In another exemplary embodiment, a system for forming a soft magnetic bulk material of a predetermined shape from a magnetic material and a source of insulating material is provided. The systems has a heating device; a deposition device; a support configured to support the soft magnetic bulk material of the predetermined shape; and a mask configured as a negative of at least a portion of the predetermined shape. The heating device heats the magnetic material to form particles having a softened state and wherein the deposition device deposits successive layers of particles of the magnetic material in the softened state on the support with the mask located between the deposition device and the support. The mask is indexed to a position relative to the support upon deposition of the successive layers. The mask selectively blocks the successive layers of particles of the magnetic material in the softened state from being deposited on the support forming the soft magnetic bulk material of a predetermined shape on the support.

In accordance with another exemplary method, a method of forming a soft magnetic bulk material of a predetermined shape from a magnetic material and a source of insulating material is provided. The method comprises providing a heating device; providing a deposition device; providing a support configured to support the soft magnetic bulk material of the predetermined shape; providing a mask configured as a negative of at least a portion of the predetermined shape; heat the magnetic material with the heating device to form particles having a softened state; locating the mask between the deposition device and the support; depositing successive layers of particles of the magnetic material in the softened state with the deposition device on the support; and indexing a position relative to the support the mask upon deposition of the successive layers. The mask selectively blocks the successive layers of particles of the magnetic material in the softened state from being deposited on the support forming the soft magnetic bulk material of a predetermined shape on the support.

In accordance with another exemplary method, a method of forming a soft magnetic bulk material of a predetermined shape from a magnetic material and a non-magnetic material is provided. The method comprises providing a reservoir adapted to contain the soft magnetic bulk material of the predetermined shape; providing a heat source; and heating the magnetic material and the non-magnetic material in the reservoir to an ignition temperature of a reaction thus forming the soft magnetic bulk material of a predetermined shape. The soft magnetic bulk material of a predetermined shape has domains formed from the magnetic material with insulating boundaries formed from the reaction.

BRIEF DESCRIPTION OF THE SEVERAL VIEWS OF THE DRAWINGS

Other objects, features and advantages will occur to those skilled in the art from the following description of an embodiment and the accompanying drawings, in which.

DETAILED DESCRIPTION

Figure 1:
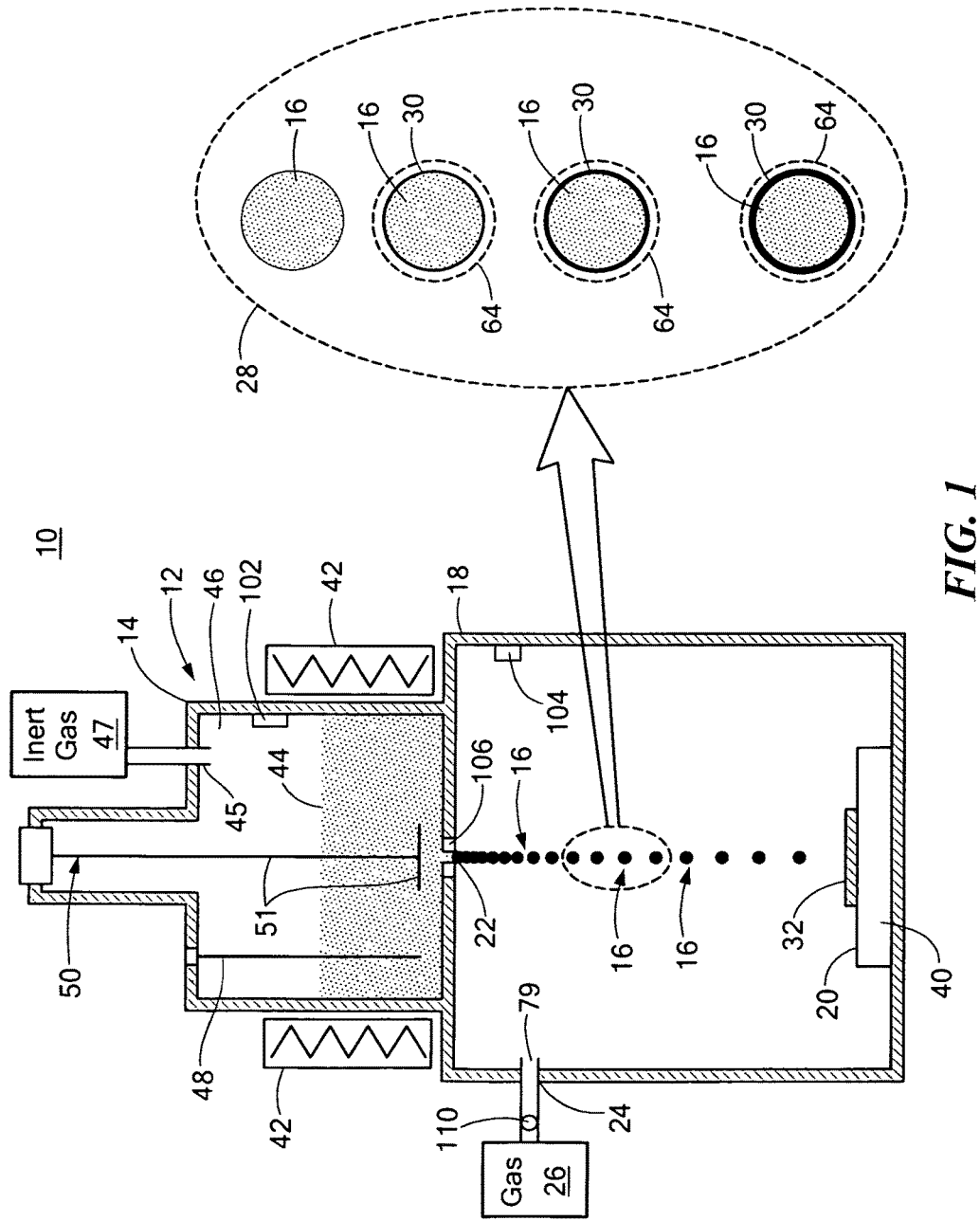
FIG. 1 is a schematic block diagram showing the primary components of one embodiment of the system and method for making a material having domains with insulated boundaries.

Aside from the embodiment disclosed below, the disclosed embodiment invention is capable of other embodiments and of being practiced or being carried out in various ways. Thus, it is to be understood that the disclosed embodiment is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

There is shown in FIG. 1, system 10 and the method thereof for making a material having domains with insulated boundaries. System 10 includes droplet spray subsystem 12 configured to create molten alloy droplets 16 and direct molten alloy droplets 16 towards surface 20. In one design, droplet spray subsystem 12 directs molten alloy droplets into spray chamber 18. In an alternate aspect, spray chamber 18 is not required as will be discussed below.

In one embodiment, droplet spray subsystem 12 includes crucible 14 which creates molten alloy droplets 16 and directs molten alloy droplets 16 towards surface 20. Crucible 14 may include heater 42 which forms molten alloy 44 in chamber 46. The material used to make molten alloy 44 may have a high permeability, low coercivity and high saturation induction. Molten alloy 44 may be made from a magnetically soft iron alloy, such as iron-base alloy, iron-cobalt alloy, nickel-iron alloy, silicon iron alloy, iron-aluminide, ferritic stainless steel, or similar type alloy. Chamber 46 may receive inert gas 47 via port 45. Molten alloy 44 may be ejected through orifice 22 due to the pressure applied from inert gas 47 introduced via port 45. Actuator 50 with vibration transmitter 51 may be used to vibrate a jet of molten alloy 44 at a specified frequency to break up molten alloy 44 into stream of droplets 16 which are ejected through orifice 22. Crucible 14 may also include temperature sensor 48. Although as shown crucible 14 includes one orifice 22, in alternate, crucible 14 may have any number of orifices 22 as needed to accommodate higher deposition rates of droplets 16 on surface 20, e.g., up to 100 orifices or more.

Figure 2:
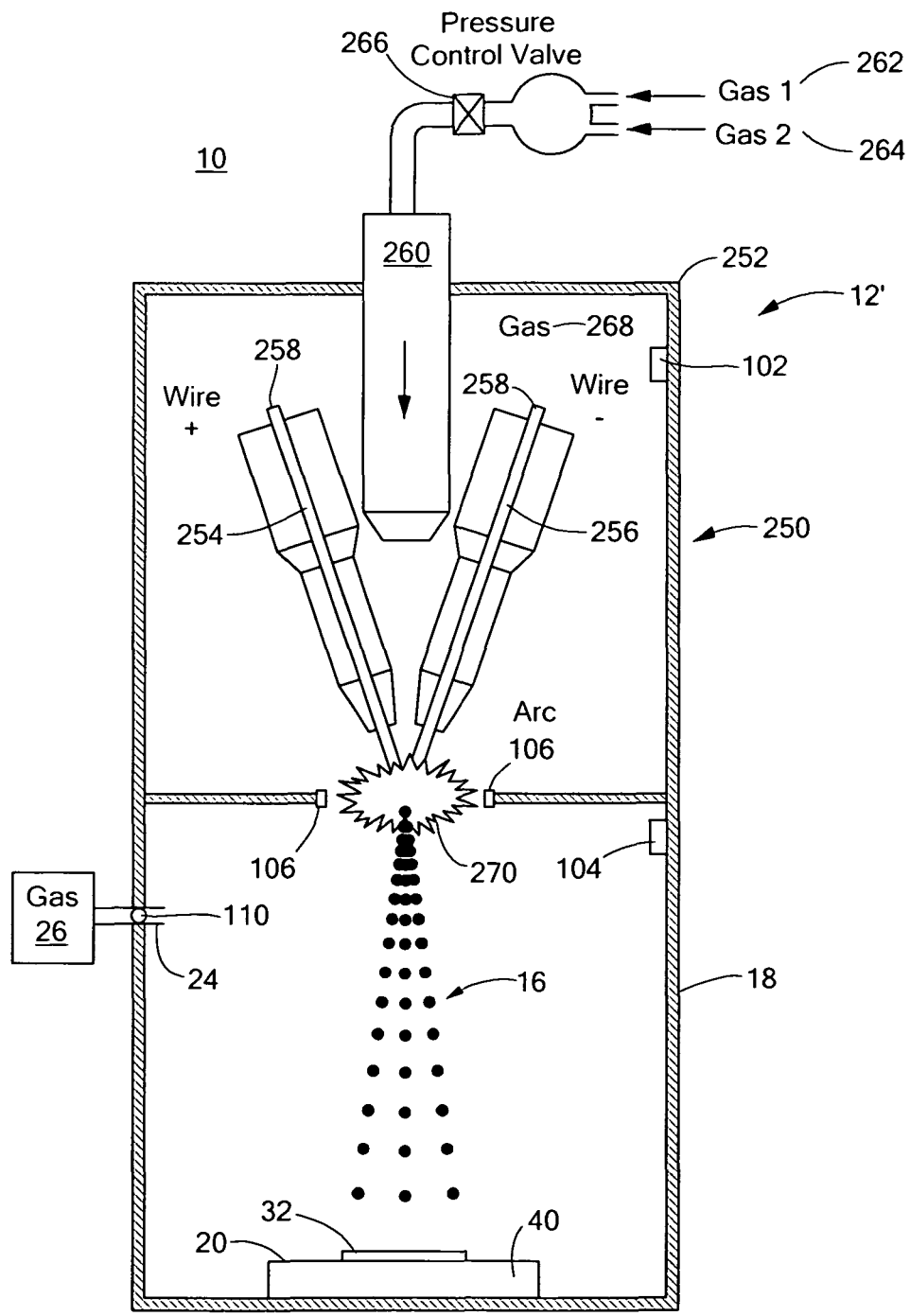
FIG. 2 is a schematic side-view showing another embodiment of the droplet spray subsystem in a controlled atmosphere.

Droplet spray subsystem 12', FIG. 2, where like parts have been given like numbers, includes wire arc droplet deposition subsystem 250 which creates molten alloy droplets 16 and directs molten alloy droplets 16 towards surface 20. Wire arc droplet deposition subsystem 250 includes chamber 252 which houses positive wire arc wire 254 and negative arc wire 256. Alloy 258 is preferably disposed in each of wire arc wires 254 and 256. Alloy 258 may be used to create droplets 16 to be directed toward surface 20 and may be composed mainly of iron (e.g., greater than about 98%) with very low amount of carbon, sulfur, and nitrogen content, (e.g., less than about 0.005%) and may include minute quantities of Cr (e.g., less than about 1%) with the balance, in this example, being Si or Al to achieve good magnetic properties. The metallurgical composition may be tuned to provide improvements in the final properties of the material having domains with insulated boundaries. Nozzle 260 may be configured to introduce one or more gases 262 and 264, e.g., ambient air, argon, and the like, to create gas 268 inside chamber 252. Pressure control valve 266 controls the flow of one or more of gases 262, 264 into chamber 252. In operation, the voltage applied to positive arc wire 254 and negative arc wire 256 creates arc 270 which causes alloy 258 to form molten alloy droplets 16 which are directed towards surface 20. In one example, voltages between about 18 and 48 volts and currents between about 15 to 400 amperes may applied to positive wire arc 254 and negative arc wire 256 to provide a continuous wire arc spray process of droplets 16. In this example, system 10 includes spray chamber 16.

Figure 3:
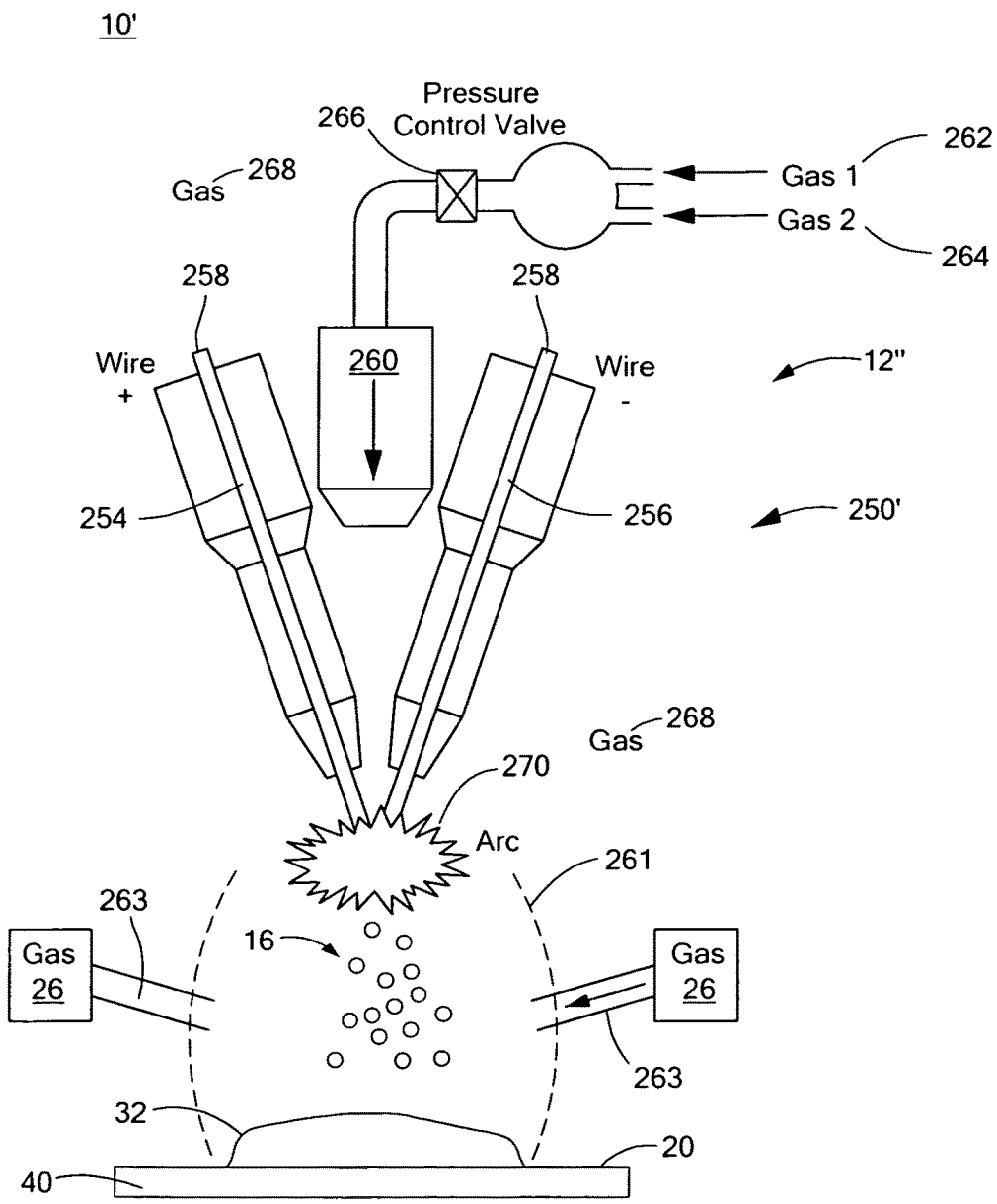
FIG. 3 is a schematic side-view showing another embodiment of the system and method for expediting production of a material having domains with insulated boundaries.

System 10', FIG. 3, where like parts have been given like numbers, includes droplet spray subsystem 12" with wire arc droplet deposition subsystem 250' that creates molten alloy droplets 16 and directs molten alloy droplets 16 towards surface 20. Here, system 10' does not include chamber 252, FIG. 2, and chamber 18, FIGS. 1 and 2. Instead, nozzle 260, FIG. 3, may be configured to introduce one or more gases 262 and 264 to create gas 268 in the area proximate positive arc wire 254 and negative arc wire 256. Similar as discussed above with reference to FIG. 2, the voltage applied to positive arc wire 254 and negative arc wire 256 creates arc 270 which causes alloy 258 to form molten alloy droplets 16 which are directed towards surface 20. Reactive gas 26 (discussed below) is introduced to the area proximate in-flight molten alloy droplets 16, e.g., using nozzle 263. Shroud 261 may be used to contain reactive gas 26 and droplets 16 in the area proximate surface 20.

Figure 4:
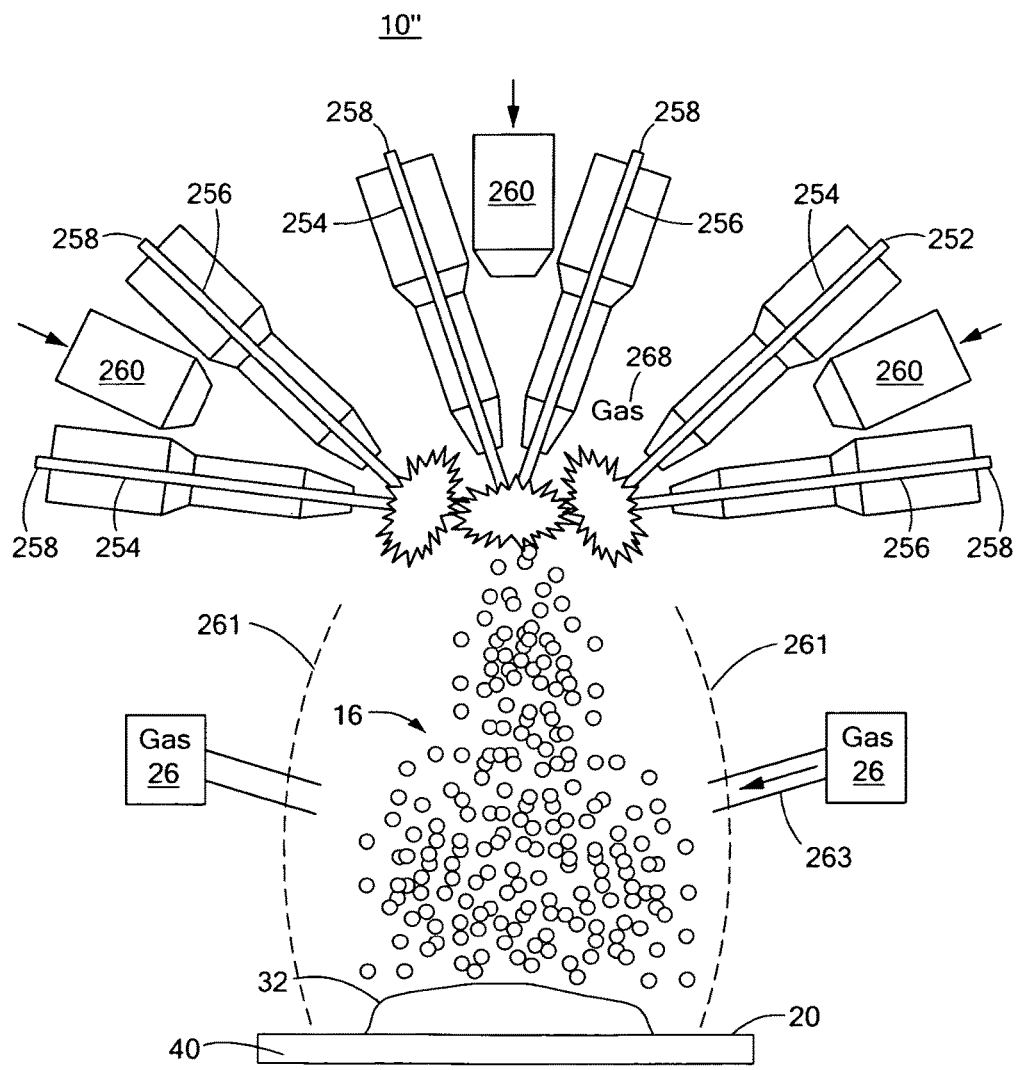
FIG. 4 is a schematic side-view showing another embodiment of the system and method for making a material having domains with insulated boundaries.

System 10", FIG. 4, where like parts have been given like numbers, may include droplet spray deposition subsystem 12''' having wire arc droplet deposition subsystem 250'' having a plurality of positive arc wire 254, negative arc wires 256 and nozzles 260 which may be used simultaneously to achieve higher spray deposition rates of molten alloy droplets 16 on surface 20. Wire arcs 254, 256, and similar deposition devices discussed above, may be provided in different directions to form the material having domains of insulated boundaries. Wire arc droplet deposition subsystem 250'' is not enclosed in a chamber. In an alternate aspect, wire arc spray 250'' may be enclosed in chamber, e.g., chamber 252, FIG. 2. When a chamber is not used, shroud 261, FIG. 4, may be used to contain reactive gas 26 and droplets 16 in the area proximate surface 20.

In alternate aspects, droplet spray subsystem 12, FIGS. 1-4, may utilize a plasma spray droplet deposition subsystem, a detonation spray droplet deposition subsystem, a flame spray droplet deposition subsystem, a high velocity oxy-fuel spray (HVOF) droplet deposition subsystem, a warm spray droplet deposition subsystem, a cold spray droplet deposition subsystem, or any similar type spray droplet deposition subsystems. Accordingly, any suitable deposition system may be used in accordance with one or more of disclosed embodiments discussed above.

Droplet spray subsystem 12, FIGS. 1-4, may be mounted on a single or plurality of robotic arms and/or mechanical arrangements so as to improve part quality, reduce spray time, and improve process economics. The subsystems may spray droplets 16 simultaneously at the same approximate location or may be staggered so as the spray a certain location in a sequential manner. Droplet spray subsystem 12 may be controlled and facilitated by controlling one or more of the following spray parameters: wire speed, gas pressure, shroud gas pressure, spraying distance, voltage, current, speed of substrate motion, and/or the speed of arc tool movement.

System 10, FIGS. 1 and 2, also may include port 24 coupled to spray chamber 18 configured to introduce gas 26, e.g., reactive atmosphere, into spray chamber 28. System 10', 10'', FIGS. 3 and 4, may introduce gas 26, e.g., reactive atmosphere, in the area proximate droplets 16 in flight. Gas 26 may be chosen such that it creates an insulation layer on droplets 16 as they are in flight towards surface 20. A mixture of gases, one or more of which may participate in the reaction with droplets 16, may be introduced to the area proximate droplets 16 in flight. Caption 28, FIG. 1, shows an example of insulation layer 30 being formed on in-flight molten alloy droplets 16, FIGS. 1-4, during their flight to surface 20. When droplets 16 with insulation layer 30 land on surface 20 they form the beginning of material 32 having domains with insulated boundaries. Thereafter, subsequent droplets 16 with insulation layer 30 land on the previously formed material 32. In one aspect of the disclosed embodiment, surface 20 is moveable, e.g., using stage 40, which may be an X-Y stage, a turn table, a stage that can additionally change the pitch and roll angle of surface 20, or any other suitable arrangement that can support material 32 and/or move material 32 in a controlled manner as it is formed. System 10 may include a mold (not shown) that is placed on surface 20 to create material 32 having any desired shape as known by those skilled in the art.

Figure 5A:
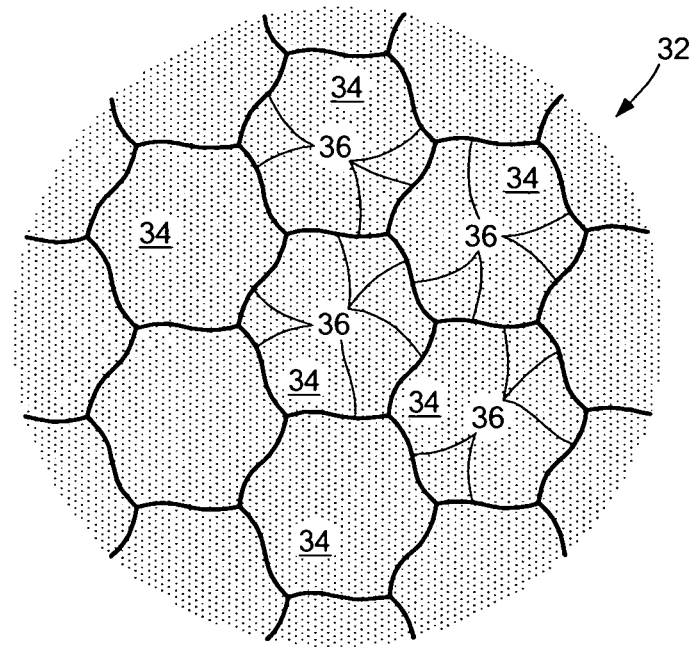
FIG. 5A is a schematic diagram of one embodiment of the material having domains with insulated boundaries created using the system and method of one or more embodiments.
Figure 5B:
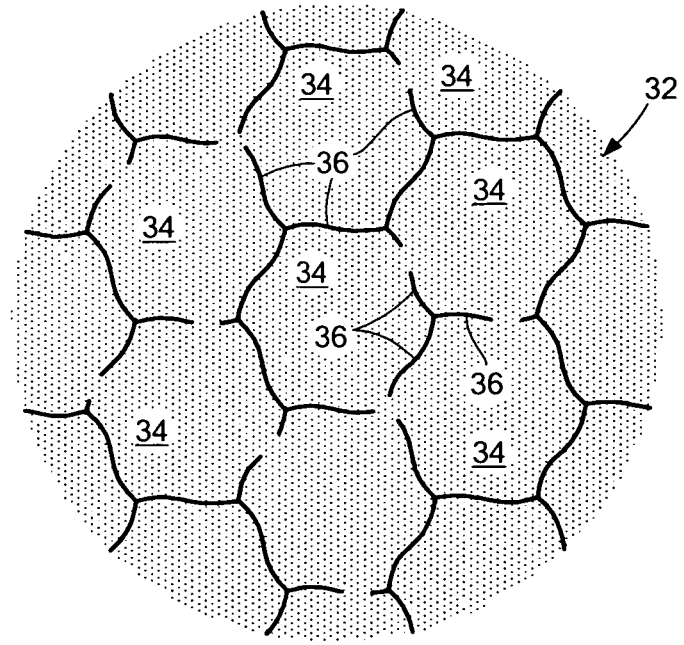
FIG. 5B is a schematic diagram of another embodiment of the material having domains with insulated boundaries created using the system and method of one or more embodiments.

FIG. 5A shows an example of material 32 that includes domains 34 with insulated boundaries 36 therebetween. Insulated boundaries 36 are formed from the insulation layer on droplets 16, e.g., insulation layer 30, FIG. 1. Material 32, FIG. 5A, may include boundaries 36 between neighboring domains 34 which are virtually perfectly formed as shown. In other aspects of the disclosed embodiment, material 32, FIG. 5B, may include boundaries 36 between neighboring domains 34 with discontinuities as shown. Material 32, FIGS. 5A and 5B, reduces eddy current losses, and discontinuities in boundaries 36 between neighboring domains 34 improve the mechanical properties of material 32. The result is that material 32 may preserve a high permeability, a low coercivity and a high saturation induction of the alloy. Here, boundaries 36 limit electrical conductivity between neighboring domains 34. Material 32 provides a superior magnetic path due to its permeability, coercivity and saturation characteristics. The limited electrical conductivity of material 32 minimizes eddy current losses associated with rapid changes of the magnetic field, e.g., as a motor rotates. System 10 and the method thereof may be a single step, fully automated process which saves time and money and produces virtually no waste. In alternate aspects of the disclosed embodiment, system 10 may be operated manually, semi automatically or otherwise.

Figure 6:
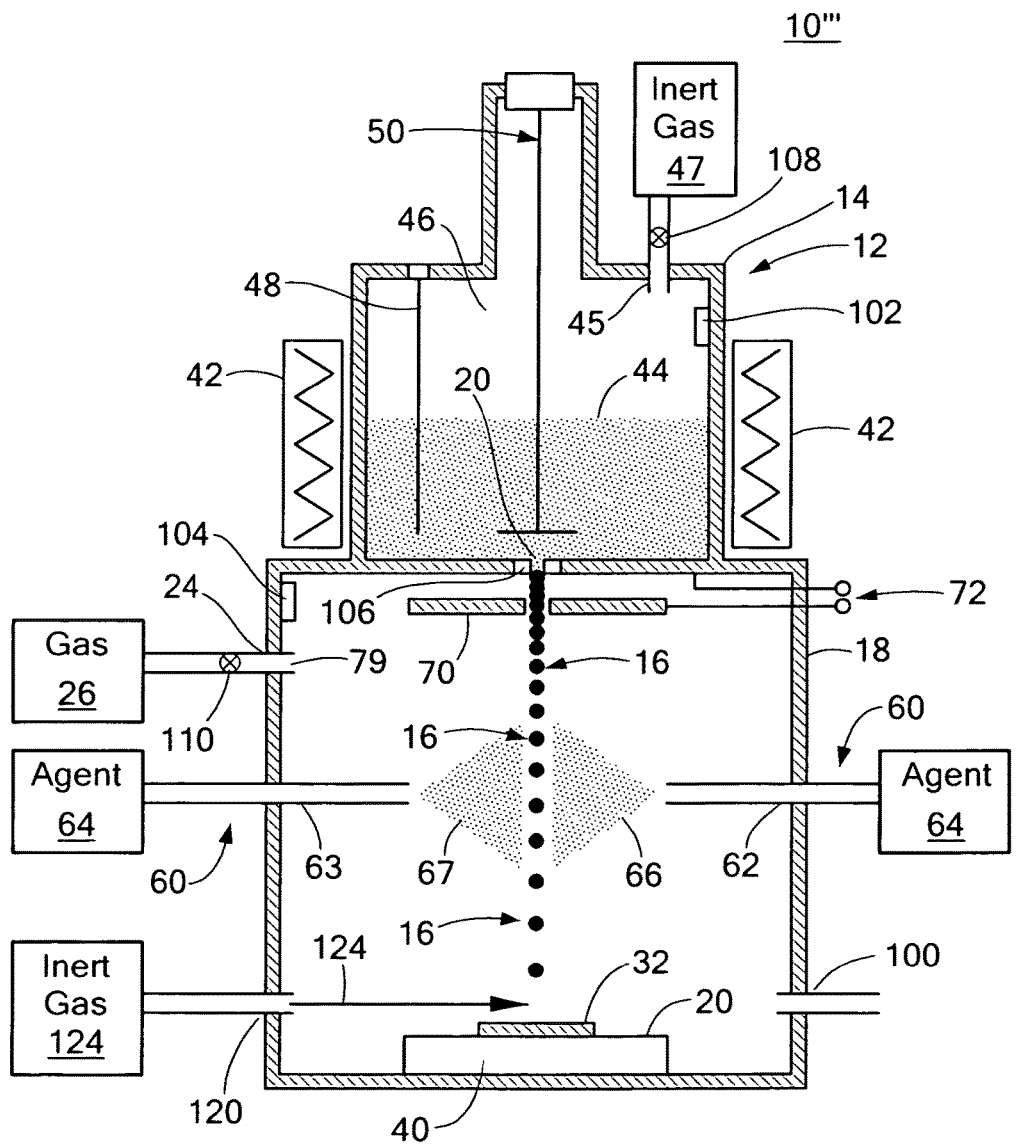
FIG. 6 is a schematic block diagram showing the primary components of another embodiment of the system and method for making a material having domains with insulated boundaries.

System 10''', FIG. 6, where like parts include like numbers, may also include spray subsystem 60 which includes at least one port, e.g., port 62 and/or port 63, which is configured to introduce agent 64 into spray chamber 18. Spray subsystem 60 creates spray 66 and/or spray 67 of spray agent 64 which coats droplets 16 having insulation layers thereon, e.g., insulation layers 30, FIG. 1, with agent 64, FIG. 3, while droplets 16 are in flight toward surface 20. Agent 64 preferably may stimulate a chemical reaction that forms insulation layer 30 and/or coat the particle to form insulation layer 30; or a combination thereof, which may take place either simultaneously or sequentially. In a similar manner, system 10', FIG. 3, and system 10''. FIG. 4, may also introduce an agent at in-flight droplets 16. Caption 28, FIG. 1, shows one example of agent 64 (in phantom) coating droplets 16 with insulating coating 30. Agent 64 provides material 32 with additional insulating capabilities. Agent 64 preferably may stimulate the chemical reaction that forms insulation layer 30; may coat the particle to form insulation layer 30; or a combination thereof which may take place either simultaneously or sequentially.

System 10, FIGS. 1, 2, and 6 may include charging plate 70, FIG. 6, coupled to DC source 72. Charging plate 70 creates an electric charge on droplets 16 to control their trajectory towards surface 20. Preferably, coils (not shown) may be used to control the trajectory of droplets 16. Charging plate 70 may be utilized in some applications to electrically charge droplets 16 so that they repel each other and do not merge with each other.

System 10, FIGS. 1, 2 and 6, may include gas exhaust port 100, FIG. 6. Exhaust port 100 may be used to expel excessive gas 26 introduced by port 24 and/or excessive agent 64 introduced by spray subsystem 60. In addition, as certain gases in gas 26 (e.g., reactive atmosphere) are likely to be consumed, exhaust port 100 allows gas 26 to be replaced in spray chamber 18 in a controlled manner. Similarly, system 10', FIG. 3, and system 10'', FIG. 4, may also include a gas exhaust port.

System 10, FIGS. 1, 2, and 6, may include pressure sensor 102 inside chamber 46, FIG. 1 or chamber 252, FIG. 2. System 10, FIGS. 1, 2, and 6, may also include pressure sensor 104, FIG. 2 inside spray chamber 18 and/or differential pressure sensor 106, FIGS. 1, 2, and 6 between crucible 14 and spray chamber 18 and/or differential pressure sensor 106. FIG. 2, between chamber 252 and spray chamber 18. The information about the pressure difference provided by sensors 102 and 104 or 106 may be utilized to control the supply of inert gas 47, FIGS. 1 and 6, to crucible 14 and the supply of gas 26 into the spray chamber 18 or the supply of gas 262, 264, FIG. 2, to chamber 252. The difference in the pressures may serve as a way of controlling the ejection rate of molten alloy 44 through orifice 20. In one design, controllable valve 108, FIG. 6, coupled to port 45 may be utilized to control the flow of inert gas into chamber 46. Similarly, control valve 266 may be used to control the flow of gases 262, 264 into chamber 252. Controllable valve 110, FIGS. 1, 2, and 6, coupled to port 24 may be utilized to control the flow of gas 26 into spray chamber 18. A flow meter (not shown) may also be coupled to port 24 to measure the flow rate of gas 26 into spray chamber 18.

System 10, FIGS. 1, 2, and 6, may also include a controller (not shown) that may utilize the measurements from the sensors 102, 104 and/or 106 and the information from a flow meter coupled to port 24 to adjust the controllable valves 108, 110 or 266 to maintain the desired pressure differential between chamber 46 and spray chamber 18 or chamber 252 and spray chamber 18 and the desired flow of gas 26 into spray chamber 18. The controller may utilize the measurements from temperature sensor 48 in crucible 14 to adjust operation of heater 42 to achieve/maintain the desired temperature of molten alloy 44. The controller may also control the frequency (and possibly amplitude) of the force produced by actuator 50, FIG. 1, of the vibration transmitter 51 in the crucible 14.

System 10, FIGS. 1, 2, and 6 may include a device for measuring the temperature of the deposited droplets 16 on material 32 and a device for controlling the temperature of the deposited droplets on material 32.

Figure 7:
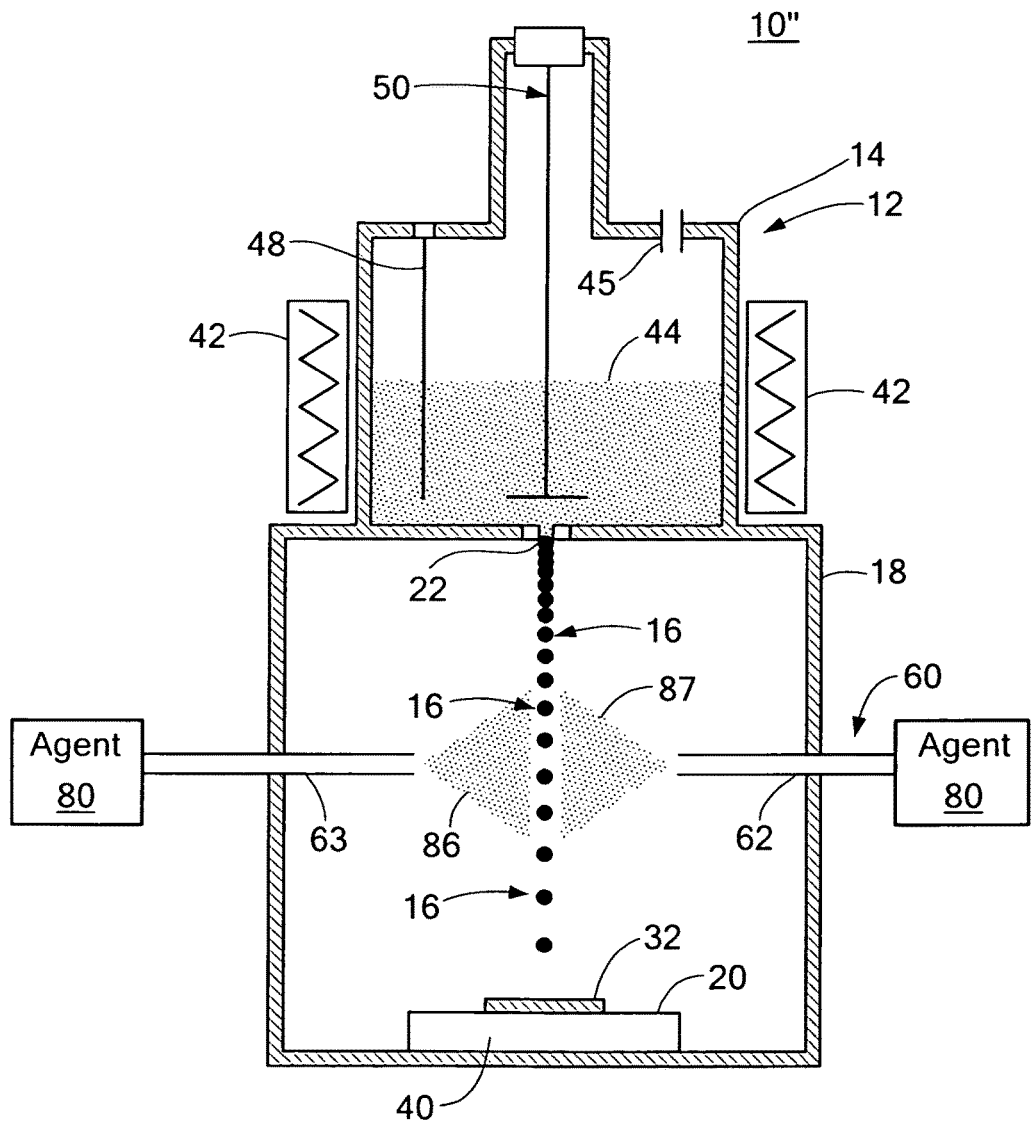
FIG. 7 is a schematic block diagram showing the primary components of another embodiment of the system and method for making a material having domains with insulated boundaries.

System 10'', FIG. 7, where like parts include like numbers, may include spray subsystem 60 which includes at least one port, e.g., port 62 and/or port 63, which is configured to introduce agent 80 into spray chamber 18. Here, a reactive gas may not be utilized. Spray subsystem 60 creates spray 86 and/or spray 87 of spray agent 80 which coats droplets 16 with agent 80 to form insulation coating 30, FIG. 1, on droplets 16 while they are in flight toward surface 20. This creates material 32 having domains 34, FIGS. 5A-5B, with insulated boundaries 36, e.g., as discussed above.

Droplet spray subsystem 12, FIGS. 1-4, 6 and 7, may be a uniform droplet spray system configured to generate droplets 16 having a uniform diameter.

System 10, FIGS. 1-4, 6 and 7 and the corresponding method thereof for making material 32 that includes domains with insulated boundaries may be an alternative material and manufacturing process for the motor cores, or any similar type device which may benefit from a material having domains with insulated boundaries as will be described in greater detail below. The stator winding cores of an electric motor may be fabricated using the system and method of one or more embodiments of this invention. System 10 may be a single-step net-shape fabrication process which preferably uses droplet spray deposition subsystem 12 and reactive atmosphere introduced by port 24 to facilitate controlled formation of insulation layers 30 on the surfaces of droplets 16, as discussed above with reference to FIGS. 1-7.

The material chosen to form droplets 16 makes material 32 highly permeable with low coercivity and high saturation induction. Boundaries 36, FIGS. 5A-5B may somewhat deteriorate the capability of material 32 to provide good magnetic paths. However, because boundaries 36 may be very thin, e.g., about 0.05 µm to about 5.0 µm, and because material 32 may be very dense, this deterioration is relatively small. This, in addition to the low cost of making material 32, is another advantage over conventional SMC, discussed in the Background Section above, which have larger gaps between individual grains as the mating surfaces of neighboring grains of metal powder in SMC do not match perfectly. Insulation boundaries 36 limit electrical conductivity between neighboring domains 34. Material 32 provides a superior magnetic path due to its permeability, coercivity and saturation characteristics. The limited electrical conductivity of material 30 minimizes eddy current losses associated with rapid changes of the magnetic field as the motor rotates.

Hybrid-field geometries of electric motors may be developed using material 32 with domains 34 with insulated boundaries 36. Material 32 may eliminate design constraints associated with anisotropic laminated cores of conventional motors. The system and method of making material 32 of one or more embodiments of this invention may allow for the motor cores to accommodate built-in cooling passages and togging reduction measures. Efficient cooling is essential to increase current density in the windings for high motor output, e.g., in electric vehicles. Cogging reduction measures are critical for low vibration in precision machines, including substrate-handling and medical robots.

System 10 and method of making material 32 of one or more embodiments of this invention may utilize the most recent developments in the area of uniform-droplet spray (UDS) deposition techniques. The UDS process is a way of rapid solidification processing that exploits controlled capillary atomization of molten jet into mono-size uniform droplets. See, e.g., Chun, J.-H., and Passow, C H., Production of Charged Uniformly Sized Metal Droplets, U.S. Pat. No. 5,266,098, 1992, and Roy, S., and Ando T., Nucleation Kinetics and Microstructure Evolution of Traveling ASTM F75 Droplets, Advanced Engineering Materials, Vol. 12, No. 9, pp. 912-919, September 2010, both incorporated by reference herein. The UDS process can construct objects droplet by droplet as the uniform molten metal droplets are densely deposited on a substrate and rapidly solidified to consolidate into compact and strong deposits.

In a conventional UDS process, metal in a crucible is melted by a heater and ejected through an orifice by pressure applied from an inert gas supply. The ejected molten metal forms a laminar jet, which is vibrated by a piezoelectric transducer at a specified frequency. The disturbance from the vibration causes a controlled breakup of the jet into a stream of uniform droplets. A charging plate may be utilized in some applications to electrically charge the droplets so that they repel each other, preventing merging.

System 10 and method of making material 32 may use the fundamental elements of the conventional UDS deposition processes to create droplets 16, FIGS. 1-4, 6 and 7, which have a uniform diameter. Droplet spray subsystem 12, FIG. 1, may use a conventional UDS process that is combined with simultaneous formation of insulation layer 30 on the surface of the droplets 16 during their flight to produce dense material 32 with a microstructure characterized by small domains of substantially homogeneous material with insulation boundaries that limit electrical conductivity between neighboring domains. The introduction of a gas 26, e.g., reactive atmosphere or similar type gas, for simultaneous formation of the insulation layer on the surface of the droplets adds the features of simultaneously controlling the structure of the substantially homogeneous material within the individual domains, the formation of the layer on the surface of the particles (which limits electric conductivity between neighboring domains in the resulting material), and breakup of the layer upon deposition to provide adequate electric insulation while facilitating sufficient bonding between individual domains.

Thus far, system 10 and the methods thereof forms an insulation layer on in-flight droplets to form a material having domains with insulated boundaries. In another disclosed embodiment, system 310, FIG. 8, and the method thereof forms the insulation layer on droplets which have been deposited on a surface or substrate to form a material having domains with insulated boundaries. System 310 includes droplet spray subsystem 312 configured to create and eject molten alloy droplets 316 from orifice 322 and direct molten alloy droplets 316 towards surface 320. Here, droplet spray subsystem 312 ejects molten alloy droplets into spray chamber 318. In alternate aspects, spray chamber 318 may not be required as discussed in further detail below.

Droplet spray subsystem 312 may include crucible 314 which creates molten alloy droplets 316 and directs molten alloy droplets 316 towards surface 320 inside spray chamber 318. Here, crucible 314 may include heater 342 which forms molten alloy 344 in chamber 346. The material used to make molten alloy 344 may have a high permeability, low coercivity and high saturation induction. In one example, molten alloy 344 may be made from a magnetically soft iron alloy, such as iron-base alloy, iron-cobalt alloy, nickel-iron alloy, silicon iron alloy, ferritic stainless steel or similar type alloy. Chamber 346 receives inert gas 347 via port 345. Here, molten alloy 344 is ejected through orifice 322 due to the pressure applied from inert gas 347 introduced via port 345. Actuator 350 with vibration transmitter 351 vibrates a jet of molten alloy 344 at a specified frequency to break up molten alloy 344 into stream of droplets 316 which are ejected through orifice 322. Crucible 314 may also include temperature sensor 348. Although as shown crucible 314 includes one orifice 322, in other examples, crucible 314 may have any number of orifices 322 as needed to accommodate higher deposition rates of droplets 316 on surface 320, e.g., up to 100 orifices or more. Molten alloy droplets 316 are ejected from orifice 322 and directed toward a surface 320 to form substrate 512 thereon as will be discussed in greater detail below.

Surface 320 is preferably moveable, e.g., using stage 340, which may be an X-Y stage, a turn table, a stage that can additionally change the pitch and roll angle of surface 320, or any other suitable arrangement that can support substrate 512 and/or move substrate 512 in a controlled manner as it is formed. In one example, system 310 may include a mold (not shown) that is placed on surface 320 to which substrate 512 fills the mold.

System 310 also may include one or more spray nozzles, e.g., spray nozzle 500 and/or spray nozzle 502, configured to direct agent at substrate 512 of deposited droplets 316 and create spray 506 and/or spray 508 of agent 504 that is directed onto or above surface 514 of substrate 512. Here, spray nozzle 500 and/or spray nozzle 502 are coupled to spray chamber 318. Spray 506 and/or spray 508 may form the insulating layer on surface of deposited droplets 316 before or after droplets 316 are deposited on substrate 512, either by directly forming the insulating layer on droplets 316 or by facilitating, participating, and/or accelerating a chemical reaction that forms the insulating layer on the surface of droplets 316 deposited on surface 320.

For example, spray 506, 508 of agent 504 may be used to facilitate, participate, and/or accelerate a chemical reaction that forms insulation layers on deposited droplets 316 that form substrate 512 or that are subsequently deposited on substrate 512. For example, spray 506, 508 may be directed at substrate 512, FIG. 9, indicated at 511. In this example, spray 506, 508 facilitates, accelerates, and/or participates in a chemical reaction with substrate 512 (and subsequent layers of deposited droplets 316 thereon) to form insulating layer 530 on the surface of deposited droplets 316 as shown. As subsequent layers of droplets 316 are deposited, spray 506, 508 facilitates, accelerates and/or participates, a chemical reaction to form and insulation layers 330 on the subsequent deposited layers of droplets, e.g., as indicated at 513, 515. Material 332 is created having domains 334 with insulated boundaries 336 there between.

Figure 9:
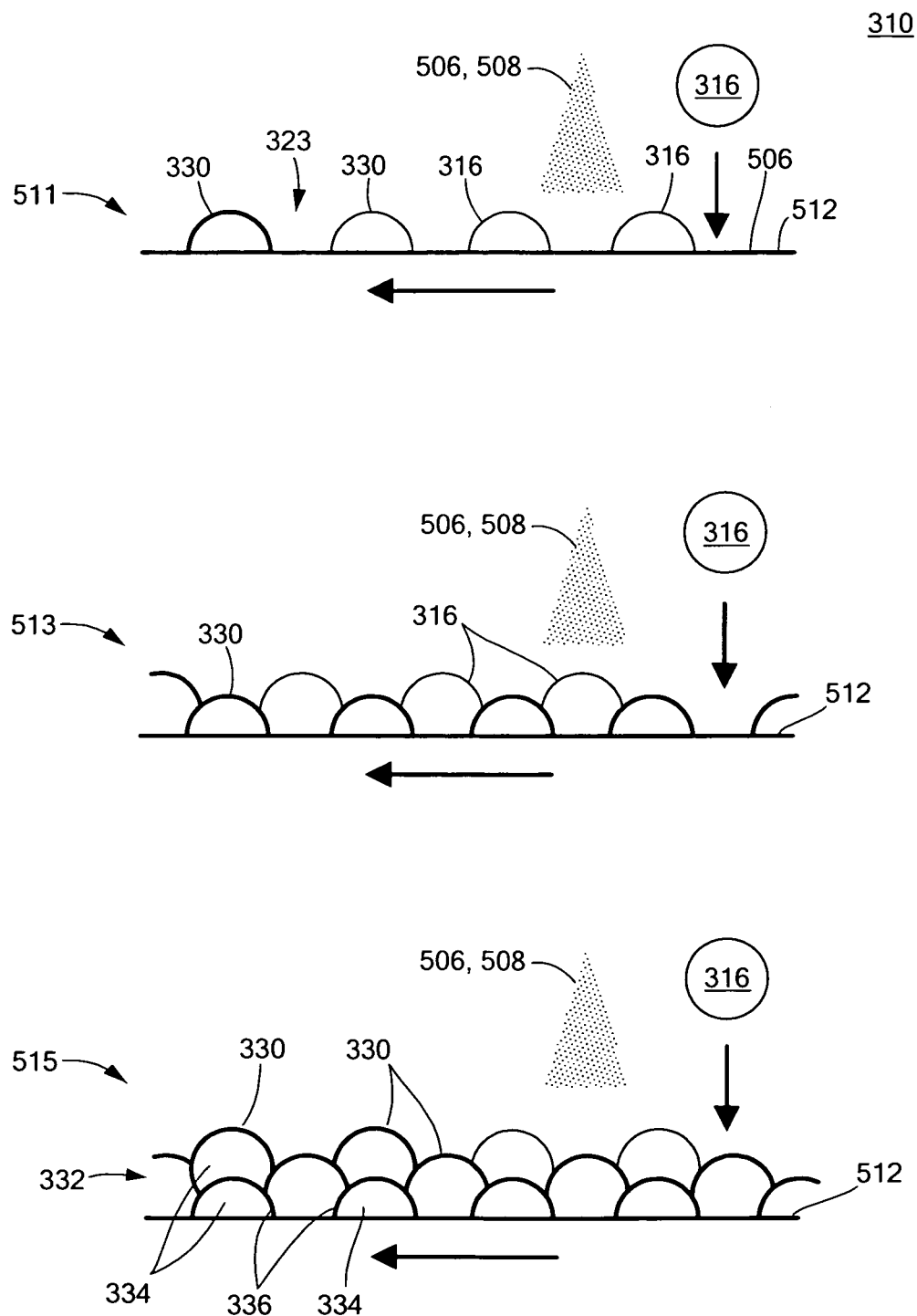
FIG. 9 is a side-view showing one example of the formation of a material having domains with insulated boundaries associated with the system shown in FIG. 8.
Figure 10A:
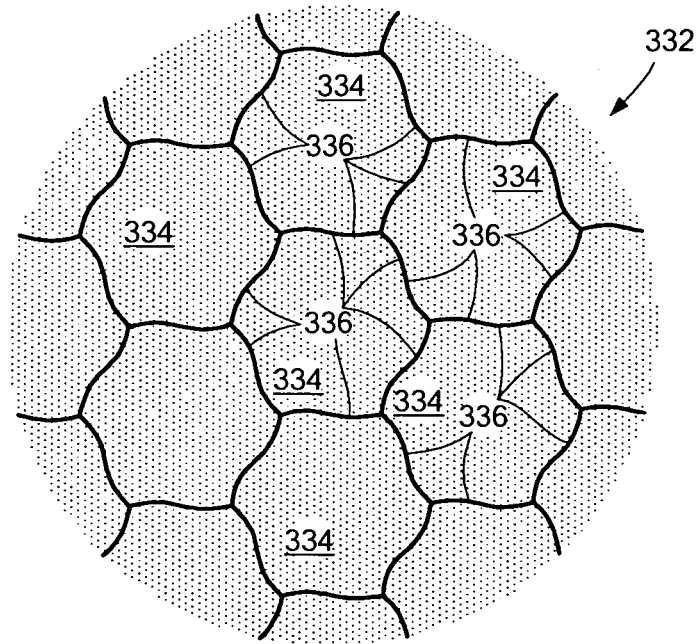
FIG. 10A is a schematic diagram of one embodiment of the material having domains with insulated boundaries created using the system and method of one or more embodiments.
Figure 10B:
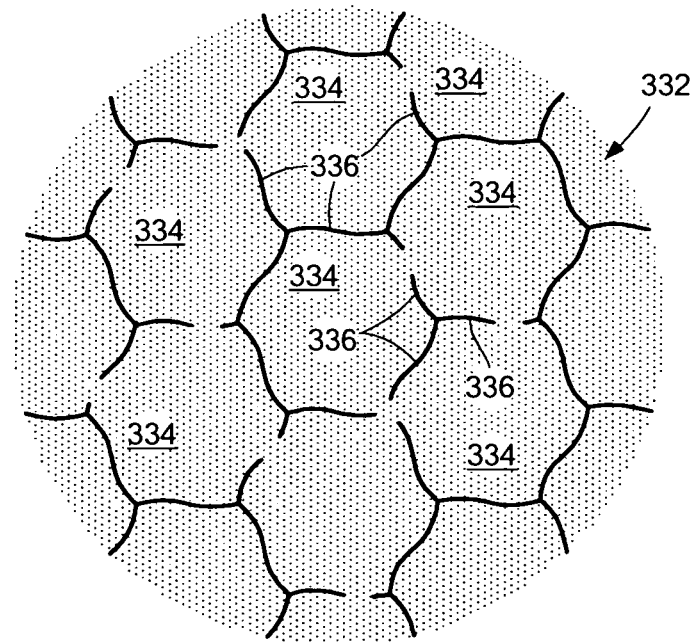
FIG. 10B is a schematic diagram of another embodiment of the material having domains with insulated boundaries created using the system and method of one or more embodiments.

FIG. 10A shows one example of material 332 that includes domains 334 with insulated boundaries 336 there between created using one embodiment of system 310 discussed above with reference to one or more of FIGS. 8 and 9. Insulated boundaries 336 are formed from insulation layer 330, FIG. 9, on droplets 316. In one example, material 332, FIG. 10A, includes boundaries 336 between neighboring domains 334 which are virtually perfectly formed as shown. In other examples, material 332, FIG. 10B, may include boundaries 336' between neighboring domains 334 with discontinuities as shown. Material 332. FIGS. 9, 10A and 10B, reduces eddy current losses, and discontinuities boundaries 336 between neighboring domains 334 improve the mechanical properties of material 332. The result is that material 332 may preserve a high permeability, a low coercivity and a high saturation induction of the alloy. Boundaries 336 limit electrical conductivity between neighboring domains 334. Material 332 provides a superior magnetic path due to its permeability, coercivity and saturation characteristics. The limited electrical conductivity of material 332 minimizes eddy current losses associated with rapid changes of the magnetic field as a motor rotates. System 310 and the method thereof may be a single step, fully automated process which saves time and money and produces virtually no waste.

Figure 8:
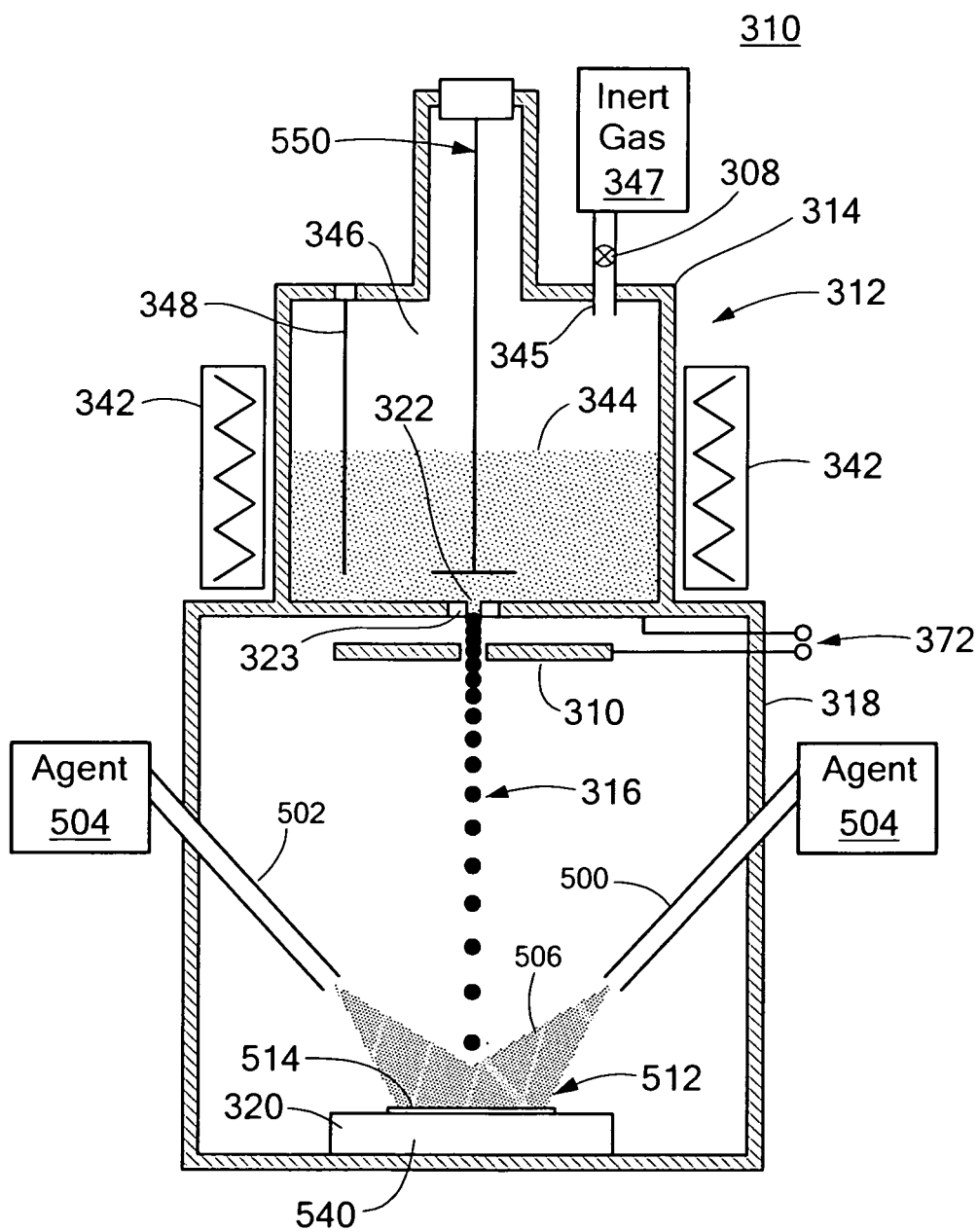
FIG. 8 is a schematic block diagram showing the primary components of one embodiment of the system and method for making a material having domains with insulated boundaries.
Figure 11:
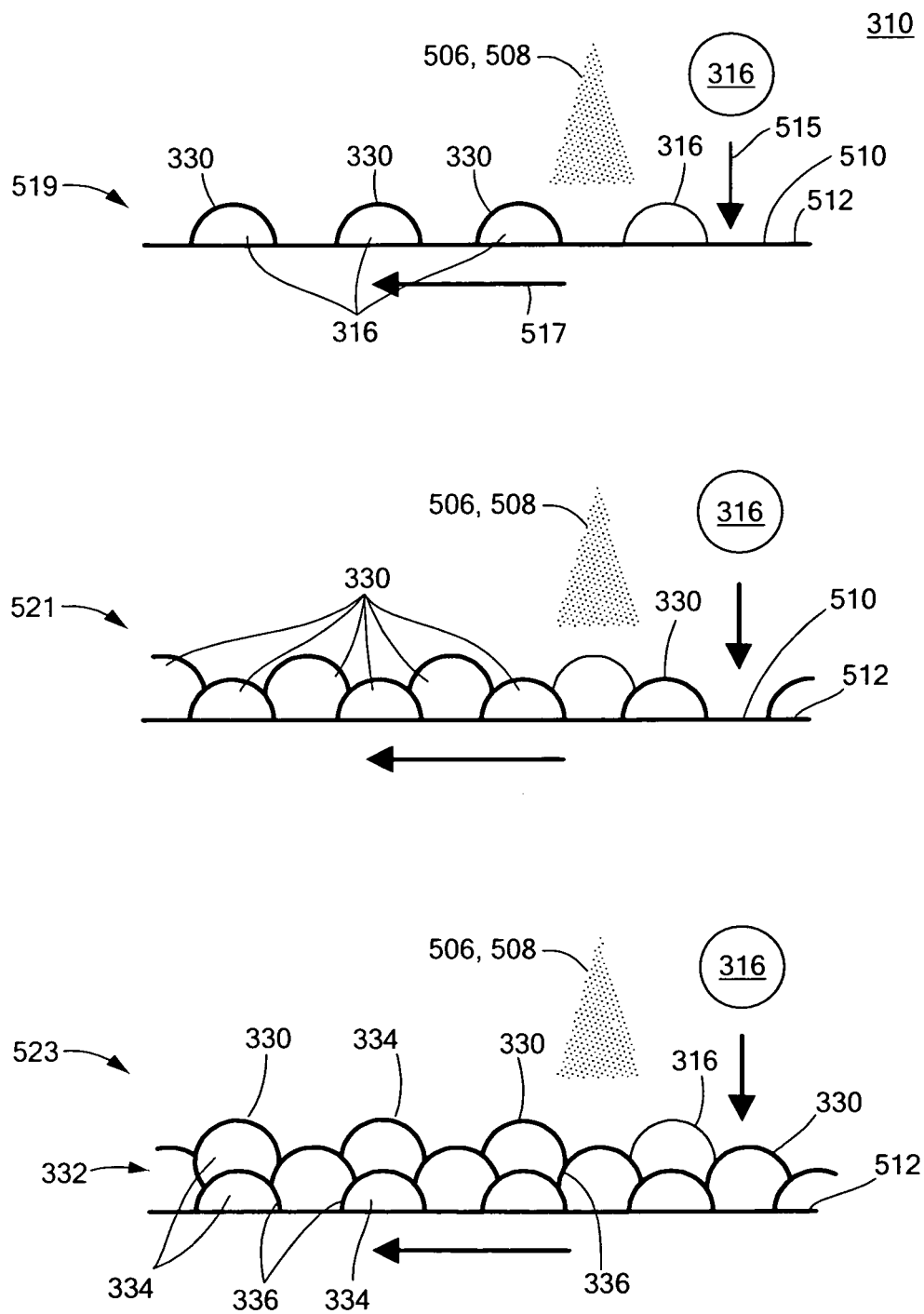
FIG. 11 is a side-view showing one example of the formation of a material having domains with insulated boundaries associated with the system shown in FIG. 8.

FIG. 11 shows one embodiment of system 310, FIG. 8, wherein spray 506, 508, instead of facilitating, participating, and/or accelerating a chemical reaction to form insulation layer as shown in FIG. 9 directly forms insulation layers 330, FIG. 8, on deposited droplets 316 on substrate 512. In this example, substrate 512, is moved, e.g., in the direction indicated by arrow 517, using stage 340, FIG. 8. Spray 506, 508, FIG. 11, is then directed at deposited droplets 316 on substrate 512, indicated at 519. Insulation layer 330 then forms on each of the deposited droplets 316 as shown. As subsequent layers of droplets 316 are deposited, indicated at 521, 523, spray 506, 508 of agent 504 is sprayed thereon to directly create insulation layer 330 on each of the deposited droplets of each new layer. The result is material 332 is created which includes domains 334 with insulated boundaries 336, e.g., as discussed above with reference to FIGS. 9-10B.

Figure 12:
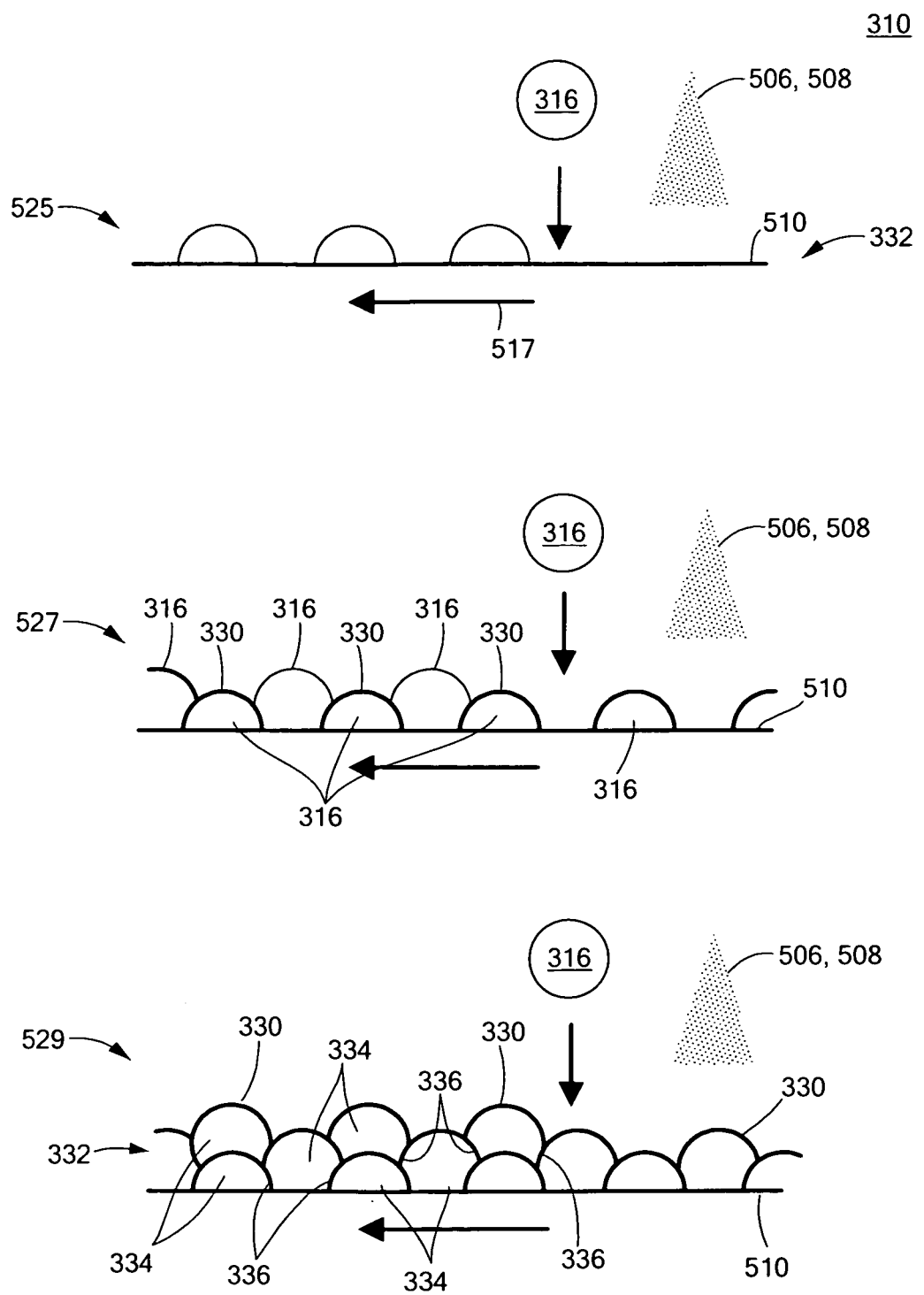
FIG. 12 is a side-view showing one example of the formation of a material having domains with insulated boundaries associated with the system shown in FIG. 8.

FIG. 12 shows one example of system 310, FIG. 8, wherein spray 506, 508, FIG. 12, is sprayed on substrate 512 to form an insulation layer thereon before droplets 316 are deposited, indicated at 525. Thereafter, spray 506, 508 may be directed at subsequent layers of deposited droplets 316 on substrate 512 to insulation layer 330 indicated at 527, 529. The result is material 332 is created which includes domains 334 with insulated boundaries 336, e.g., as discussed above with reference to FIGS. 10A-10B.

Insulating layer 330 on deposited droplets 16 may be formed by a combination of any of the processes discussed above with reference to one or more of FIGS. 8-12. The two processes may take place in sequence or simultaneously.

In one example, agent 504 that creates spray 506 and/or spray 508, FIGS. 8-12, may be ferrite powder, a solution containing ferrite powder, an acid, water, humid air or any other suitable agent involved in the process of producing an insulating layer on the surface of the substrate.

Figure 13:
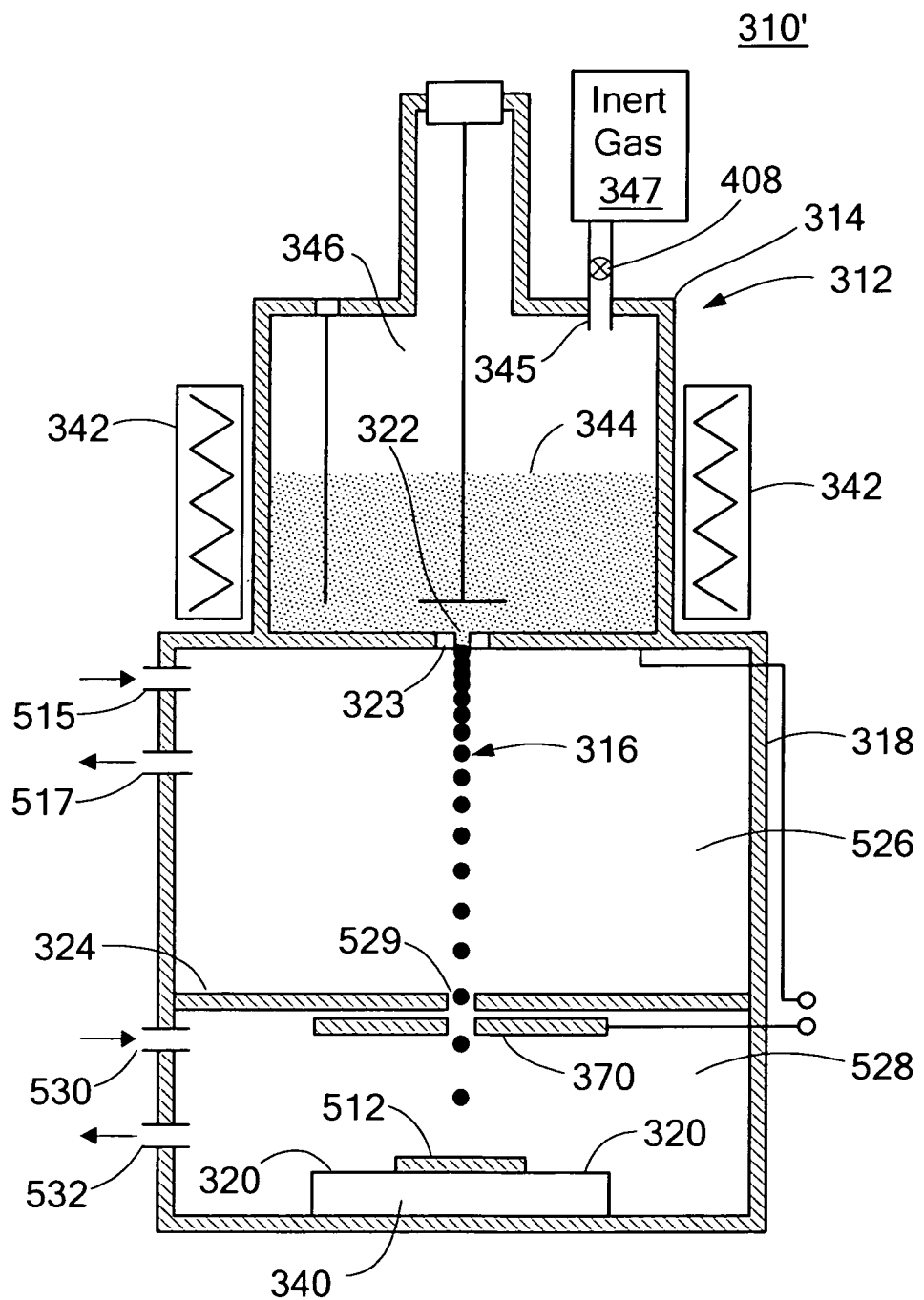
FIG. 13 is a schematic block diagram showing the primary components of another embodiment of the system and method for making a material having domains with insulated boundaries.

System 310', FIG. 13, where like parts have like numbers, preferably includes chamber 318 with separation barrier 524 that creates sub-chambers 526 and 528. Separation barrier 524 preferably includes opening 529 configured to allow droplets 316, e.g. droplets of molten alloy 344 or similar type material, to flow from sub-chamber 526 to sub-chamber 528. Sub-chamber 526 may include gas inlet 528 and gas exhaust 530 configured to maintain a predetermined pressure and gas mixture in sub-chamber 226, e.g., a substantially neutral gas mixture. Sub-chamber 528 may include gas inlet 530 and gas exhaust 532 configured to maintain predetermined pressure and gas mixture in sub-chamber 528, e.g., as substantially reactive gas mixture.

Figure 14:
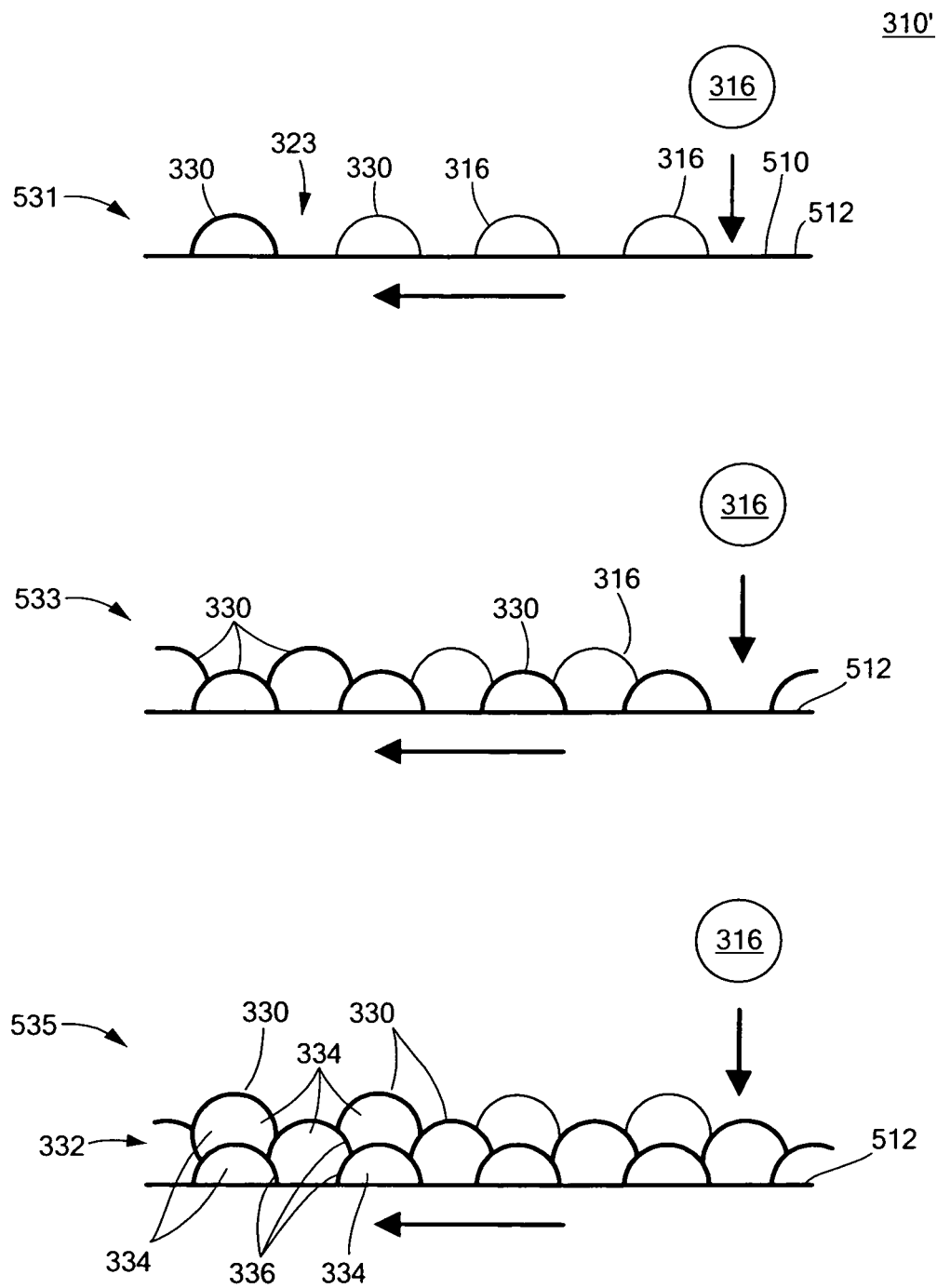
FIG. 14 is a side-view showing one example of the formation of a material having domains with insulated boundaries associated with the system shown in FIG. 13.

The predetermined pressure in sub-chamber 526 may be higher than the predetermined pressure in sub-chamber 528 to limit the flow of gas from sub-chamber 526 to sub-chamber 528. In one example, the substantially neutral gas mixture in sub-chamber 526 may be utilized to prevent reaction with droplets 316 with orifice 322 on the surface of droplets 316 before they land on the surface of substrate 512. The substantially reactive gas mixture in sub-chamber 528 may be introduced to participate, facilitate and/or accelerate in a chemical reaction with substrate 512, and subsequent layers of deposited droplets 316, to form an insulating layer 330 on deposited droplets 316. For example, insulating layer 330, FIG. 14, may be formed on deposited droplets 316 after they land on substrate 512. The deposited droplets 316 react with the reactive gas in sub-chamber 528, FIG. 13 which facilitates, participates, and/or accelerates a chemical reaction to create insulation layer 330 indicated at 531. As subsequent layers of droplets are added, the gas in sub-chamber 528 may facilitate, participates, and/or accelerates a reaction with droplets 316 to create insulation layers 330 on substrate 512, indicated at 533 and 535. Material 332 having domains 334 with insulated boundaries 336 there between is then formed, e.g., as discussed above with reference to FIGS. 10A-10B.

Figure 15:
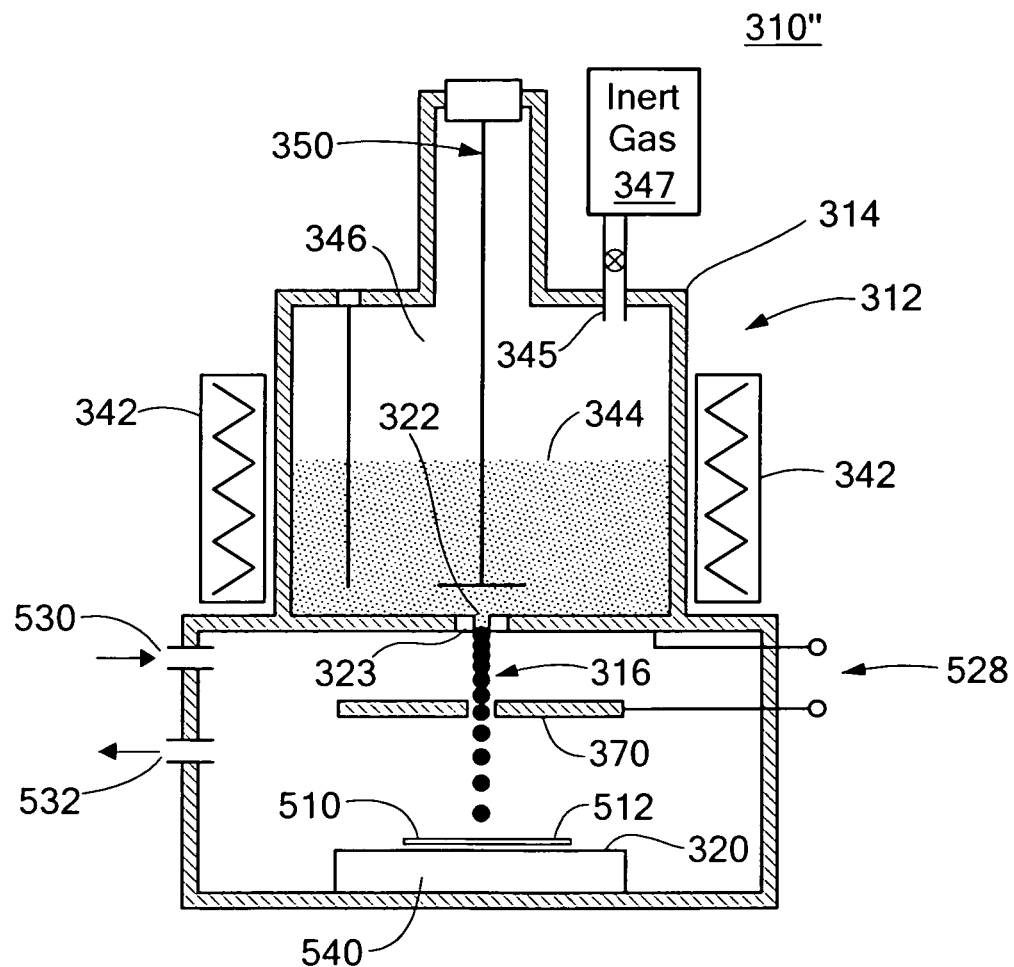
FIG. 15 is a schematic block diagram showing the primary components of yet another embodiment of the system and method for making a material having domains with insulated boundaries.

System 310", FIG. 15, where like parts have like numbers, preferably includes chamber 314 with only one chamber 528. In this design, droplets 316 are directed directly into chamber 528 which is preferably designed to minimize the travel distance of droplets 316 between orifice 322 and surface 510 of substrate 512. This preferably limits the exposure of droplets 316 to the substantially reactive gas mixture in sub-chamber 528. System 310" creates material 332 in a similar manner to system 310', FIG. 14.

For the deposition process of droplets 316, system 310, FIGS. 8-9 and 11-15 provides for moving substrate 512 on surface 320 of stage 340 with respect to the stream of droplets 316 ejected from the crucible 314 or similar type device. System 310 may also provide for deflecting droplets 316, for example, with magnetic, gas flow or other suitable deflection system. Such deflection may be used alone or in combination with stage 340. In either case, droplets 316 are deposited in a substantially discrete manner, i.e., two consecutive droplets 316 may exhibit limited or no overlap upon deposition. As an example, the following relationship may be satisfied for discrete deposition in accordance with one or more embodiment of system 310:

$$v_l \times \frac{1}{f} - d_s > 0 \qquad (1)$$

where $v_l$ is speed of substrate, f is frequency of deposition, i.e., frequency of ejection of droplets 316 from crucible 314, and $d_s$ is diameter of splat formed by a droplet after landing on the surface of the substrate.

Figure 16:
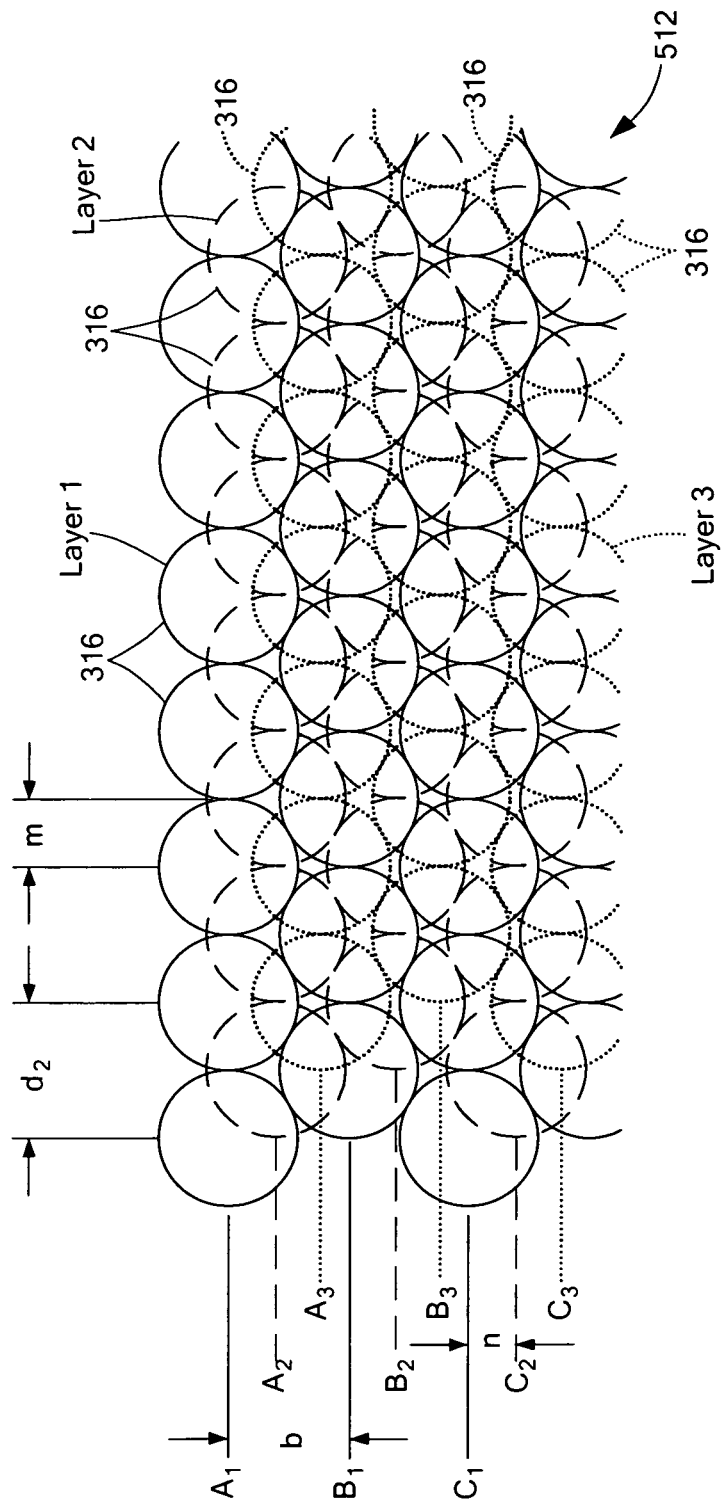
FIG. 16 is schematic top-view showing one example of the discrete deposition process of droplets associated with the system shown in one or more of FIGS. 8-15.

Examples of the one or more aspects of the disclosed embodiment of system 310 performing discrete deposition of droplets 316 are shown in one or more of FIGS. 8-9 and 11-15. In one embodiment, the relative motion of substrate 512 with respect to the stream of droplets 316 may be controlled so that discrete deposition across an area of a substrate is achieved, e.g., as shown in FIG. 16. The following relationships may be used for this example of the deposition process of droplets 316:

$$d_s = v_l \times \frac{1}{f} \qquad (2)$$

$$b = d_s \text{Cos}(30deg) \qquad (3)$$

$$m = \frac{d_s}{2} \qquad (4)$$

$$n = \frac{d_s}{2} \text{Tan}(30deg) \qquad (5)$$

where $d_s$ and b represent spacing of first layer created by droplets 316 and m and n are offsets to each consecutive layer of droplets 316.

In the example shown in FIG. 16, the motion of substrate 512 on stage 340, FIGS. 8, 13 and 15 may be controlled so that rows A, B and C, FIG. 16, are deposited consecutively in a discrete manner. For example, rows $A_1$, $B_1$, $C_1$ may represent the first layer, indicated as Layer 1, rows $A_2$, $B_2$, $C_2$ may represent the second layer, indicated as Layer 2, and rows $A_3$, $B_3$, $C_3$ may represents the third layer, indicated by Layer 3 of the deposited droplets 316. In the pattern shown in FIG. 16, the layer arrangement may repeat itself after the third layer, i.e., the layer following Layer 3 will be identical in spacing and positioning as Layer 1. Alternatively, the layers may repeat after every second layer. Alternately, any suitable combination of layers or patterns may be provided.

Figure 17:
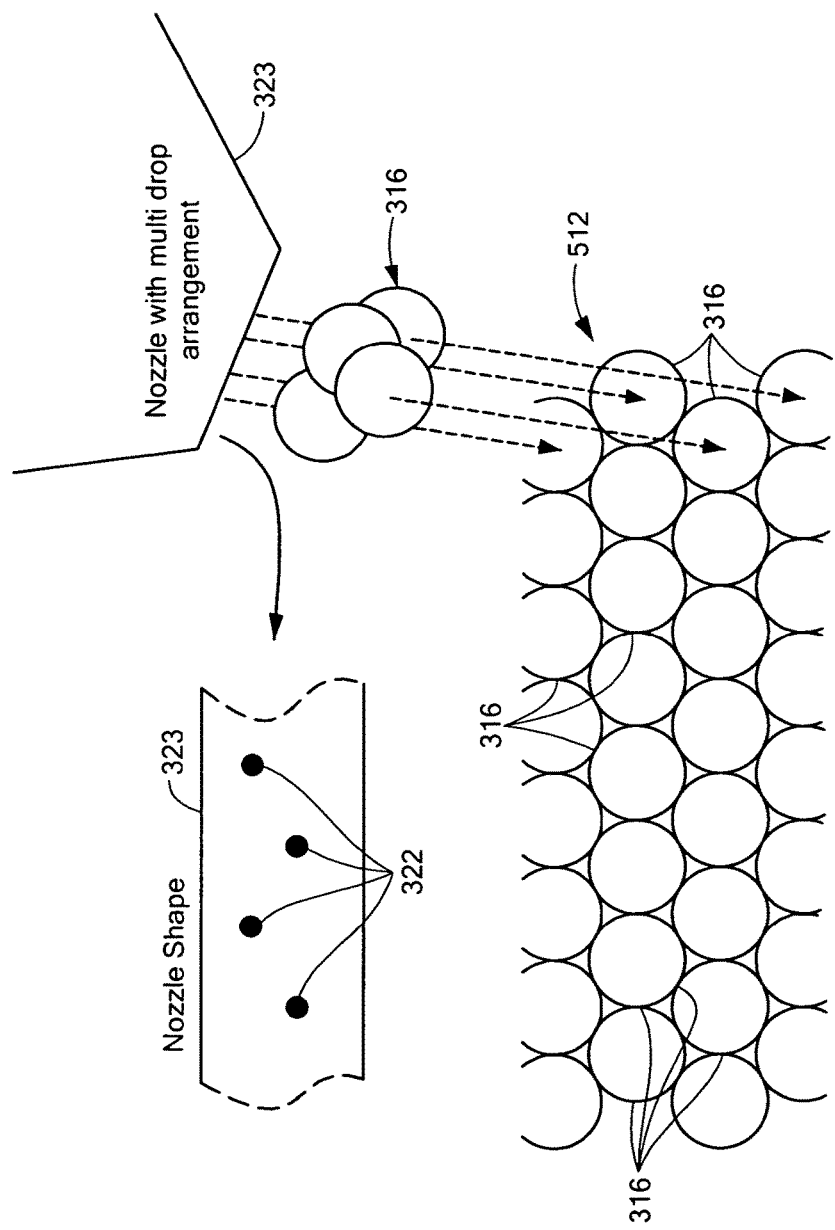
FIG. 17 is a schematic side-view showing one example of a nozzle for the system shown in one or more of FIGS. 8-15 which includes a plurality of orifices.

System 310, FIGS. 8, 13 and 15, may include nozzle 323 having plurality of spaced orifices, e.g., spaced orifices 322, FIG. 17, employed to deposit multiple rows of droplets 316 simultaneously to achieve higher deposition rates. As shown in FIGS. 16 and 17, the deposition process of droplets 316 discussed above may result in material 332 having domains with insulated boundaries there between, discussed in detail above.

Figure 18:
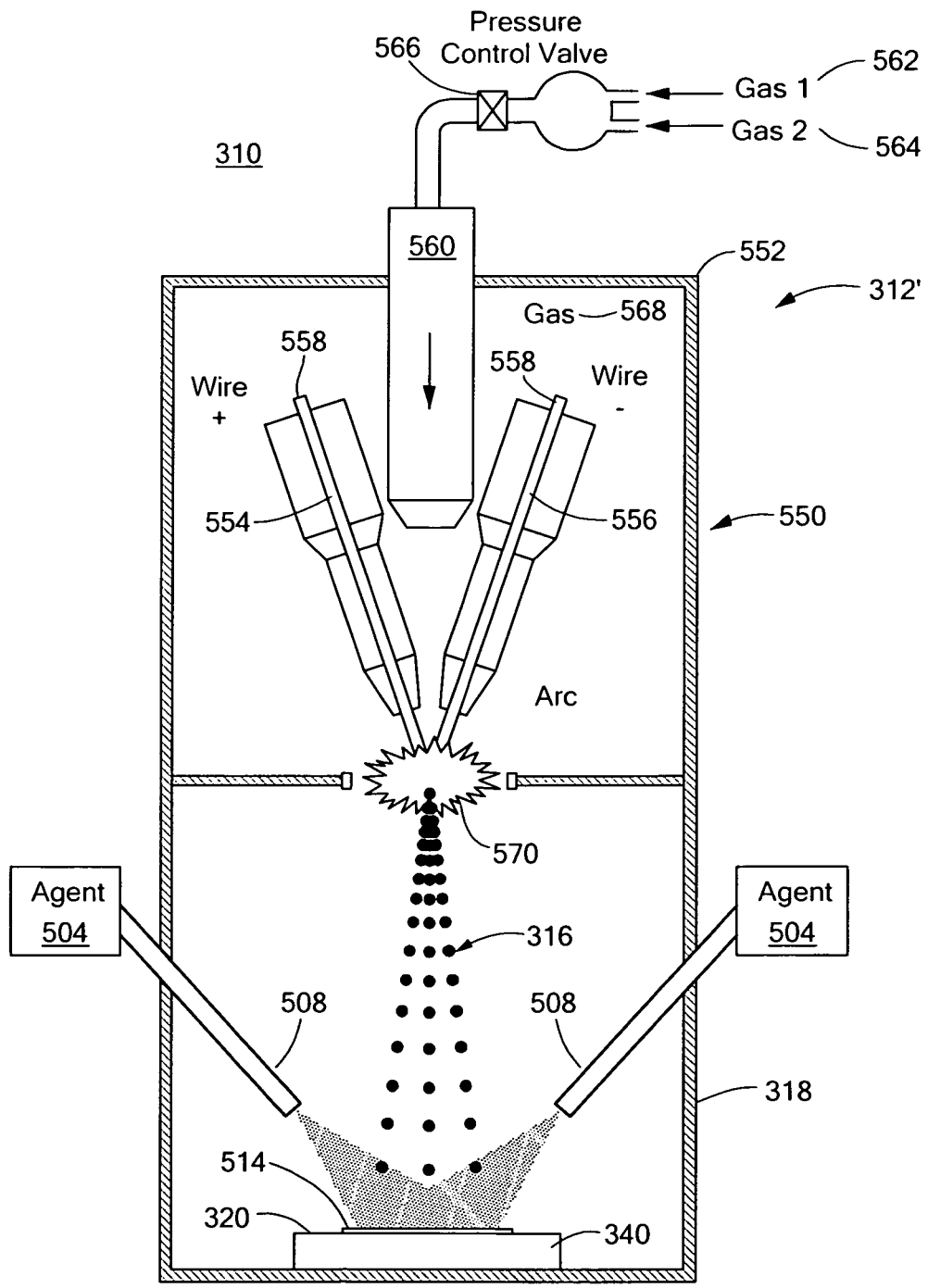
FIG. 18 is a schematic side-view showing another embodiment of the droplet spray subsystem shown in one or more of FIGS. 8-15.

Although as discussed above with reference to FIGS. 8, 13 and 15, droplet spray subsystem 312 is shown having crucible 314 configured to eject molten alloy droplets 316 into spray chamber 318, this is not a necessary limitation of the disclosed embodiment. System 310, FIG. 18, where like parts have been given like numbers, may include droplet spray subsystem 312'. In this example, droplet spray subsystem 312' preferably includes wire arc droplet spray subsystem 550 which creates molten alloy droplets 316 and directs molten alloy droplets 316 towards surface 320 inside spray chamber 318. Wire arc droplet spray subsystem 550 also preferably includes chamber 552 which houses positive wire arc wire 554 and negative arc wire 556. Alloy 558 may be disposed in each of arc wires 554 and 556. In one aspect, alloy 558 used to create droplets 316 sprayed toward substrate 512 may be composed mainly of iron (e.g., greater than about 98%) with very low amount of carbon, sulfur, and nitrogen content, (e.g., less than about 0.005%) and may include minute quantities of Al and Cr (e.g., less than about 1%) with the balance, in this example, being Si to achieve good magnetic properties. The metallurgical composition may be tuned to provide improvements in the final properties of the material having domains with insulated boundaries. Nozzle 560 is shown configured to introduce one or more gases 562 and 564, e.g., ambient air, argon, and the like, to create gas 568 inside chamber 552 and chamber 318. Preferably, pressure control valve 566 controls the flow of one or more of gases 562, 564 into chamber 552.

In operation, the voltage applied to positive arc wire 554 and negative arc wire 556 creates arc 570 which causes alloy 558 to form molten alloy droplets 316, which are directed towards surface 320 inside chamber 318. In one example, voltages between about 18 and 48 volts and currents between about 15 to 400 amperes may be applied to positive arc wire 554 and negative arc wire 556 to provide a continuous wire arc spray process of droplets 316. The deposited molten droplets 316 may react on the surface with surrounding gas 568, also shown in FIGS. 19-20, to develop a non-conductive surface layer on deposited droplets 316. This layer may serve to suppress eddy current losses in material 332, FIGS. 10A-10B, having domains with insulated boundaries. For example, surrounding gas 568 may be atmospheric air. In this case, oxide layers may form on iron droplets 316. These oxide layers may include several chemical species, including, e.g., FeO, $Fe_2O_3$, $Fe_3O_4$, and the like. Among these species, FeO and $Fe_2O_3$ may have resistivities eight to nine orders of magnitude higher than pure iron. In contrast, $Fe_3O_4$ resistivity may be two to three orders of magnitude higher than iron. Other reactive gases may also be used to produce other high resistivity chemical species on the surface. Simultaneously or separately, an insulating agent may be co-sprayed, e.g., as discussed above with reference to one or more of FIGS. 8-9 and 11-15 during the metal spray process to promote higher resistivity, e.g., a lacquer or enamel. The co-spray may promote or catalyze a surface reaction.

Figure 19:
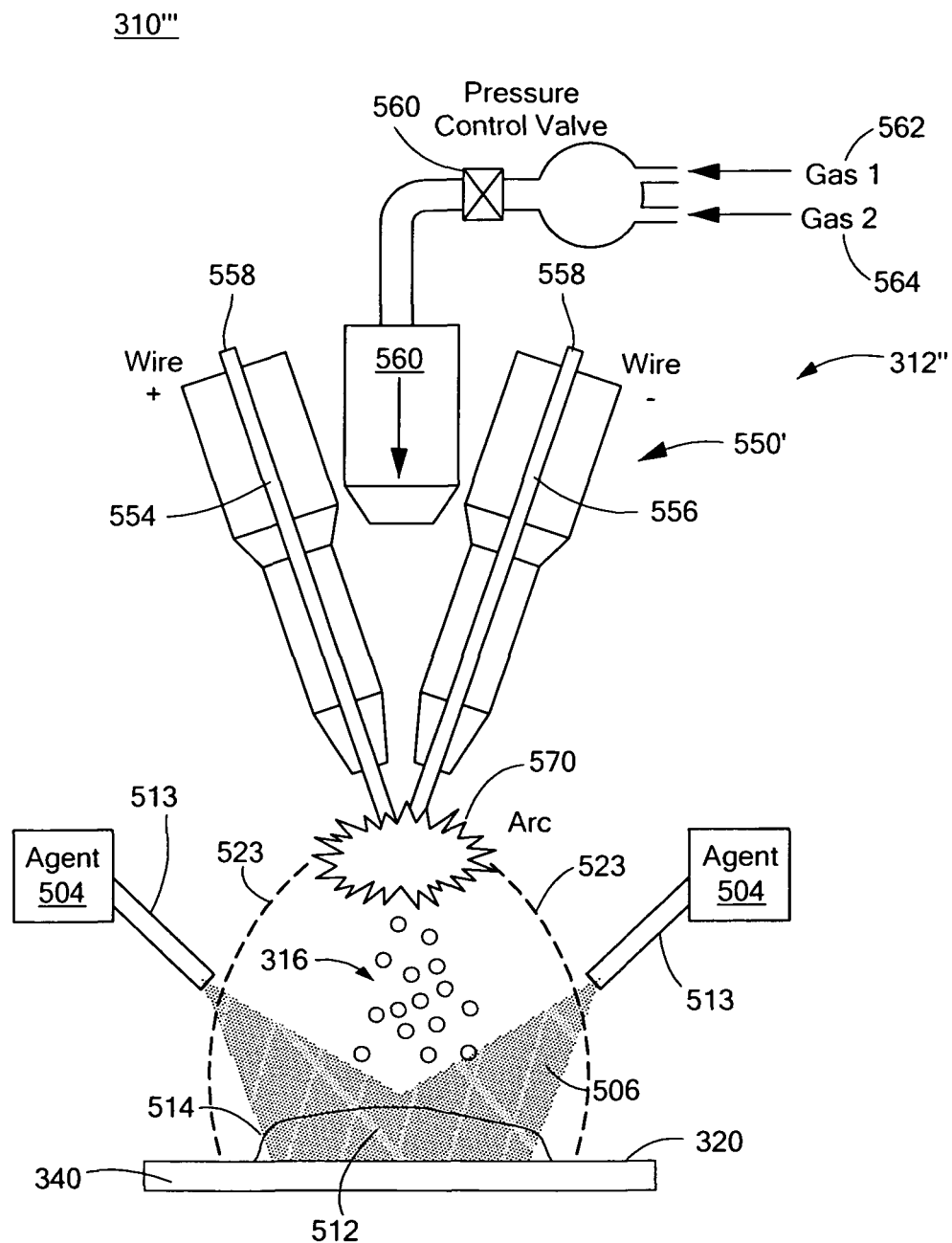
FIG. 19 is a schematic block diagram showing the primary components of yet another embodiment of the system and method for making a material having domains with insulated boundaries.

In another example, system 310', FIG. 19, where like parts have been given like numbers, includes droplet spray subsystem 312". Subsystem 312" includes wire arc deposition subsystem 550' that creates molten alloy droplets 316 and directs molten alloy droplets 316 towards surface 320. In this example, droplet spray subsystem 312" does not include chamber 552, FIG. 18, and chamber 318. Instead, nozzle 560, FIG. 19, is configured to introduce one or more gases 562, 564 to create gas 568 in the area proximate positive arc wire 554 and negative arc wire 556. Gas 568 propels droplets 316 toward surface 514. Spray 506 and/or spray 508 of agent 504 is then directed onto or above surface 514 of substrate 512, having deposited droplets 316 thereon, e.g., using spray nozzle 513, similar as discussed above. In this design, a shroud, e.g., shroud 523, may be surround spray 506 and/or spray 508 of agent 504 and droplets 316 which are deposited on substrate 512.

Figure 20:
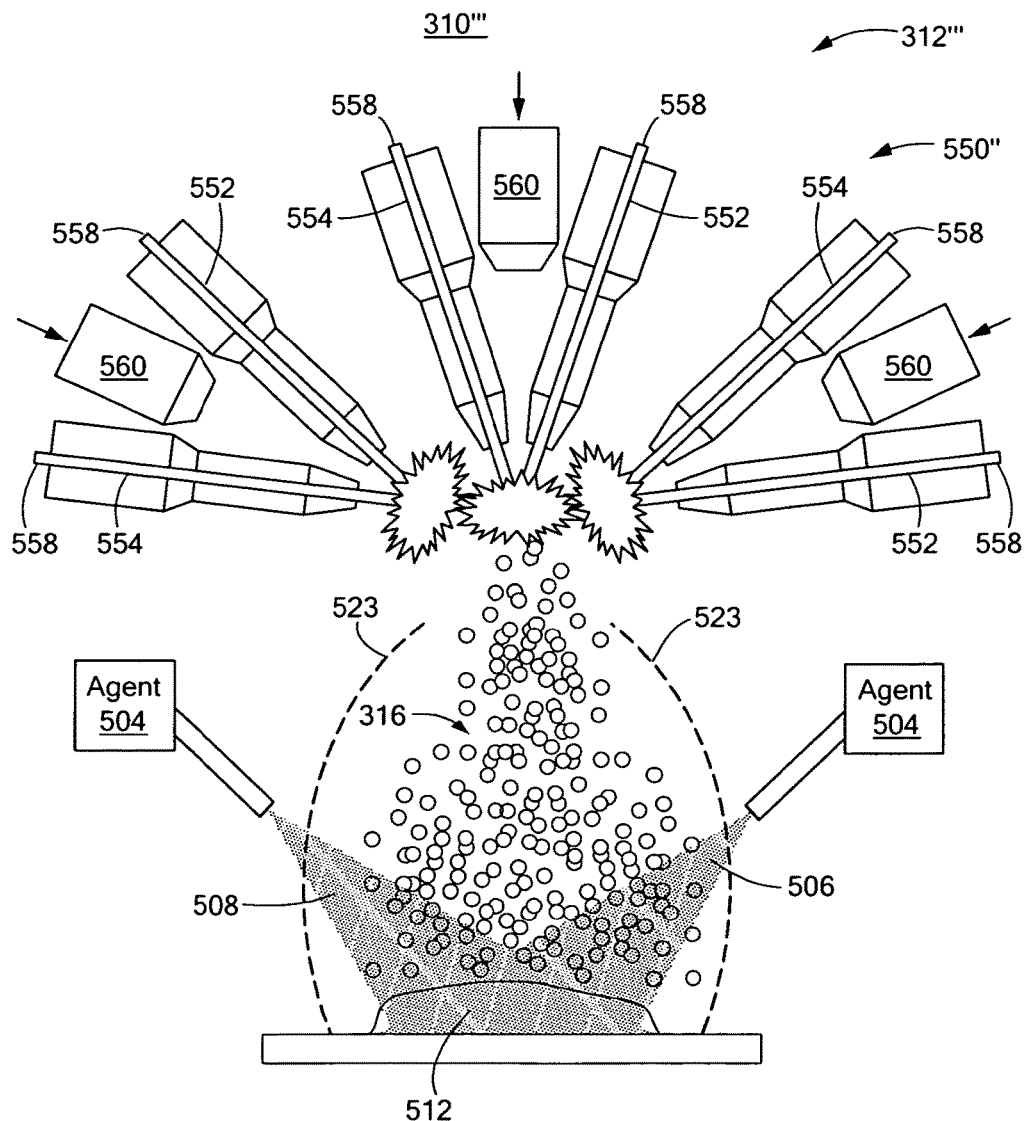
FIG. 20 is a schematic block diagram showing the primary components of yet another embodiment of the system and method for making a material having domains with insulated boundaries.

System 310''', FIG. 20, where like parts have been given like numbers, is similar to system 310", FIG. 19, except wire arc spray subsystem 550" includes a plurality of positive arc wire 554, negative arc wires 556 and nozzles 560 which may be used simultaneously to achieve higher spray deposition rates of molten alloy droplets 316. Wire arcs 254, 256, and similar deposition devices, may be provided in different directions to form the material having domains of insulated boundaries. Spray 506 and/or spray 508 of agent 504 is directed onto or above surface 514 of substrate 512, similar as discussed above with reference to FIG. 19. Here, a shroud, e.g., shroud 523, may surround spray 506 and/or spray 508 of agent 504 and droplets 316 deposited on substrate 512.

In other examples, droplet spray subsystem 312 shown in one or more of FIGS. 8-19 may include one or more of a plasma spray droplet deposition subsystem, a detonation spray droplet depositions subsystem, a flame spray droplet deposition subsystem, a high velocity oxygen fuel spray (HVOF) droplet deposition subsystem, a warm spray droplet deposition subsystem, a cold spray droplet deposition subsystem, and a wire arc droplet deposition subsystem, each configured to form the metal alloy droplets and direct the molten alloy droplets towards surface 320.

Wire arc spray droplet deposition subsystem 550, FIGS. 19-20, may form the insulating boundaries by controlling and facilitating one or more of the following spray parameters: wire speed, gas pressure, shroud gas pressure, spraying distance, voltage, current, speed of substrate motion, and/or the speed of arc tool movement. One or more of the following process choices may also be optimized to attain improved structure and properties of the material having domains with insulated boundaries: composition of wires, composition of shroud gas/atmosphere, preheating or cooling of atmosphere and/or substrate, in process cooling and/or heating of substrate and/or part. A composition of two or more gases may be employed in addition to pressure control to improve process outcomes.

Droplet spray subsystem 312, FIGS. 8, 13, 15, 18, 19, and 20 may be mounted on a single or plurality of robotic arms and/or mechanical arrangements so as to improve part quality, reduce spray time, and improve process economics. The subsystems may spray droplets 316 simultaneously at the same approximate location or may be staggered so as the spray a certain location in a sequential manner. Droplet spray subsystem 312 may be controlled and facilitated by controlling one or more of the following spray parameters: wire speed, gas pressure, shroud gas pressure, spraying distance, voltage, current, speed of substrate motion, and/or the speed of arc tool movement.

In any aspect of the disclosed embodiments discussed above, the overall magnetic and electric properties of the formed material having domains with insulated boundaries may be improved by regulating the properties of the insulating material. The permeability and resistance of the insulating material has a significant impact on the net properties. The properties of the net material having domains with insulated boundaries may thus be improved by adding agents or inducing reactions which improve the properties of the insulation, e.g., the promotion of Mn, Zn spinel formation in iron oxide based insulation coating may significantly improve the overall permeability of the material.

Figure 21:
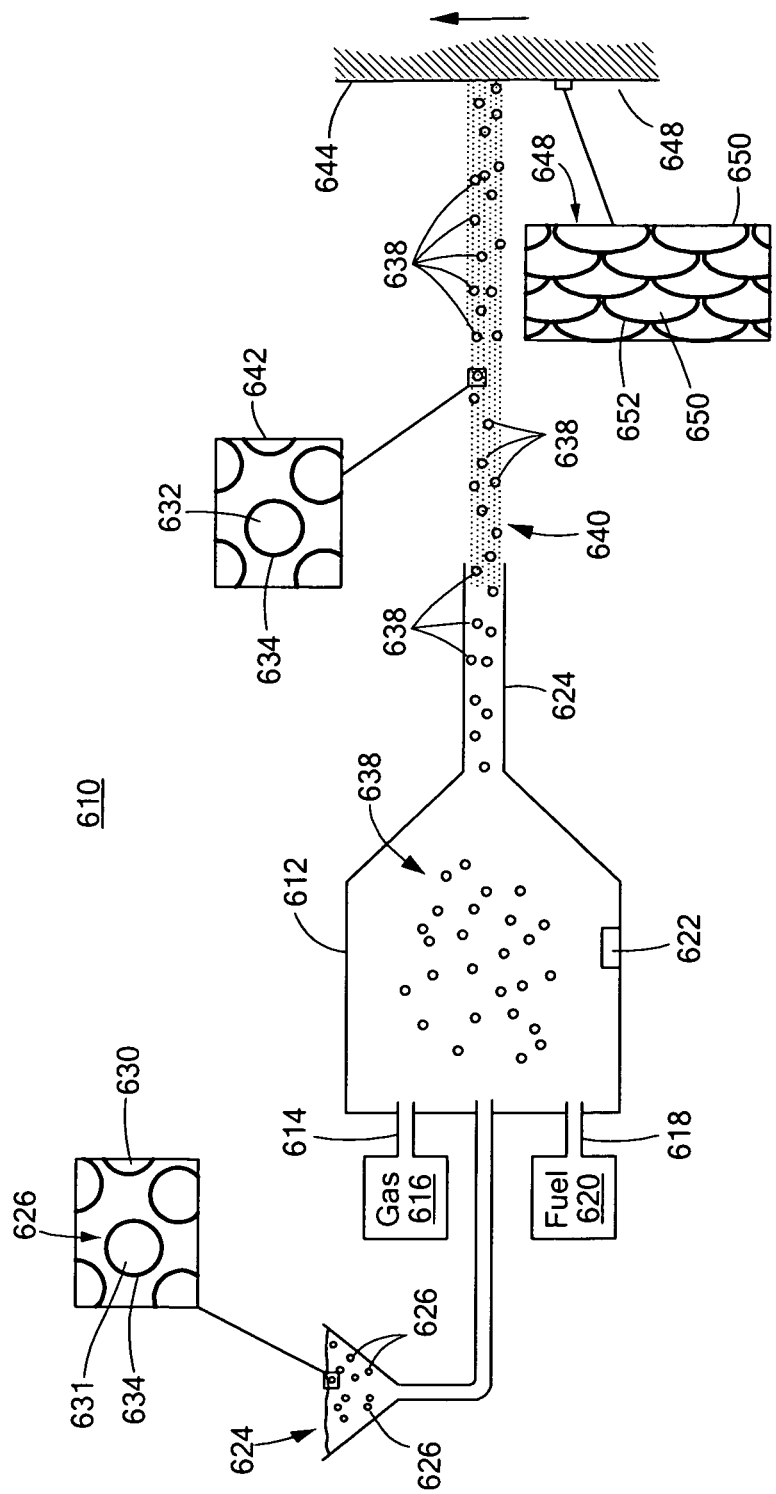
FIG. 21 is a schematic block diagram showing the primary components of one embodiment of the system and method for making a material having domains with insulated boundaries.

Thus far, system 10 and system 310 and the methods thereof forms an insulation layer on in-flight or deposited droplets to form the material having domains with insulated boundaries. In another disclosed embodiment, system 610, FIG. 21, and the method thereof, forms the material having domains with insulated boundaries by injecting a metal powder comprised of metal particles coated with an insulation material into a chamber to partially melt the insulation layer. The conditioned particles are then directed at a stage to form the material having domains with insulated boundaries. System 610 includes combustion chamber 612 and gas inlet 614 which injects gas 616 into chamber 612. Fuel inlet 618 injects fuel 620 into chamber 612. Fuel 620 may be a fuel such as kerosene, natural gas, butane, propane, and the like. Gas 616 may be pure oxygen, an air mixture, or similar type gas. The result is a flammable mixture inside chamber 612. Igniter 622 is configured to ignite the flammable mixture of fuel and gas to create a predetermined temperature and pressure in combustion chamber 612. Igniter 622 may be a spark plug or similar type device. The resulting combustion increases the temperature and pressure within combustion chamber 612 and the combustion products are propelled out of chamber 612 via outlet 624. Once the combustion process achieves a stead state, i.e. when the temperature and pressure in combustion chamber stabilizes, e.g., to a temperature of about 1500K and a pressure of about 1 MPa, metal powder 624 is injected into combustion chamber 612 via inlet 626. Metal powder 624 is preferably comprised of metal particles 626 coated with an insulating material. As shown by caption 630, particles 626 of metal powder 624 include inner core 632 made of a soft magnetic material, such as iron or similar type material, and outer layer 634 made of the electrically insulating material preferably comprised of ceramic-based materials, such as alumina, magnesia, zirconia, and the like, which results in outer layer 634 having a high melting temperature. In one example, metal powder 624 comprised of metal particles 626 having inner core 632 coated with insulating material 634 may be produced by mechanical (mechanofusion) or chemical processes (soft gel). Alternatively, insulation layer 634 can be based on ferrite-type materials which can improve magnetic properties due to their high reactive permeability by preventing or limiting the heat temperature, e.g., such as annealing.

After metal powder 624 is injected into pre-conditioned combustion chamber 612, particles 626 of metal powder 624 undergo softening and partial melting due to the high temperature in chamber 612 to form conditioned droplets 638 inside chamber 612. Preferably, conditioned droplets 638 have a soft and/or partially melted inner core 632 made of a soft magnetic material and a solid outer layer 634 made of the electrically insulated material. Conditioned droplets 638 are then accelerated and ejected from outlet 624 as stream 640 that includes both combustion gases and conditioned droplets 638. As shown in caption 642, droplets 638 in stream 640 preferably have a completely solid outer layer 634 and a softened and/or partially melted inner core 632. Stream 640, carrying conditioned droplets 638, is directed at stage 644. Stream 640 is preferably traveling in a predetermined speed, e.g., about 350 m/s. Conditioned droplets 638 then impact stage 644 and adhere thereto to form material 648 having domains with insulated boundaries thereon. Caption 650 shows in further detail one example of material 648 with domains 650 of soft magnetic material with electrically insulated boundaries 652.

Figure 22A:
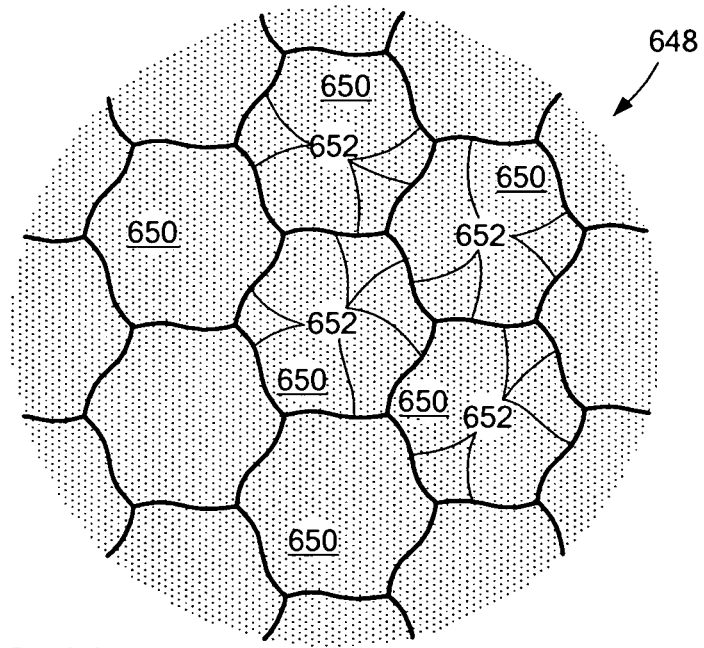
FIG. 22A is a schematic diagram showing in further detail the structured material having domains with insulated boundaries shown in FIG. 21.
Figure 22B:
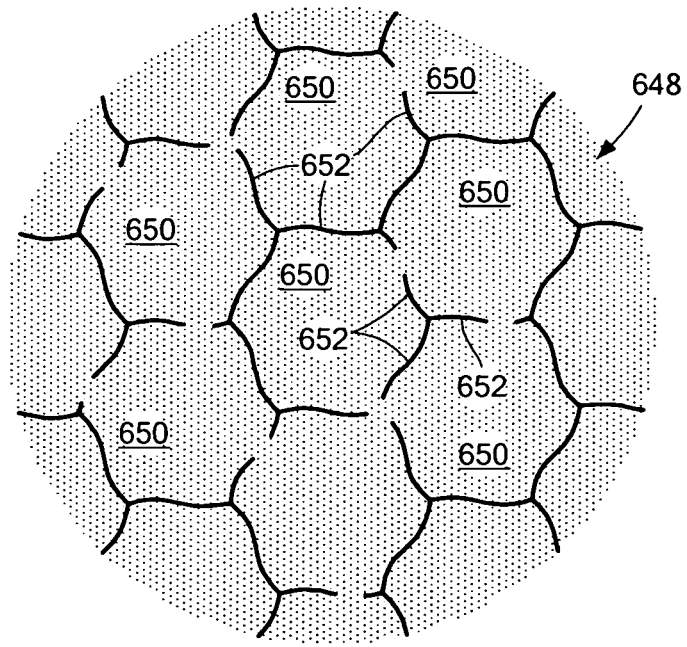
FIG. 22B is a schematic diagram showing in further detail the structured material having domains with insulated boundaries shown in FIG. 21.

FIG. 22A shows an example of material 48 that includes domains 650 with insulated boundaries 652 therebetween. In one example, material 648 includes boundaries 652 between neighboring domains 650 which are virtually perfectly formed as shown. In other examples, material 648 FIG. 22B, may include boundaries 652' between neighboring domains 50 with discontinuities as shown. Material 648, FIGS. 22A and 22B, reduces eddy current losses and discontinuities boundaries 652 between neighboring domains 650 improve the mechanical properties of material 648. The result is that material 648 preserves a high permeability, a low coercivity and a high saturation induction of the alloy. Boundaries 652 limit electrical conductivity between neighboring domains 650. Material 648 preferably provides a superior magnetic path due to its permeability, coercivity and saturation characteristics. The limited electrical conductivity of material 648 minimizes eddy current losses associated with rapid changes of the magnetic field as a motor rotates. System 610 and the method thereof may be a single step, fully automated process which saves time and money and produces virtually no waste.

System 10, 310, and 610 shown in one or more of FIGS. 1-22B, provides for forming bulk material 32, 332, 512, 648 from metal material 44, 344, 558, 624 and source 26, 64, 504, 634 of insulating material where the metal material and the insulating material may be any suitable metal or insulating material. System 10, 310, 610 for forming the bulk material includes, e.g., support 40, 320, 644 configured to support the bulk material. Support 40, 320, 644 may have a flat surface as shown or alternately may have any suitably shaped surface(s), for example where it is desired for the bulk material to conform to the shape. System 10, 310, 610 also includes heating device, e.g., 42, 254, 256, 342, 554, 556, 612, a deposition device, e.g., deposition device 22, 270, 322, 570, 624, and a coating device, e.g., coating device 24, 263, 500, 502. The deposition device may be any suitable deposition device, for example, by pressure, field, vibration, piezo electric, piston and orifice, by back pressure or pressure differential, ejection or otherwise any suitable method. The heating device heats the metal material to a softened or molten state. The heating device may be by electric heating elements, induction, combustion or any suitable heating method. The coating device coats the metal material with the insulating material. The coating device may be by direct application, chemical reaction with gas, solid or liquid(s), reactive atmosphere, mechanical fusion, Sol-gel, spray coating, spray reaction or any suitable coating device, method, or combination thereof. The deposition device deposits particles of the metal material in the softened or molten state on to the support forming the bulk material. The coating may be a single or multi-layer coating. In one aspect, the source of insulating material may be a reactive chemical source where the deposition device deposits the particles of the metal material in the softened or molten state on to the support in a deposition path 16, 316, 640 where insulating boundaries are formed on the metal material by the coating device from a chemical reaction of the reactive chemical source in the deposition path. In another aspect, the source of insulating material may be a reactive chemical source where insulating boundaries are formed on the metal material by the coating device from a chemical reaction of the reactive chemical source after the deposition device deposits the particles of the metal material in the softened or molten state on to the support. In another aspect, the source of insulating material may be a reactive chemical source where the coating device coats the metal material 34, 334, 642 with the insulating material forming insulating boundaries 36, 336, 652 from a chemical reaction of the reactive chemical source at the surface of the particles. In another aspect, the deposition device may be a uniform droplet spray deposition device. In another aspect, the source of insulating material may be a reactive chemical source where the coating device coats the metal material with the insulating material forming insulating boundaries formed from a chemical reaction of the reactive chemical source in a reactive atmosphere. The source of insulating material may be a reactive chemical source and an agent where the coating device coats the metal material with the insulating material forming insulating boundaries formed from a chemical reaction of the reactive chemical source in a reactive atmosphere stimulated by a co-spraying of the agent. The coating device may coat the metal material with the insulating material forming insulating boundaries formed from a co-spraying of the insulating material. Further, the coating device may coat the metal material with the insulating material forming insulating boundaries formed from a chemical reaction and a coating from the source of insulating material. Here, the bulk material has domains 34, 334, 650 formed from the metal material with insulating boundaries 36, 336, 652 formed from the insulating material. The softened state may be at a temperature below the melting point of the metal material where the deposition device may deposit the particles simultaneously while the coating device coats the metal material with the insulating material. Alternately, the coating device may coat the metal material with the insulating material after the deposition device deposits the particles. In one aspect of the disclosed embodiment, the system may be provided for forming a soft magnetic bulk material 32, 332, 512, 648 from a magnetic material 44, 344, 558, 624 and a source 26, 64, 504, 634 of insulating material. The system for forming the soft magnetic bulk material may have a support 40, 320, 644 configured to support the soft magnetic bulk material. Heating device 42, 254, 256, 342, 554, 556, 612 and a deposition device 22, 270, 322, 570, 612 may be coupled to the support. The heating device heats the magnetic material to a softened state and the deposition device deposits particles 16, 316, 638 of the magnetic material in the softened state on to the support forming the soft magnetic bulk material where the soft magnetic bulk material has domains 34, 334, 650 formed from the magnetic material with insulating boundaries 36, 336, 652 formed from the source of insulating material. Here, the softened state may be at a temperature above or below the melting point of the magnetic material.

Figure 23A:
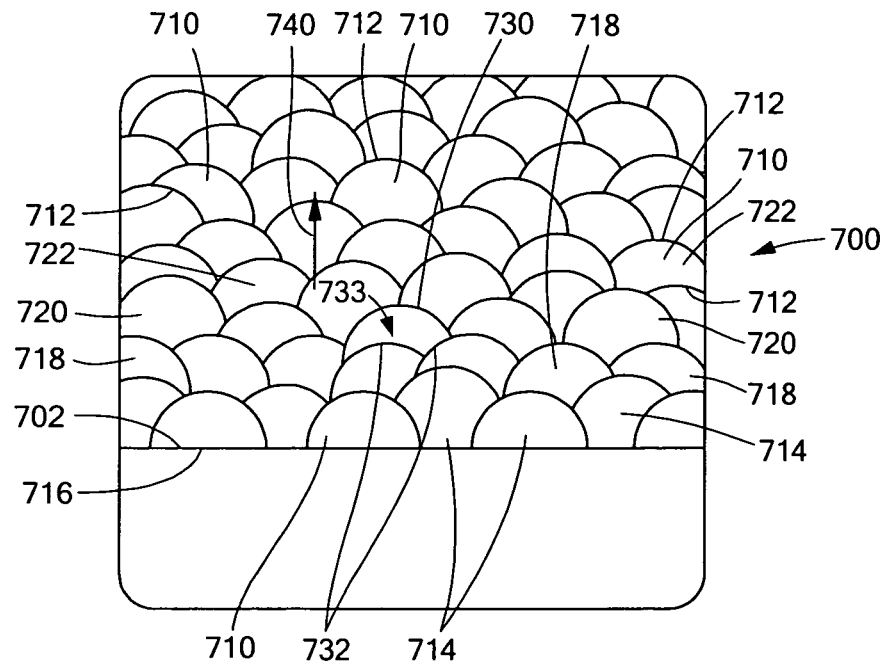
FIG. 23A is a schematic cross section view of one embodiment of a structured material.
Figure 23B:
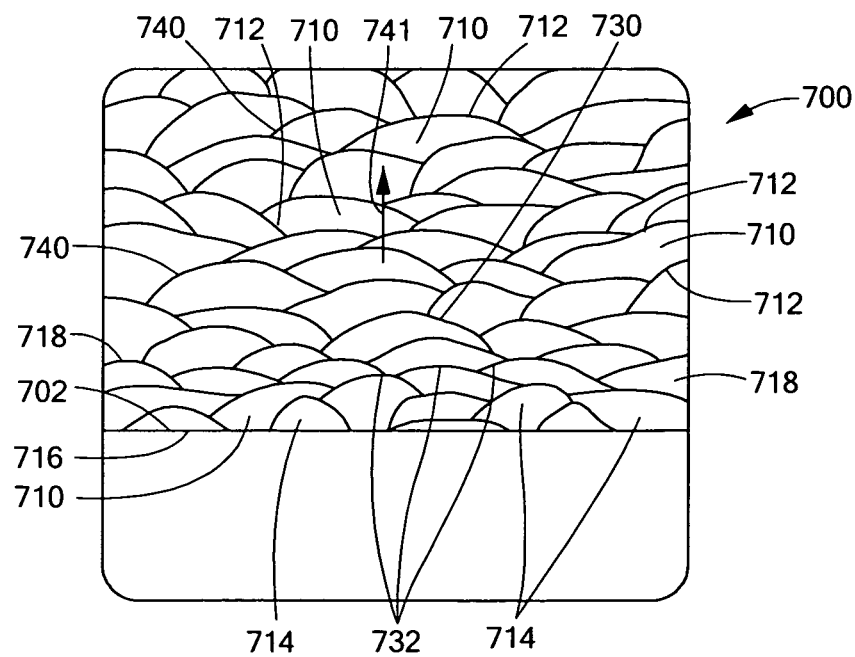
FIG. 23B is a schematic cross section view of one embodiment of a structured material.

Referring now to FIGS. 23A and 23B, there is shown one example of a cross section of bulk material 700. Bulk material 700 may be a soft magnetic material and may have features as discussed above, for example, with respect to material 32, 332, 512, 648 or otherwise. By way of example, a soft magnetic material may have properties of low coercivity, high permeability, high saturation flux, low eddy current loss, low net iron loss or with properties of ferromagnetic, iron, electrical steel or other suitable material. In contrast, a hard magnetic material has high coercivity, high saturation flux, high net iron loss or with properties of magnets or permanent magnets or other suitable material. FIGS. 23A and 23B also show cross sections of spray deposited bulk material, for example, a cross section of the multi layered material as shown, e.g., in FIG. 16. Here, bulk material 700, FIGS. 23A and 23B, is shown formed on surface 702. Bulk material 700 has a plurality of adhered domains 710 of metal material, substantially all of the domains of the plurality of domains of metal material separated by a predetermined layer of high resistivity insulating material 712. The metal material may be any suitable metal material. A first portion 714 of the plurality of domains of metal material is shown forming a formed surface 716 corresponding to the surface 702. A second portion 718 of the plurality of domains 710 of metal material is shown having successive domains, e.g., domains 720, 722 of metal material progressing from the first portion 714. Substantially all of the domains in the successive domains 720, 722 . . . of metal material having first 730 and second 732 surfaces, respectively, first surface opposing the second surface, the second surface conforming to the shape of the domains of metal material that the second surface has progressed from, e.g., as indicated by arrow 733 between first surface 730 and second surface 732. A majority of the domains in the successive domains of metal material have the first surface being a substantially convex surface and the second surface having one or more substantially concave surfaces. The layer of high resistivity insulating material may be any suitable electrically insulating material. For example, in one aspect the layer may be selected from materials having a resistivity greater than about $1 \times 10^3$ Ω-m. In another aspect, the electrically insulating layer or coating may have high electrical resistivity, such as with materials alumina, zirconia, boron nitride, magnesium oxide, magnesia, titania or other suitable high electrical resistivity material. In another aspect, the layer may be selected from materials having a resistivity greater than about $1 \times 10^8$ Ω-m. The layer of high resistivity insulating material may have a selectable thickness that is substantially uniform, for example, as disclosed. The metal material may also be a ferromagnetic material. In one aspect, the layer of high resistivity insulating material may be ceramic. Here, the first surface and the second surface may form an entire surface of the domain. The first surfaces may progress in a substantially uniform direction from the first portion. Bulk material 700 may be a soft magnetic bulk material formed on surface 702 where the soft magnetic bulk material has a plurality of domains 710 of magnetic material, each of the domains of the plurality of domains of magnetic material substantially separated by a selectable coating of high resistivity insulating material 712. A first portion 714 of the plurality of domains of magnetic material may form a formed surface 716 corresponding to surface 702 while a second portion 718 of the plurality of domains of magnetic material has successive domains 720, 722 . . . of magnetic material progressing from the first portion 714. Substantially all of the domains in the successive domains of magnetic material have first 730 and second 732 surfaces with the first surface having a substantially convex surface and the second surface having one or more substantially concave surfaces. In another aspect, voids 740 may exist in material 700 shown in FIG. 23B. Here, the magnetic material may be a ferromagnetic material and the selectable coating of high resistivity insulating material may be ceramic with the first surface substantially opposing the second surface and with the first surfaces progressing in a substantially uniform direction 741 from the first portion 714.

As will be described with respect to FIGS. 24-36, electrical devices are shown that may be coupled to an electrical power source. In each case, the electrical device has a soft magnetic core with material as disclosed herein and a winding coupled to the soft magnetic core and surrounding a portion of the soft magnetic core with the winding coupled to the power source. In alternate aspects, any suitable electrical device that has a core or soft magnetic core with material as disclosed herein may be provided. For example and as disclosed, the core may have a plurality of domains of magnetic material, each of the domains of the plurality of domains of magnetic material substantially separated by a layer of high resistivity insulating material. The plurality of domains of magnetic material may have successive domains of magnetic material progressing through the soft magnetic core with substantially all of the successive domains of magnetic material having first and second surfaces, the first surface comprising a substantially convex surface and the second surface comprising one or more substantially concave surfaces. Here and as disclosed, the second surface conforms to the shape of the domains of metal material that the second surface has progressed from with a majority of the domains in the successive domains of metal material having the first surface comprising a substantially convex surface and the second surface comprising one or more substantially concave surfaces. By way of example, the electrical device may be an electric motor coupled to a power source, the electric motor having a frame with a rotor and a stator coupled to the frame. Here, either the rotor or the stator may have a winding coupled to the power source and a soft magnetic core with the winding wound about a portion of the soft magnetic core. The soft magnetic core may have a plurality of domains of magnetic material, each of the domains of the plurality of domains of magnetic material substantially separated by a layer of high resistivity insulating material as disclosed herein. In alternate aspects, any suitable electrical device that has a soft magnetic core with material as disclosed herein may be provided.

Figure 24:
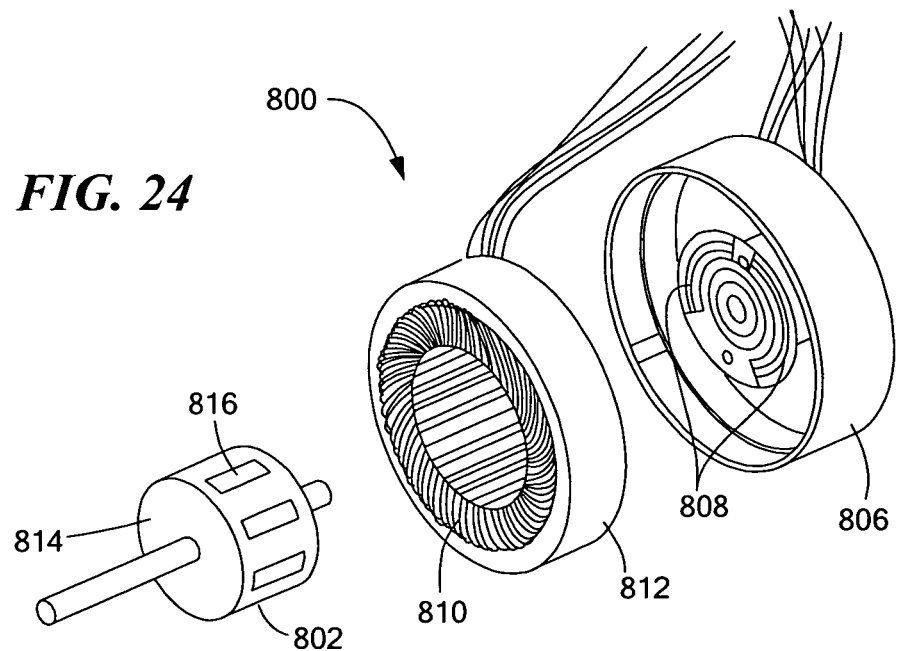
FIG. 24 is a schematic exploded isometric view of one embodiment of a brushless motor incorporating the structured material of the disclosed embodiment.

Referring now to FIG. 24, there is shown an exploded isometric view of brushless motor 800. Motor 800 is shown having rotor 802, stator 804 and housing 806. Housing 806 may have position sensor or hall elements 808. Stator 804 may have windings 810 and stator core 812. Rotor 802 may have rotor core 814 and magnets 816. In the disclosed embodiment, stator core 812 and/or rotor core 814 may be fabricated from the material and methods discussed above having insulated domains and the methods thereof disclosed above. Here, stator core 812 and/or rotor core 814 may be fabricated either completely or in part from bulk material such as material 32, 332, 512, 648, 700 and as discussed above where the material is highly permeable magnetic material having domains of highly magnetically permeable material with insulating boundaries. In alternate aspects of the disclosed embodiment, any portion of motor 800 may be made from such material and where motor 800 may be any suitable electric motor or device using as any component or a portion of a component fabricated from the highly permeable magnetic material having domains of highly permeable magnetic material with insulated boundaries.

Figure 25:
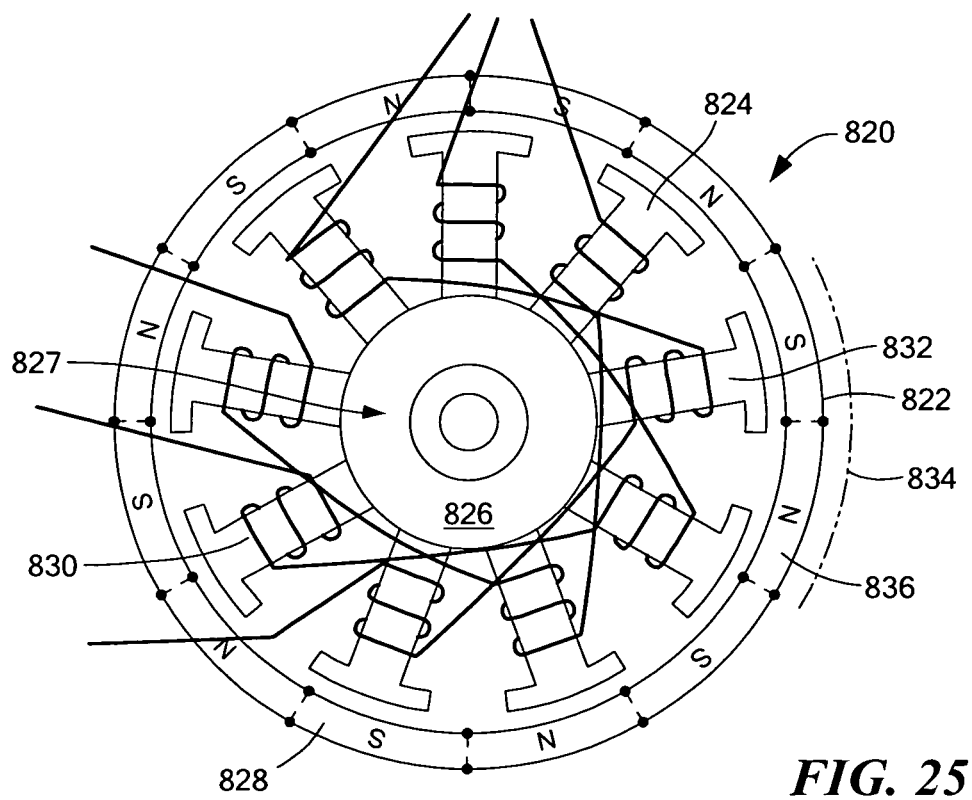
FIG. 25 is a schematic top-view of one embodiment of a brushless motor incorporating the structured material of the disclosed embodiment.

Referring now to FIG. 25, there is shown a schematic view of brushless motor 820. Motor 820 is shown having rotor 822, stator 824 and base 826. Motor 820 may also be an induction motor, a stepper motor or similar type motor. Housing 827 may have position sensor or hall elements 828. Stator 824 may have windings 830 and stator core 832. Rotor 822 may have rotor core 834 and magnets 836. In the disclosed embodiment, stator core 832 and/or rotor core 834 may be fabricated from the disclosed materials and/or by the methods discussed above. Here, stator core 832 and/or rotor core 834 may be fabricated either completely or in part from bulk material such as material 32, 332, 512, 648, 700 and as discussed above where the material is highly permeable magnetic material having domains of highly magnetically permeable material with insulating boundaries. In alternate aspects, any portion of motor 820 may be made from such material and where motor 820 may be any suitable electric motor or device using as any component or a portion of a component fabricated from the highly permeable magnetic material having domains of highly permeable magnetic material with insulated boundaries.

Figure 26A:
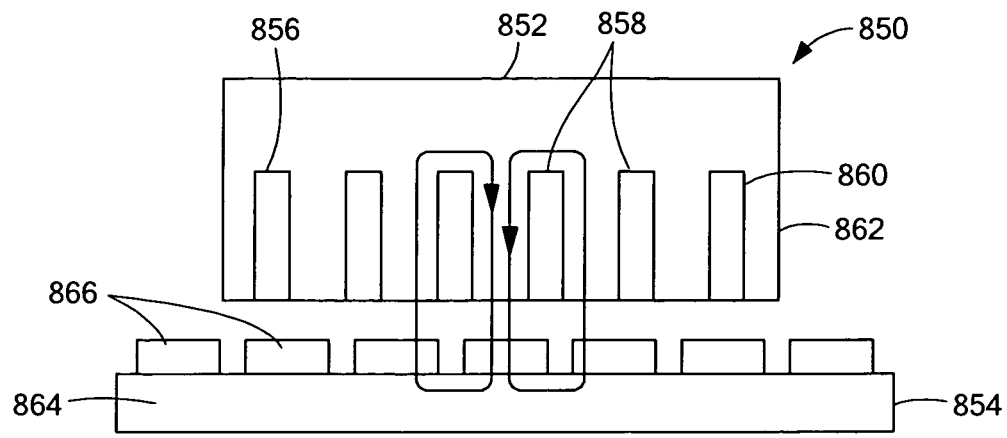
FIG. 26A is a schematic side-view of a linear motor incorporating the structured material of the disclosed embodiment.

Referring now to FIG. 26A, there is shown a schematic view of linear motor 850. Linear motor 850 has primary 852 and secondary 854. Primary 852 has primary core 862 and windings 856, 858, 860. Secondary 854 has secondary plate 864 and permanent magnets 866. In the disclosed embodiment, primary core 862 and/or secondary plate 864 may be fabricated from the materials and/or by the disclosed methods disclosed herein. Here, primary core 862 and/or secondary plate 864 may be fabricated either completely or in part from bulk material, such as material 32, 332, 512, 648, 700 and as disclosed herein where the material is highly permeable magnetic material having domains of highly magnetically permeable material with insulating boundaries. In alternate aspects, any portion of motor 850 may be made from such material and where motor 850 may be any suitable electric motor or device using as any component or a portion of a component fabricated from the highly permeable magnetic material having domains of highly permeable magnetic material with insulated boundaries.

Figure 26B:
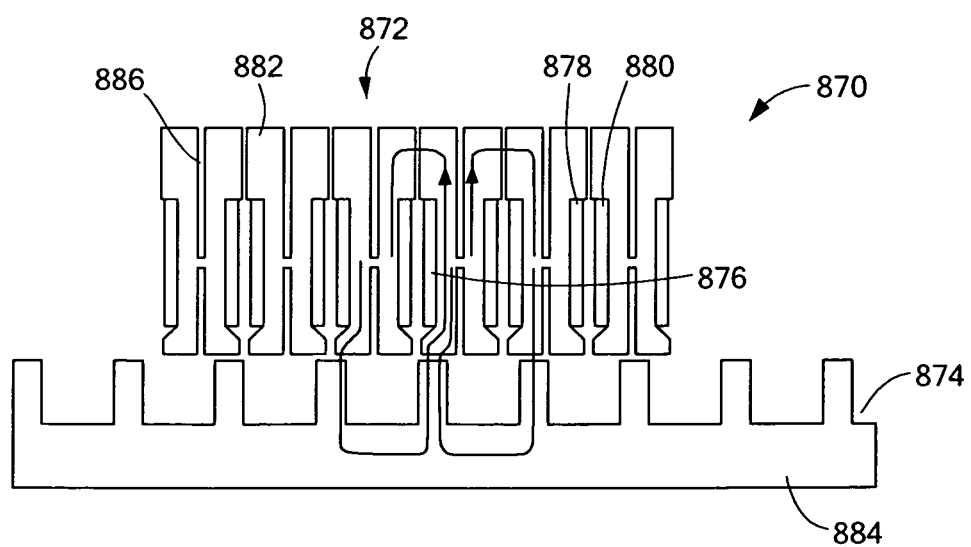
FIG. 26B is a schematic side-view of a linear motor incorporating the structured material of the disclosed embodiment.

Referring now to FIG. 26B, there is shown a schematic view of linear motor 870. Linear motor 870 has primary 872 and secondary 874. Primary 872 has primary core 882, permanent magnets 886 and windings 876, 878, 880. Secondary 874 has toothed secondary plate 884. In the disclosed embodiment, primary core 882 and/or secondary plate 884 may be fabricated from the materials and/or by the disclosed methods disclosed herein. Here, primary core 882 and/or secondary plate 884 may be fabricated either completely or in part from bulk material such as material 32, 332, 512, 648, 700 and as disclosed herein where the material is highly permeable magnetic material having domains of highly magnetically permeable material with insulating boundaries. In alternate aspects, any portion of motor 870 may be made from such material and where motor 870 may be any suitable electric motor or device using as any component or a portion of a component fabricated from the highly permeable magnetic material having domains of highly permeable magnetic material with insulated boundaries.

Figure 27:
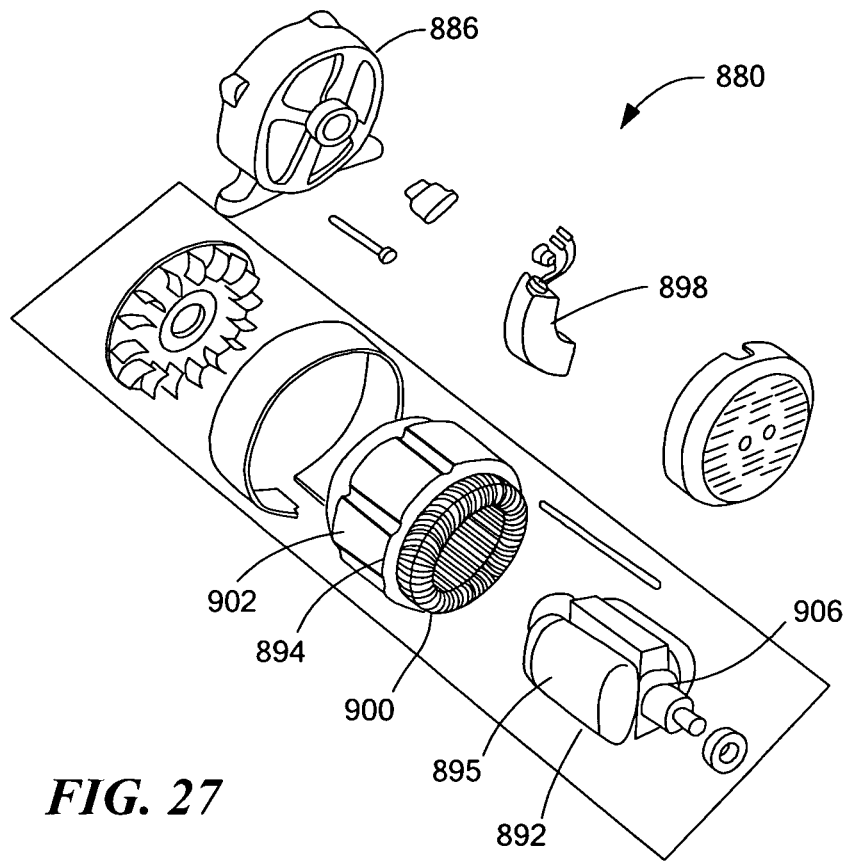
FIG. 27 is an exploded schematic isometric view of an electric generator incorporating the structured material of the disclosed embodiment.

Referring now to FIG. 27, there is shown an exploded isometric view of electric generator 890. Generator or alternator 890 is shown having rotor 892, stator 894 and frame or housing 896. Housing 896 may have brushes 898. Stator 894 may have windings 900 and stator core 902. Rotor 892 may have rotor core 895 and windings 906. In the disclosed embodiment, stator core 902 and/or rotor core 895 may be fabricated from the disclosed materials and/or by the disclosed methods. Here, stator core 902 and/or rotor core 904 may be fabricated either completely or in part from bulk material, such as material 32, 332, 512, 648, 700 and as described where the material is highly permeable magnetic material having domains of highly magnetically permeable material with insulating boundaries. In alternate aspects, any portion of alternator 890 may be made from such material and where alternator 890 may be any suitable generator, alternator or device using as any component or a portion of a component fabricated from the highly permeable magnetic material having domains of highly permeable magnetic material with insulated boundaries.

Figure 28:
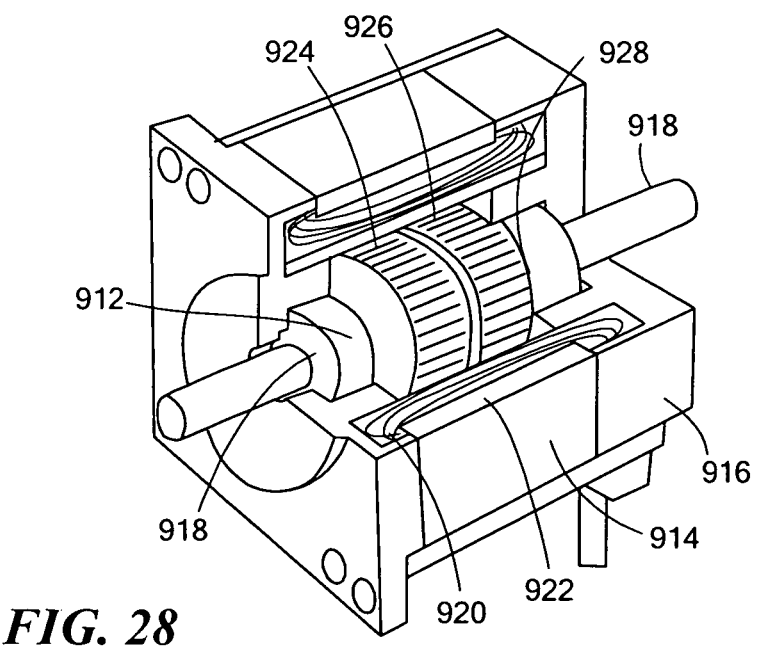
FIG. 28 is a three-dimensional cutaway isometric view of a stepping motor incorporating the structured material of the disclosed embodiment.

Referring now to FIG. 28, there is shown a cutaway isometric view of stepping motor 910. Motor 910 is shown having rotor 912, stator 914 and housing 916. Housing 916 may have bearings 918. Stator 914 may have windings 920 and stator core 922. Rotor 912 may have rotor cups 924 and permanent magnet 926. In the disclosed embodiment, stator core 922 and/or rotor cups 924 may be fabricated from the disclosed materials and/or by the disclosed methods. Here, stator core 922 and/or rotor cups 924 may be fabricated either completely or in part from bulk material such as material 32, 332, 512, 648, 700 and as described where the material is highly permeable magnetic material having domains of highly magnetically permeable material with insulating boundaries. In alternate aspects, any portion of motor 890 may be made from such material and where motor 890 may be any suitable electric motor or device using as any component or a portion of a component fabricated from the highly permeable magnetic material having domains of highly permeable magnetic material with insulated boundaries.

Figure 29:
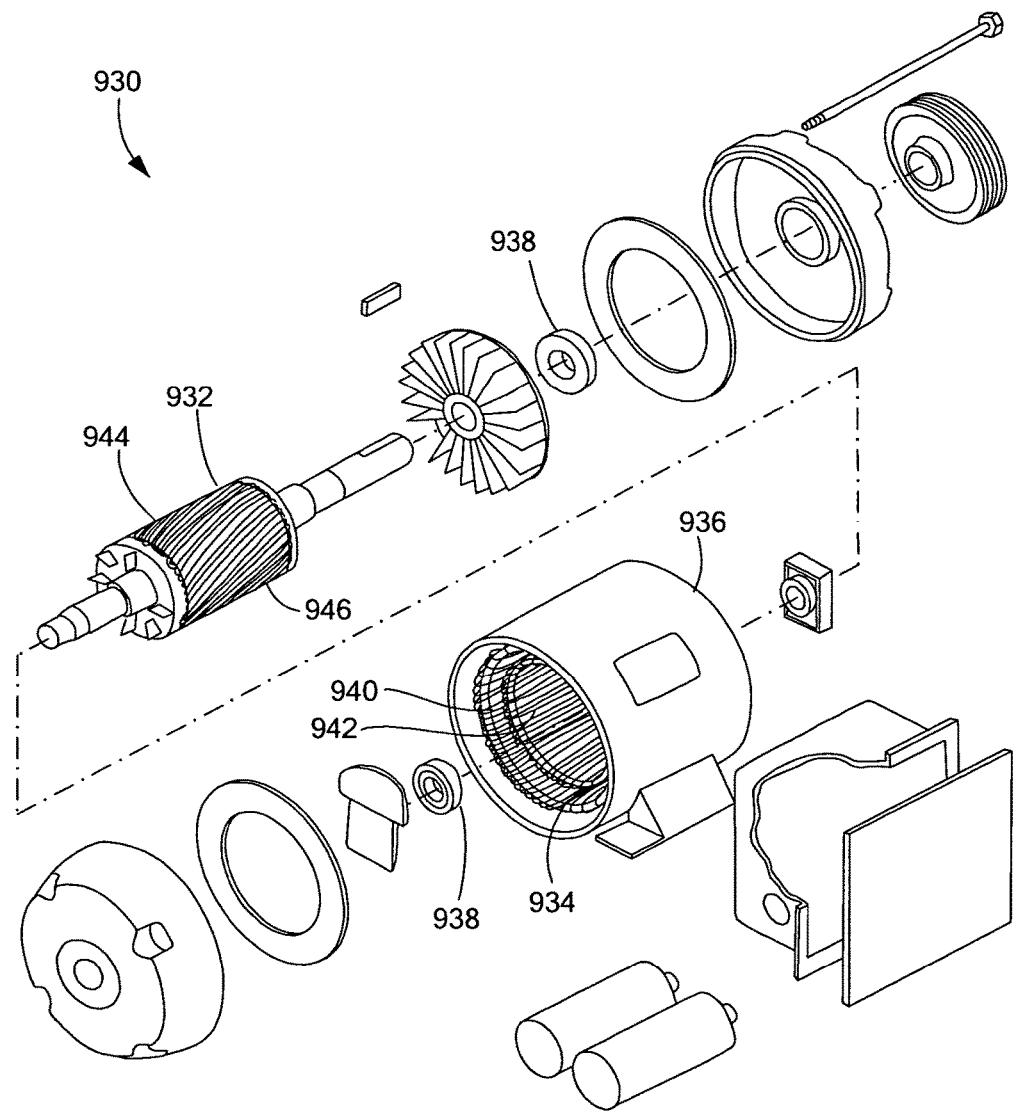
FIG. 29 is a three-dimensional exploded isometric view of an AC motor incorporating the structured material of the disclosed embodiment.

Referring now to FIG. 29, there is shown an exploded isometric view of an AC motor 930. Motor 930 is shown having rotor 932, stator 934 and housing 936. Housing 936 may have bearings 938. Stator 934 may have windings 940 and stator core 942. Rotor 932 may have rotor core 944 and windings 946. In the disclosed embodiment, stator core 942 and/or rotor core 944 may be fabricated from the disclosed materials and/or by the disclosed methods. Here, stator core 942 and/or rotor core 944 may be fabricated either completely or in part from bulk material such as material 32, 332, 512, 648, 700 and as described where the material is highly permeable magnetic material having domains of highly magnetically permeable material with insulating boundaries. In alternate aspects of the disclosed embodiment, any portion of motor 930 may be made from such material and where motor 930 may be any suitable electric motor or device using as any component or a portion of a component fabricated from the highly permeable magnetic material having domains of highly permeable magnetic material with insulated boundaries.

Figure 30:
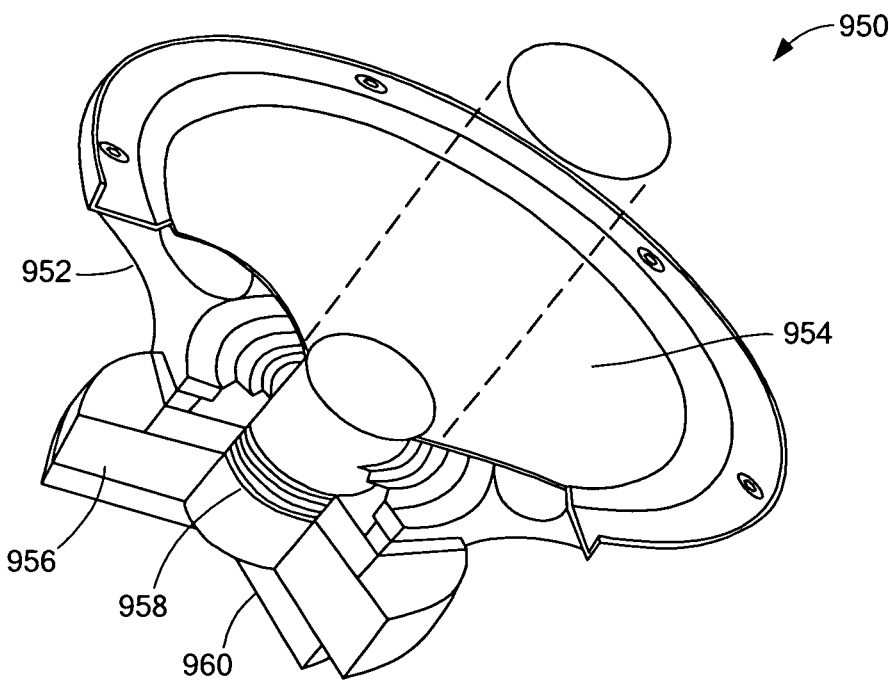
FIG. 30 is a three-dimensional cutaway isometric view of one embodiment of an acoustic speaker incorporating the structured material of the disclosed embodiment.

Referring now to FIG. 30, there is shown a cutaway isometric view of an acoustic speaker 950. Speaker 950 is shown having frame 952, cone 954, magnet 956, winding or voice coil 958 and core 960. Here, core 960 may be fabricated either completely or in part from bulk material such as material 32, 332, 512, 648, 700 and as described where the material is highly permeable magnetic material having domains of highly magnetically permeable material with insulating boundaries. In alternate aspects, any portion of speaker 950 may be made from such material and where speaker 950 may be any suitable speaker or device using as any component or a portion of a component fabricated from the highly permeable magnetic material having domains of highly permeable magnetic material with insulated boundaries.

Figure 31:
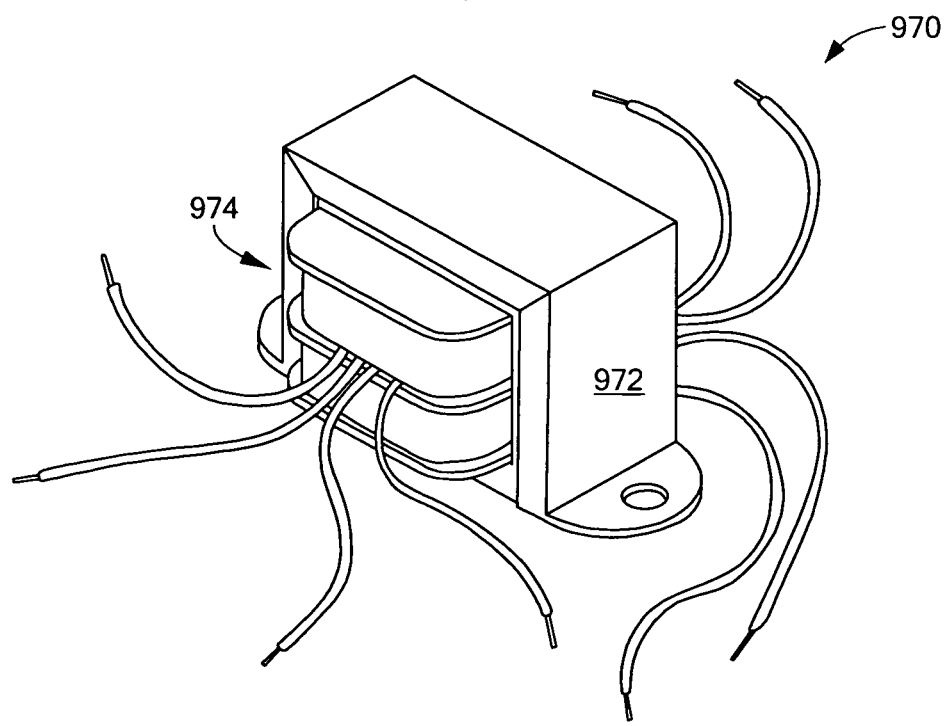
FIG. 31 is a three-dimensional isometric view of a transformer incorporating the structured material of the disclosed embodiment.

Referring now to FIG. 31, there is shown a isometric view of transformer 970. Transformer 970 is shown having core 972 and coil or windings 974. Here, core 972 may be fabricated either completely or in part from bulk material such as material 32, 332, 512, 648, 700 and as described where the material is highly permeable magnetic material having domains of highly magnetically permeable material with insulating boundaries. In alternate aspects of the disclosed embodiment, any portion of transformer 970 may be made from such material and where transformer 970 may be any suitable transformer or device using as any component or a portion of a component fabricated from the highly permeable magnetic material having domains of highly permeable magnetic material with insulated boundaries.

Figure 32:
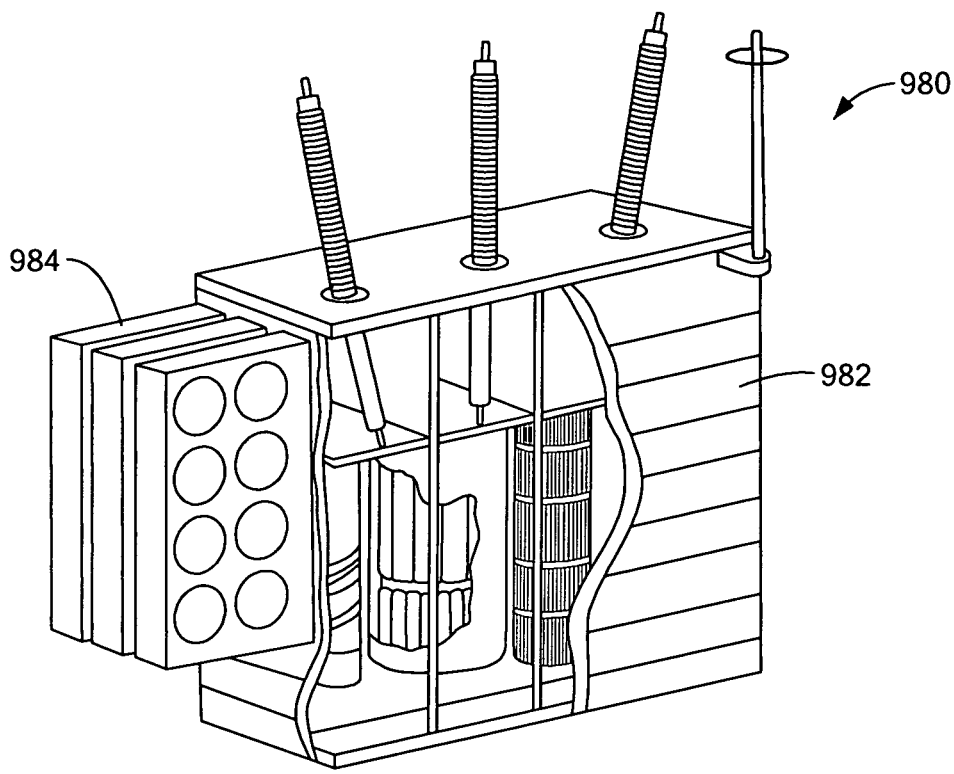
FIG. 32 is a three-dimensional cutaway isometric view of a power transformer incorporating the structured material of the disclosed embodiment.
Figure 33:
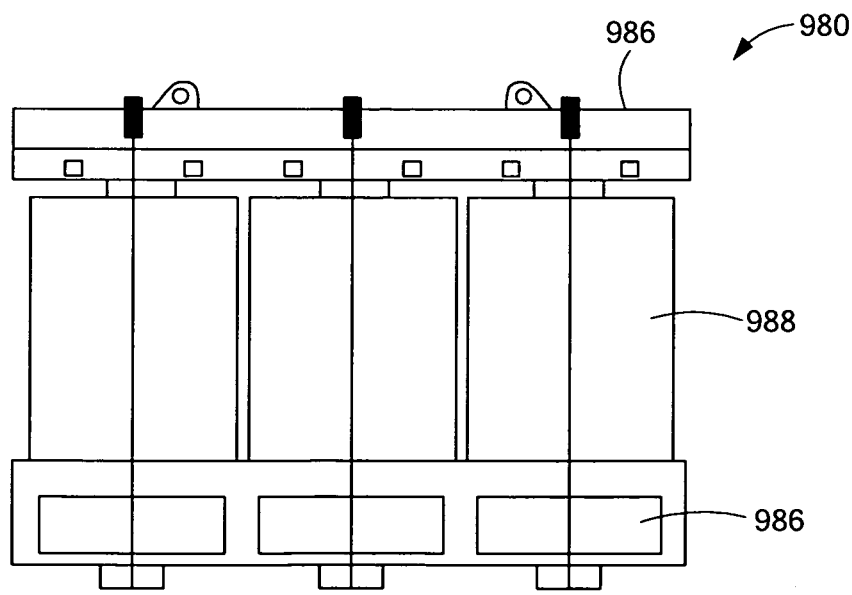
FIG. 33 is a schematic side-view of a power transformer incorporating the structured material of the disclosed embodiment.

Referring now to FIGS. 32 and 33, there is shown a cutaway isometric view of power transformer 980. Transformer 980 is shown having oil filled housing 982, radiator 984, core 986 and coil or windings 988. Here, core 986 may be fabricated either completely or in part from bulk material such as material 32, 332, 512, 648, 700 and as described where the material is highly permeable magnetic material having domains of highly magnetically permeable material with insulating boundaries. In alternate aspects of the disclosed embodiment, any portion of transformer 980 may be made from such material and where transformer 980 may be any suitable transformer or device using as any component or a portion of a component fabricated from the highly permeable magnetic material having domains of highly permeable magnetic material with insulated boundaries.

Figure 34:
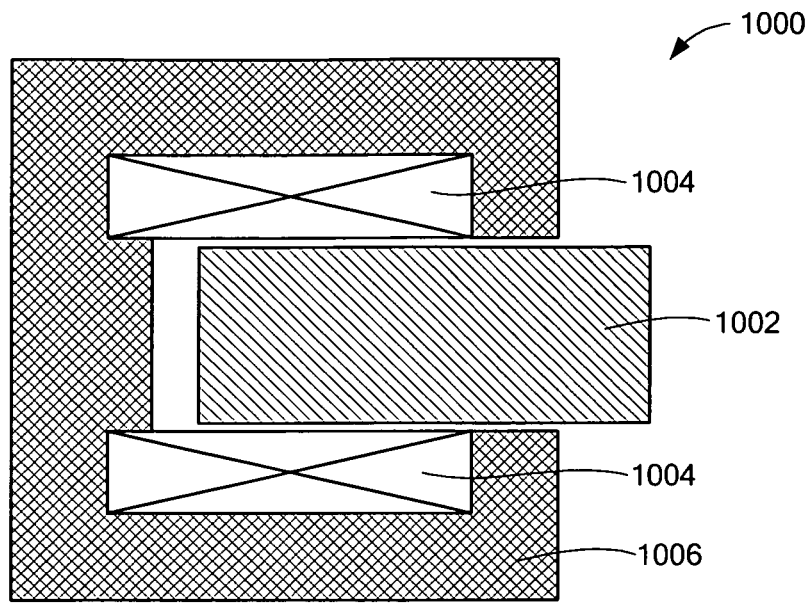
FIG. 34 is a schematic side-view of a solenoid incorporating the structured material of the disclosed embodiment.

Referring now to FIG. 34, there is shown a schematic view of solenoid 1000. Solenoid 1000 is shown having plunger 1002, coil or winding 1004 and core 1006. Here, core 1006 and/or plunger 1002 may be fabricated either completely or in part from bulk material such as material 32, 332, 512, 648, 700 and as described where the material is highly permeable magnetic material having domains of highly magnetically permeable material with insulating boundaries. In alternate aspects of the disclosed embodiment, any portion of solenoid 1000 may be made from such material and where solenoid 1000 may be any suitable solenoid or device using as any component or a portion of a component fabricated from the highly permeable magnetic material having domains of highly permeable magnetic material with insulated boundaries.

Figure 35:
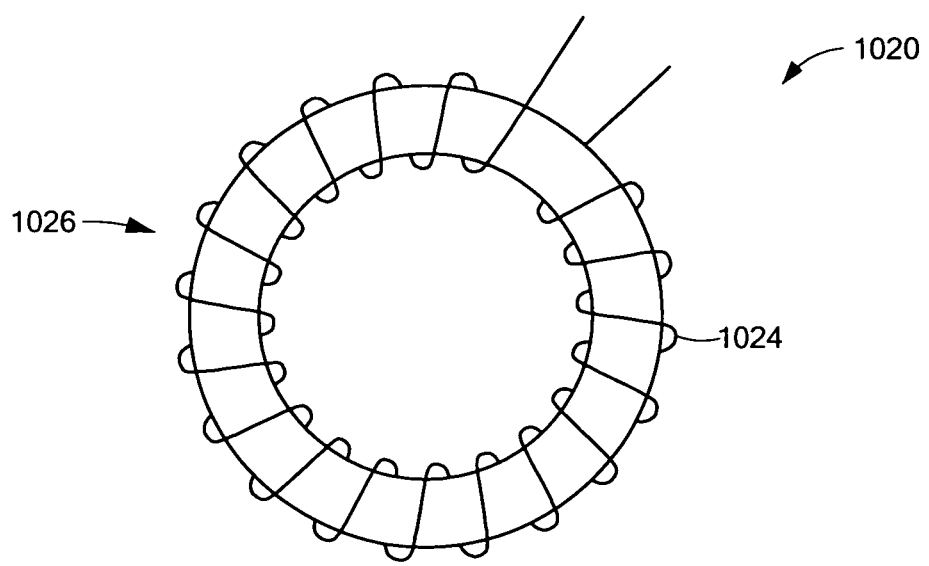
FIG. 35 is a schematic top-view of an inductor incorporating the structured material of the disclosed embodiment.

Referring now to FIG. 35, there is shown a schematic view of an inductor 1020. Inductor 1020 is shown having coil or winding 1024 and core 1026. Here, core 1026 may be fabricated either completely or in part from bulk material such as material 32, 332, 512, 648, 700 and as described where the material is highly permeable magnetic material having domains of highly magnetically permeable material with insulating boundaries. In alternate aspects of the disclosed embodiment, any portion of inductor 1020 may be made from such material and where inductor 1020 may be any suitable inductor or device using as any component or a portion of a component fabricated from the highly permeable magnetic material having domains of highly permeable magnetic material with insulated boundaries.

Figure 36:
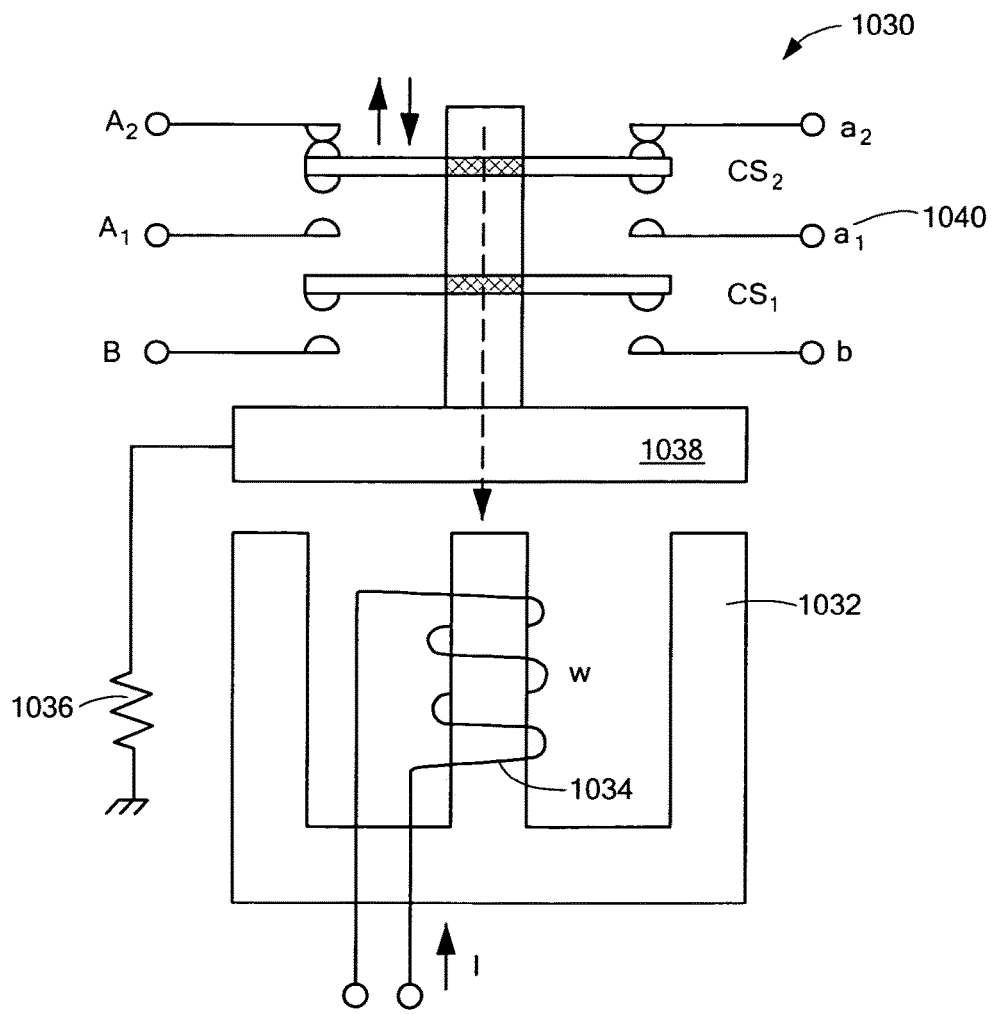
FIG. 36 is a schematic side-view of a relay incorporating the structured material of the disclosed embodiment.

FIG. 36 is a schematic view of a relay or contactor 1030. Relay 1030 is shown having core 1032, coil or winding 1034, spring 1036, armature 1038 and contacts 1040. Here, core 1032 and/or armature 1038 may be fabricated either completely or in part from bulk material such as material 32, 332, 512, 648, 700 and as described where the material is highly permeable magnetic material having domains of highly magnetically permeable material with insulating boundaries. In alternate aspects of the disclosed embodiment, any portion of relay 1030 may be made from such material and where relay 1030 may be any suitable relay or device using as any component or a portion of a component fabricated from the highly permeable magnetic material having domains of highly permeable magnetic material with insulated boundaries.

Figure 37:
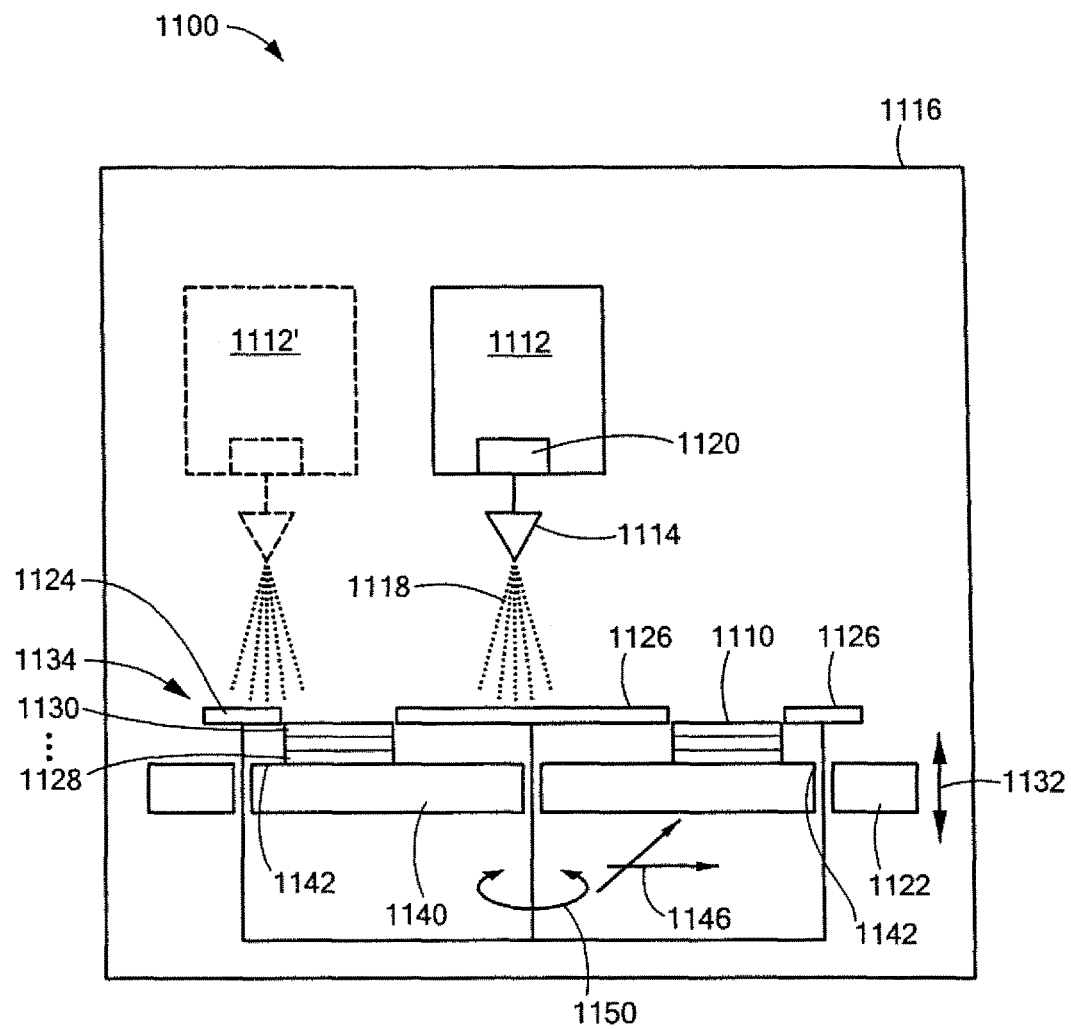
FIG. 37 is a schematic section view of a deposition system.
Figure 38:
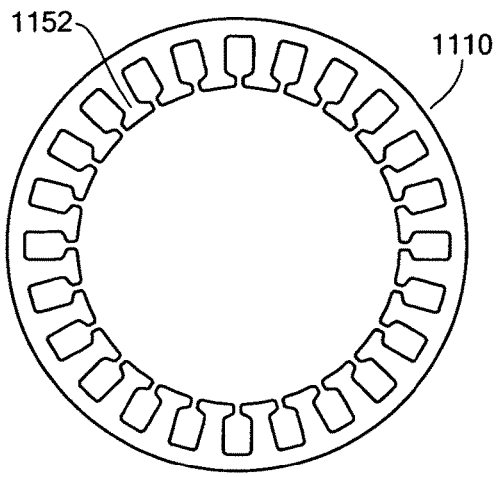
FIG. 38 is a view of a stator.
Figure 39:
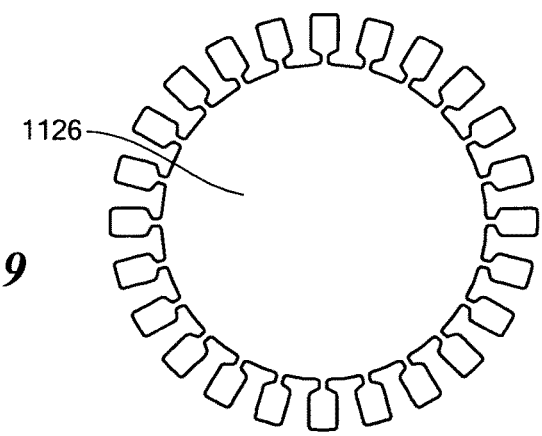
FIG. 39 is a view of a mask.
Figure 40:
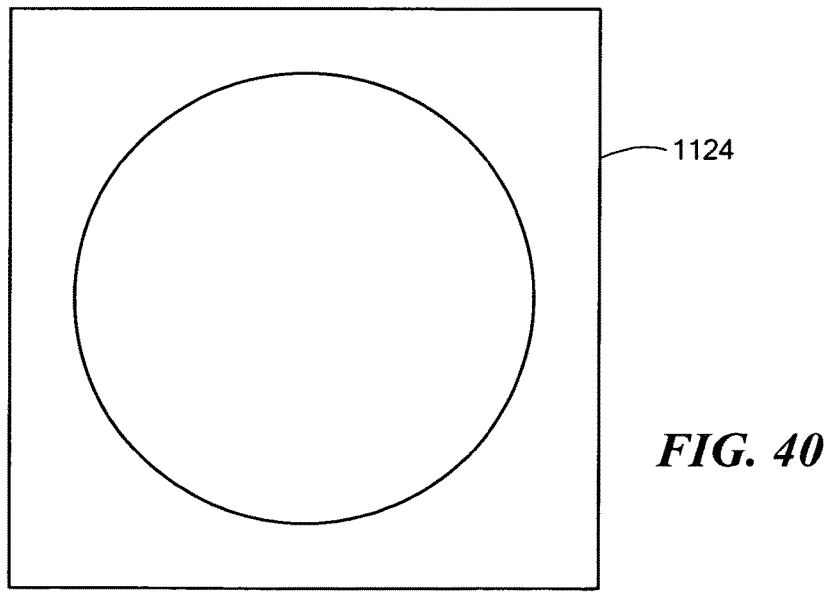
FIG. 40 is a view of a mask.

Referring now to FIG. 37, there is shown another aspect of the disclosed embodiment with respect to system 1100. System 1100 may be provided for forming a soft magnetic bulk material of a predetermined shape from a magnetic material 1112 and a source of insulating material. Here, the magnetic material and source of insulating material and deposition thereof may be as disclosed with respect to deposition system 10 and the disclosed variants, system 310 and disclosed variants, 610 and disclosed variants, or any suitable deposition system as disclosed. For example, system 1100 may have a source of magnetic material 1112 where the material is in powder form, solid form or otherwise and where the material is deposited by deposition device 1114 that may be as previously disclosed and as disclosed and may be any suitable deposition source such as a molten source of molten or softened magnetic material by wire arc, HVOF, HVAF, plasma spray, flame spray or any suitable source. The source of insulating material may be where the magnetic particles are pre coated. Alternately, the source of insulating material may be from a chemical reaction within enclosure 1116 as disclosed, for example, where a reactive gas may be introduced into enclosure 116 and where the reactive gas forms insulating material on the surface of the particles from deposition source 1114 as disclosed. By way of example, the reactive gas may be oxygen or air where an oxide is grown on the surface of particles 1118 being deposited while in flight. Further, the deposited magnetic material may be subsequently coated with insulating material as disclosed. Further, the deposited magnetic material may form an insulating layer by a chemical reaction, for example, a thermite reaction as will be covered in greater detail below. System 1100 has heating device 1120, deposition device 1114 and support 1122 configured to support the soft magnetic bulk material of the predetermined shape 1110. Masks 1124, 1126 are configured as a negative of at least a portion of the predetermined shape 1110. The heating device 1120 heats the magnetic material to form particles having a softened state 1118 and wherein the deposition device 1114 deposits successive layers 1128 ... 1130 of particles of the magnetic material in the softened state 1118 on the support 1122 with the masks 1124, 1126 located between the deposition device 1114 and the support 1122. Here, the mask subsystem is indexed in the direction of arrow 1132 to a position 1134 relative to the support 1122 upon deposition of the successive layers 1128 ... 1130. The mask selectively blocks the successive layers of particles of the magnetic material in the softened state from 1118 being deposited on the support 1122 forming the soft magnetic bulk material of a predetermined shape 1110 on the support 1122. First 1124 and second masks 1126 are shown coupled to each other such that when they are indexed, they block deposition of the magnetic material on portions 1140, 1142 of the support 1122 that selectively are not to be deposited on. The mask may be made from any suitable metal, glass, ceramic, fiberglass, composite or any suitable material that will not melt and retains its shape during deposition. Further, the deposited metal 1118 may in one aspect not stick to mask 1124, 1126. Support 1122 and mask 1124, 1126 may be moveable in a plane 1146 such that material may be selectively deposited on any portion of material 1110. Further one or more portions of the mask may be moveable relative to the other. For example, when the masks are indexed, either mask 1126 or mask 1124 may be moveable relative to the other. Referring also to FIGS. 38, 29 and 40, by way of example, the soft magnetic bulk material of a predetermined shape 1110 on the support 1122 may be a stator 1110 and where the masks may be a negative 1126 of the inner shape of the stator and a negative 1124 of the outer shape of the stator as seen in FIGS. 39 and 40 respectively. If the stator is to have skewed teeth, the inner mask 1126 may be rotated 1150 slightly with each successive index where the first mask 1126 is moveable relative to the second mask 1124. In the embodiment shown, the mask is shown moveable relative to the support. In alternate aspects, the support may be shown moveable relative to the mask. In the embodiment shown, the mask and support is shown moveable relative to the deposition device. Alternately, the deposition device may be moveable relative to the support and mask. Shape 1110 is shown with uniform cross section. Alternately, any non uniform cross section may be provided where different masks are provided as negatives that reflect the non uniform cross section of the soft magnetic bulk material of a predetermined shape with a non uniform cross section. Here, the mask 1124, 1126 may be more than one mask having different shapes corresponding to different cross sections of the soft magnetic bulk material of a predetermined shape 1110 with a non uniform cross section at different index positions 1134.

Figure 41:
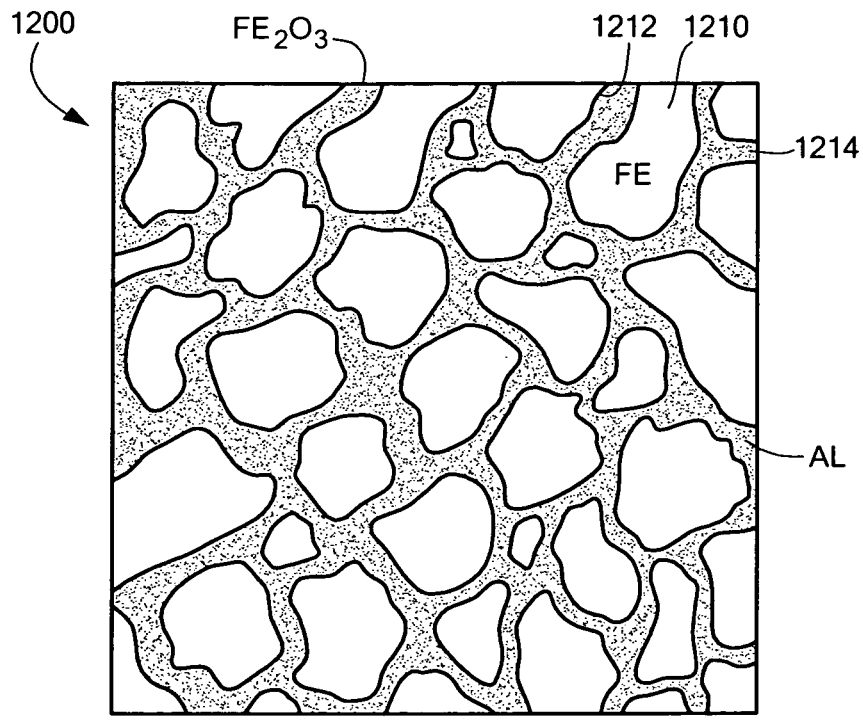
FIG. 41 is a sectional view of a material.
Figure 42:
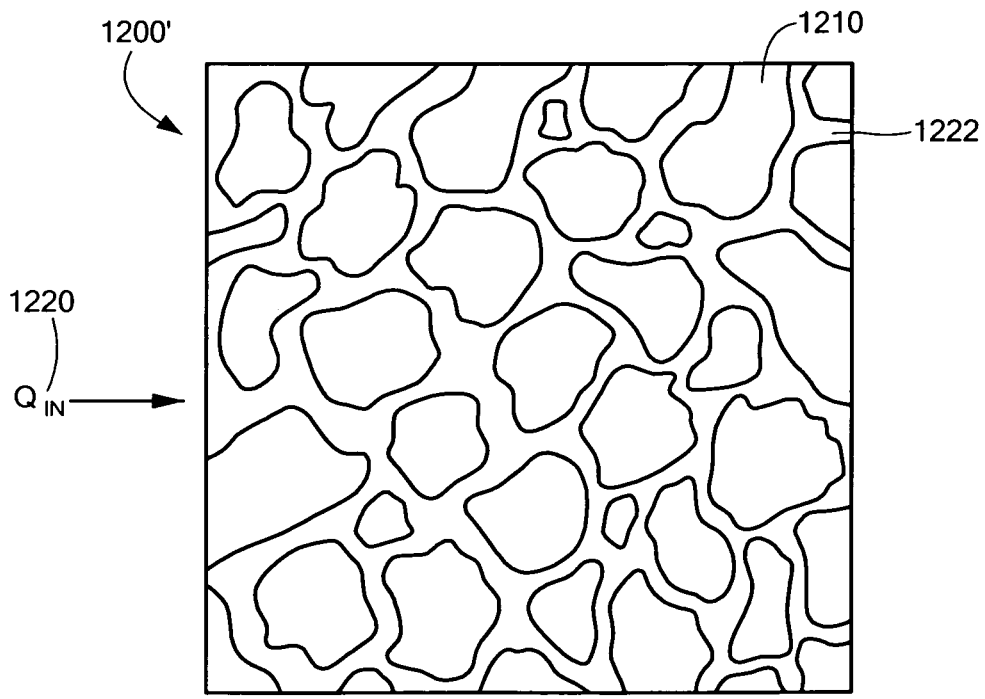
FIG. 42 is a sectional view of a material.

Referring now to FIG. 41, there is shown a cross section of a bulk material 1200. Here, the bulk material may be in powdered or particulate form. Bulk material 1200 has iron particles 1210 with the iron particles having a thin layer 1212 of iron oxide on the surface of the iron particles 1210. Between the iron oxide coated iron particles are also particles of aluminum 1214. The iron oxide may occur naturally from exposure or purposefully, for example, by acid bath or otherwise. Referring also to FIG. 42, heat 1220 may be added to the bulk material, for example, as will be described, or from any suitable heat source such as the iron itself, a flame, magnesium flame, torch, laser, microwave or otherwise. Upon heating the material, a thermite reaction may be started whereby the following reaction may take place with respect to the iron oxide coating and the aluminum:

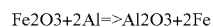

$$Fe_2O_3 + 2Al \Rightarrow Al_2O_3 + 2Fe$$

The reaction results in a structure 1200' as seen in FIG. 42 whereby iron particles 1210 reside in a composite structure and surrounded by aluminum oxide 1222 forming a soft magnetic material having domains 1210 of magnetic material surrounded by insulating material 1222. In alternate aspects, other materials, for example, other than iron or other than iron oxide or other than aluminum may be provided. By way of example, the powder may be Fe, FeSi, FeSiAl, FeAl or any suitable material. For example, the iron particles may be pre coated with a different material. As will be described, the principle reaction may be done as a chain reaction with the bulk material, for example, in a mold. Alternately, the reaction may be controlled locally. For example, a method of forming a soft magnetic bulk material of a predetermined shape from a magnetic material 1210 and a non-magnetic material 1214 may be provided by providing a reservoir adapted to contain the soft magnetic bulk material of the predetermined shape as will be described. Here, a heat source 1220 may be provided for heating the magnetic material and the non-magnetic material in the reservoir to an ignition temperature of a reaction thus forming the soft magnetic bulk material of a predetermined shape. Here, the soft magnetic bulk material has domains 1210 formed from the magnetic material with insulating boundaries 1222 formed from the reaction.

Figure 43:
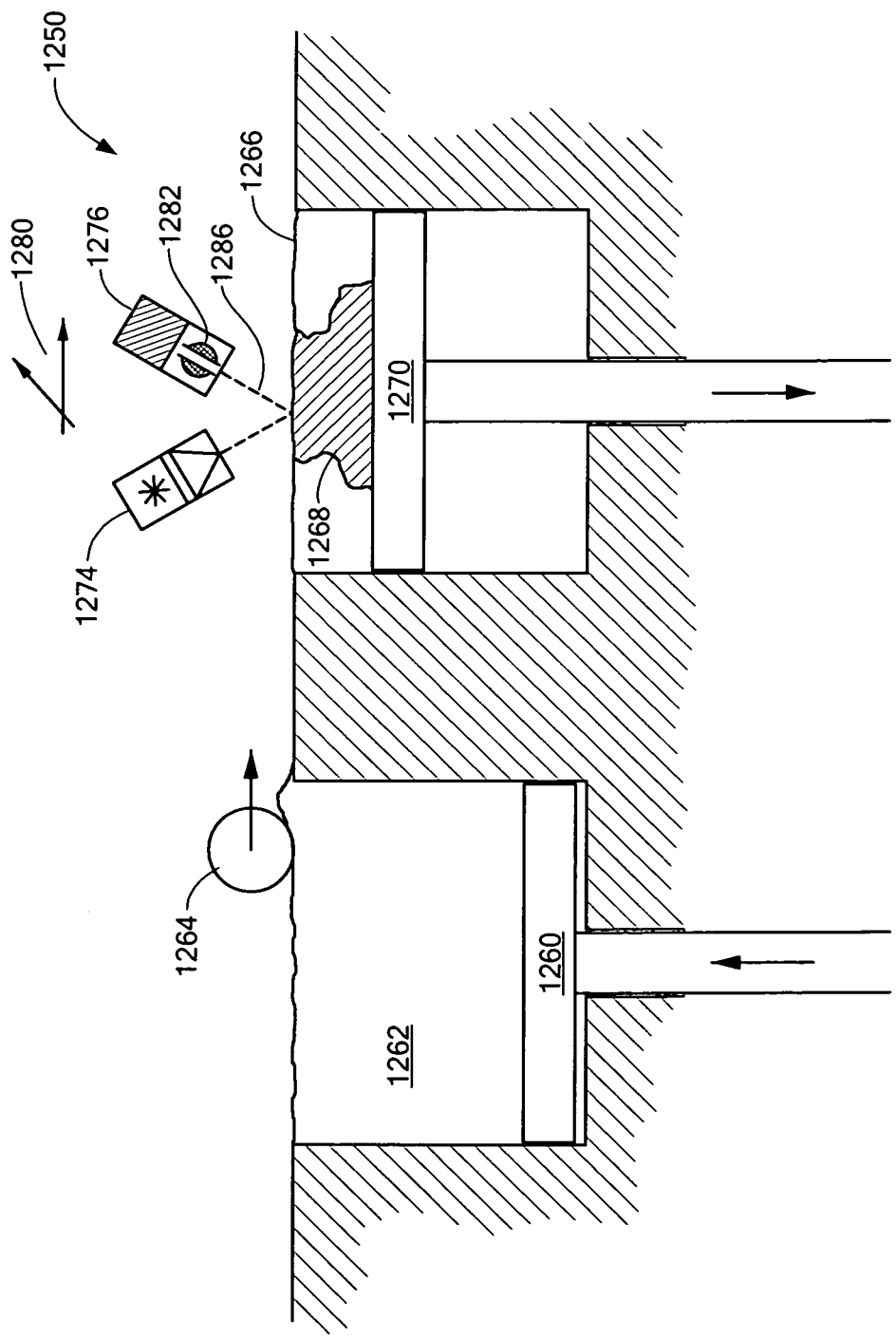
FIG. 43 is a schematic sectional view of a deposition system.

FIG. 43 shows an example of an apparatus 1250 that uses an additive principle to form a soft magnetic bulk material that has domains formed from the magnetic material with insulating boundaries formed from the thermite reaction as described. System 1250 may be an adaptation of a selective laser sintering system as will be described. System 1250 has powder delivery piston 1260, powder delivery reservoir 1262, roller or pusher 1264, fabrication piston 1270, object being fabricated 1268, fabrication powder bed 1266, heat source and alternate powder source 1276. Scanning platform 1280 selectively positions heat source 1274 and powder source 1276 to direct heat and material to a portion of fabrication powder bed 1266 to turn the bulk material from powder form to solid form. In practice, iron particles with iron oxide coating are provided within reservoir 1262. In the embodiment shown, support or piston 1270 may be heated, for example, to facilitate the reaction or stress relieve part 1268. To build successive layers of object 1268, fabrication piston 1270 is indexed down an increment and powder delivery piston 1260 is indexed up an increment. Roller or pusher 1264 pushes a layer of material from powder reservoir 1262 to replenish the fabrication powder bed 1266 with a fresh layer of powder. Scanner 1280 selectively moves heat source 1274 and alternate powder source 1276 to solidify a portion of the fresh bed of powder to build up the next layer of the object being fabricated 1268. The process is repeated until the object being fabricated 1268 is complete. In the embodiment shown, the powder 1262 may be iron oxide coated iron particles, the heat source 1274 may be a switchable laser and the alternative powder source 1276 may be a switchable, via metering valve 1282, pressurized stream of aluminum powder 1286. In practice, Scanner 1280 selectively moves laser 1274 and aluminum source 1276 to solidify a portion of the fresh bed 1266 of iron powder to build up the next layer of the object being fabricated 1268. Here, the laser source 1274 provides sufficient heat such that the aluminum powder stream and the iron oxide layer on the iron powder provide a localized and controlled thermite reaction to selectively solidify the portion of bed 1266 corresponding to the fabricated part 1268. Here, a method of forming a soft magnetic bulk material of a predetermined shape 1268 from a magnetic material 1262 and a non-magnetic material 1286 is provided by providing a reservoir 1266, 1270 adapted to contain the soft magnetic bulk material of the predetermined shape 1268; providing a heat source 1274 and heating the magnetic material 1262 and the non-magnetic material 1286 in the reservoir to an ignition temperature of a reaction thus forming the soft magnetic bulk material of a predetermined shape 1268. Here, the soft magnetic bulk material 1268 has domains formed from the magnetic material with insulating boundaries formed from the reaction as described with respect to FIGS. 41 and 42.

Figure 44:
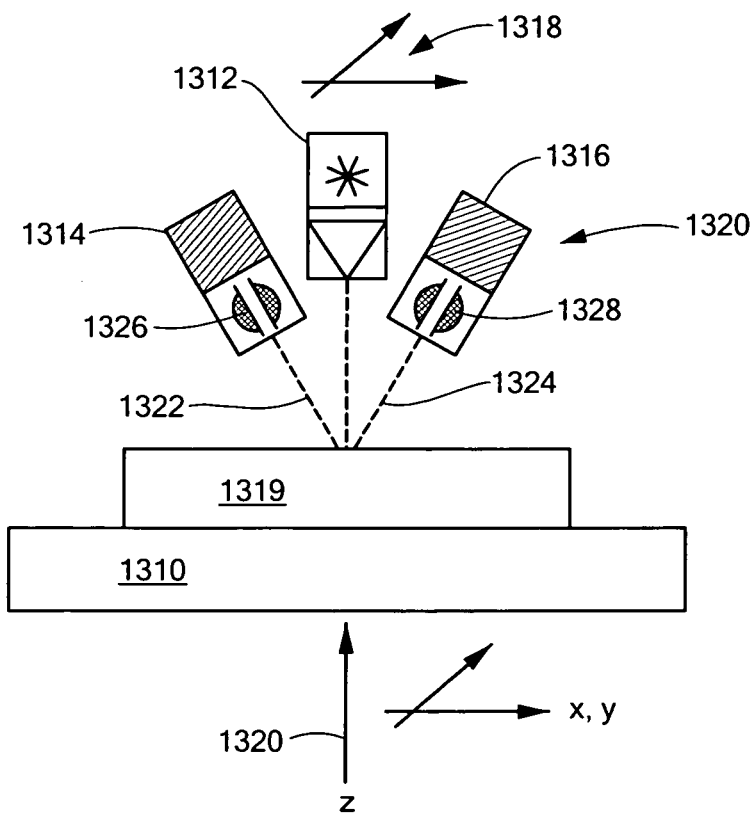
FIG. 44 is a schematic sectional view of a deposition system.

In another example, FIG. 44, shows an apparatus 1300 that uses an additive principle to form a soft magnetic bulk material that has domains formed from the magnetic material with insulating boundaries formed from the thermite reaction as described. System 1300 has moveable support 1310, heat source 1312 and powder source 1314 and alternate powder source 1316. Scanning platform 1318 selectively positions heat source 1314 and powder sources 1316 to direct heat and material to a portion of support 1310 to turn the powder material from sources 1314, 1316 from powder form to solid form. In practice, iron particles with iron oxide coating are provided within reservoir powder source 1314 and aluminum powder is provided within powder source 1316. In the embodiment shown, support 1310 may be heated, for example, to facilitate the reaction or stress relieve part 1318. To build successive layers of object 1318, indexer 1320 is indexed down an increment to lower support 1310 Scanner 1318 selectively moves heat source 1312, powder source 1314 and alternate powder source 1316 to deposit and solidify a portion the object being fabricated 1319. Herein, indexer, scanner, or the like may include a stage, fixture, robot, head, or other moveable structure typically controlled by a program. The process is repeated until the object being fabricated 1319 is complete. In alternate aspects, scanner 1318 may not be provided, for example, where an x-y scanner or indexer is coupled to support 1310. In the embodiment shown, the switchable, via metering valve 1326, pressurized powder stream 1322 may be iron oxide coated iron particles, the heat source 1312 may be a switchable laser and the alternative powder source 1316 may be a switchable, via metering valve 1328, pressurized stream of aluminum powder 1324. In practice, Scanner 1280 selectively moves laser 1312, iron powder source 1314 and aluminum powder source 1316 to deposit and solidify a portion of the object being fabricated 1319. Here, the laser source 1312 provides sufficient heat such that the aluminum powder stream and the iron oxide layer on the iron powder from the iron powder stream provide a localized and controlled thermite reaction to selectively deposit and solidify the portion to the fabricated part 1318. In alternate aspects, laser may not be provided, for example, where the powder source 1314 heats the iron oxide coated particles to a molten are softened state as disclosed sufficient to provide the heat needed for the thermite reaction. In alternate aspects, aluminum powder source 1316 may not be provided, for example, where the aluminum powder is mixed with the iron powder in source 1314. Accordingly all such aspects may be provided alone or in combination with any of the disclosed embodiments. The disclosed method and apparatus may form a soft magnetic material, for example, having structure similar to the spray or deposition based methods as previously described, for example, as disclosed with respect to FIGS. 23 A& B or otherwise as disclosed. Here, a method of forming a soft magnetic bulk material of a predetermined shape 1318 from a magnetic material 1322 and a non-magnetic material 1324 is provided by providing a reservoir 1310 adapted to contain the soft magnetic bulk material of the predetermined shape 1318; providing a heat source 1312 and heating the magnetic material 1322 and the non-magnetic material 1324 in the reservoir to an ignition temperature of a reaction thus forming the soft magnetic bulk material of a predetermined shape 1310. Here, the soft magnetic bulk material 1318 has domains formed from the magnetic material with insulating boundaries formed from the reaction as described with respect to FIGS. 41 and 42.

Figure 45:
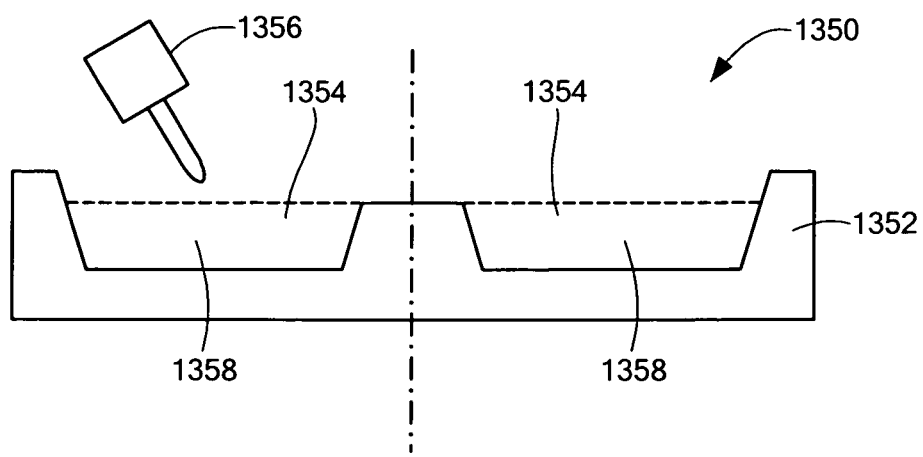
FIG. 45 is a view of a mold.

Referring also to FIG. 45, there is shown an alternate aspect of the disclosed embodiment. Apparatus 1350 has mold 1532 with a predetermined shape, bulk material 1354, which may be a combination of iron oxide coated powder and aluminum powder as described and heat source 1356. The heat source triggers a thermite reaction as described turning the powder mixture 1354 into a solid part 1358 as the reaction travels through the part. Here, a method of forming a soft magnetic bulk material of a predetermined shape 1358 from a magnetic material and a non-magnetic material 1354 is provided by providing a reservoir 1352 adapted to contain the soft magnetic bulk material of the predetermined shape 1358; providing a heat source 1356 and heating the magnetic material and the non-magnetic material 1354 in the reservoir to an ignition temperature of a reaction thus forming the soft magnetic bulk material of a predetermined shape 1358. Here, the soft magnetic bulk material 1358 has domains formed from the magnetic material with insulating boundaries formed from the reaction as described with respect to FIGS. 41 and 42.

Although specific features of the disclosed embodiment are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

Other embodiments will occur to those skilled in the art and are within the following claims.

What is claimed is:

1. A method of forming a soft magnetic bulk material of a predetermined shape from a magnetic material and a source of insulating material, the method comprising:
   providing a heating device;
   providing a deposition device;

providing a support configured to support the soft magnetic bulk material of the predetermined shape;

providing a mask subsystem configured as a negative of at least a portion of the predetermined shape;

heating the magnetic material with the heating device to form particles having a softened state;

locating the mask subsystem between the deposition device and the support;

depositing successive layers of particles of the magnetic material in the softened state with the deposition device on the support; and indexing, to a position relative to the support, the mask subsystem upon deposition of the successive layers;

wherein the mask subsystem selectively blocks the successive layers of particles of the magnetic material in the softened state from being deposited on the support thus forming the soft magnetic bulk material of a predetermined shape on the support.

2. The method of claim 1 wherein the mask subsystem comprises a first and second mask.

3. The system of claim 1 wherein the mask subsystem comprises a first and second mask and wherein the first mask is moveable relative to the second mask.

4. The method of claim 1 wherein the soft magnetic bulk material of a predetermined shape has a uniform cross section.

5. The method of claim 1 wherein the soft magnetic bulk material of a predetermined shape has a non-uniform cross section.

6. The method of claim 1 wherein the mask subsystem comprises more than one mask having different shapes corresponding to different cross sections of the soft magnetic bulk material of a predetermined shape with a non-uniform cross section at different index positions.

7. A method of forming a soft magnetic bulk material of a predetermined shape from a magnetic material and a non-magnetic material, the method comprising:

providing a reservoir adapted to contain the soft magnetic bulk material of the predetermined shape;

providing a heat source; and heating the magnetic material and the non-magnetic material in the reservoir to an ignition temperature of a reaction thus forming the soft magnetic bulk material of a predetermined shape;

wherein the soft magnetic bulk material of a predetermined shape has domains formed from the magnetic material with insulating boundaries formed from the reaction.

8. The method of claim 7 wherein the reservoir comprises a movable support.

9. The method of claim 7 wherein the heat source comprises a laser.

10. The method of claim 7 wherein the reaction comprises a thermite reaction.

11. The method of claim 7 wherein the domains comprise iron and wherein the insulating material comprises aluminum oxide.

12. The method of claim 7 wherein the reaction comprises a thermite reaction and wherein the magnetic material comprises coated iron particles and wherein the non magnetic material comprises aluminum.

13. The method of claim 7 wherein forming the soft magnetic bulk material of a predetermined shape comprises an additive process.

14. The method of claim 7 wherein the reservoir comprises a mold.

* * * * *